United States Patent [19]
Dillinger

[11] Patent Number: 5,377,024
[45] Date of Patent: Dec. 27, 1994

[54] APPARATUS FOR FORMING COLOR IMAGES USING A HUE-PLUS-GRAY COLOR MODEL

[75] Inventor: Paul H. Dillinger, Escondido, Calif.

[73] Assignee: Hewlett-Packard, Palo Alto, Calif.

[21] Appl. No.: 878,931

[22] Filed: May 4, 1992

[51] Int. Cl.⁵ .............................................. H04N 1/46
[52] U.S. Cl. ..................................... 358/502; 358/520; 358/534; 358/448
[58] Field of Search ............... 358/400, 401, 405, 443, 358/448, 500, 501, 502, 518, 519, 520, 521, 523, 524, 525, 530, 534, 536

[56] References Cited

U.S. PATENT DOCUMENTS

| | | | |
|---|---|---|---|
| 4,413,275 | 11/1983 | Horiuchi et al. | 358/75 |
| 4,446,470 | 5/1984 | Sugiyama et al. | 358/75 X |
| 4,468,692 | 8/1984 | Yamada et al. | 358/76 |
| 4,500,919 | 2/1985 | Schreiber | 358/78 |
| 4,614,967 | 9/1986 | Sayanagi | 358/75 |
| 4,751,535 | 6/1988 | Myers | 358/80 |
| 4,959,711 | 9/1990 | Hung et al. | 358/80 |
| 5,231,504 | 7/1993 | Magee | 358/75 |

*Primary Examiner*—Bentsu Ro

[57] ABSTRACT

The invention is for use with a visible medium capable of light reflection etc., and for use with a color-image source that defines a desired color. Here a device for causing the medium to appear colored includes a grayscale subsystem to achromatically suppress a stated fraction of the reflection; and at least two device-primary subsystems to cause selective reflection of light of two associated device-primary colors. Even if the device, as originally made, in effect uses the gray-scale subsystem to help construct colors, or the device-primary subsystems to help form gray-scale "values", such cross-dependency is essentially removed. A programmed processor resolves the desired-rendition information into Fraction-Black, Fraction-Colorant, and hue. Fraction-Black information is applied exclusively to control only the gray-scale subsystem; Fraction-Colorant to control only the device-primary subsystem; and hue to select a dominant and a subordinate primary subsystem and as between them apportion the Fraction-Colorant.

20 Claims, 18 Drawing Sheets

APPARATUS FOR FORMING COLOR IMAGES USING A HUE-PLUS-GRAY COLOR MODEL

RELATED APPLICATION

A related application is Ser. No. 07/878,579, filed on May 4, 1992, in the names of Jeffrey S. Best and Paul H. Dillinger, and entitled "METHOD FOR FORMING COLOR IMAGES, USING A HUE-PLUS-GRAY COLOR MODEL AND ERROR DIFFUSION", attorney docket PD-191063.

BACKGROUND

1. Field of the Invention

This invention relates generally to generation of colors on color-reproduction devices—and more particularly to dot-on-dot sheet-medium printing systems, including color-halftone systems.

2. Prior Art

In recent years computer-driven machines have become available for producing color graphics—diagrams, abstract patterns or pictures—on a sheet medium such as paper. Such machines are generally controlled in a two-step process.

First a user sets up desired colors on a cathode-ray-tube (CRT) display; then the user directs the machine to print the selected colors onto the sheet medium. Both stages of control are found to be very problematic.

In the first stage, sometimes called "color adjustment" or "color compensation", although desired colors may be very clearly in mind, the user struggles with circuitous, seemingly irrational procedures for expressing to the color system just what those desired colors are. Attempts to operate a conventional color-compensation stage usually range from annoying to quite maddening.

After that difficult, patience-testing step has been satisfactorily completed, however, the user encounters new problems in the second stage, which is known as "color rendition" or "color halftoning". Here the colors and image spaces should be reproduced on the printed page—but both are found to be distorted, relative to those on the screen, in peculiar and incomprehensible ways.

These latter artifacts are even more troublesome in the sense that they are completely beyond control of even the most patient user. Prior skilled workers in this field have been unable to satisfactorily resolve either problem.

This section of the present document undertakes to cast the operating problems of prior systems in terms of basic principles of color. The result will be a hint that whatever adequate solution may be found must necessarily result from a resort to first principles of color theory. The hint will be borne out in later sections explaining the present invention.

a. Dimensionality of Color

Color is three dimensional. This tridimensionality is first traceable physiologically to the origin of the color experience in at least three different photosensitive pigments (or pigment-filter combinations) that form the operative light-processing equipment of the retina.

Moving next to the physiology/physics boundary, arising from the operation of those three sensors there apparently results a corresponding set of three spectral weighting functions—evidently part of the human viewing apparatus though perhaps partly in the brain rather than the retina. The capability of a human observer to make color distinctions can be emulated by devices using these weighting functions, called "tristimulus" functions (International Commission on Illumination, 1931).

Proceeding on to psychophysical terms, the dimensionality of color is seen in Grassmann's First Law (1853): human optical apparatus is capable of exactly three kinds of color distinction. These can be expressed as changes in dominant wavelength, luminance and purity.

Next at the purely psychological or perceptual level, we will inevitably encounter again three variables. Quantitatively, however, not one but several competing coordinate systems or so-called "color spaces" have been introduced to describe the three-dimensional character of color perception.

The root reasons for this proliferation of divergent perceptual models are at the heart of the present invention and will be discussed at length. First, however, it should be appreciated that there is yet one more level or environment, one more space, in which the tridimensional character of color must be manifested—machine space.

It is interesting to notice that in a sense we here come full circle, because the eye is a color machine; the pigment-based system that drives it is as chemical, as electronic, and as mechanical as any artificial device. Now, however, we refer not to devices for distinguishing color but rather devices or machines for generating, producing, creating or manufacturing color.

The color space used in such color devices in fact mimics or tracks the color space of the eye, in certain important ways. The three retinal pigments evidently absorb selectively in (very broadly speaking) the blue, green and red spectral regions, and these are the spectral bands embodied in the tristimulus functions.

Evidently those spectral bands have some claim to special status as what might be called "natural" reference points for human color vision. As will be seen this fact sometimes has been a cause of confusion in design of equipment for color generation and control.

When we want to design devices that create and manipulate color experience, we aim to stimulate and control each retinal pigment independently. We would like to reach into the retina and excite just certain sensors, and we know just what tools can be used to do so: blue, green and red light respectively.

These choices are also desirable from the standpoint of cost-effectiveness. We must pay for each milliwatt of light that we use to create color sensation, or even to create any visual sensation, and we do not wish to do so with light that falls between, or outside, the peaks of spectral sensitivity in the retina.

Hence the choice of red, green and blue phosphors in video displays, and pigments of those same colors (or, for reasons to be discussed, their complements) in devices that produce color on paper and other media. The present invention does not undercut these choices of machine colorants.

At some level of machine operation it is necessary to communicate in machine language. At that level the machine needs a specification of what colorant to drive, and so the machine language is necessarily colorant language—for printing devices, pigment language. (In this document, a machine "pigment" means a physical coloring substance.)

b. Fundamental Color Spaces For Color Manipulation, and Criteria For Their Selection A natural concomitant of these phosphor and pigment choices has been the historical use of a three-dimensional color space in which red, green and blue are the defining dimensions R, G and B. For purposes of comparison only, FIG. 1 shows in an abstract form how such a space might be formulated.

For reasons that will shortly appear, color is seldom discussed, and almost never manipulated by people, in such a space. Again, however, for the lowest-level machine color space—analogous to the stream of ones and zeroes necessarily used at the lowest level in operation of a digital computer —the RGB-space choice is sensible.

Now it might be supposed, since R, G and B signals drive machine colorants, and RGB stimuli drive the retina, that RGB space is an ideal space in which to manage all color transactions. In support of this proposition can further be raised the fact that we not only work with RGB in operating our eyes but we also recognize those same colors.

That is, we consciously perceive them as such. Since it is the perceptual level that is of greatest concern for purposes of the present invention, the RGB space may seem perfectly qualified to serve for color manipulation and navigation.

We shall digress to discuss why this is not so. Experience shows that when humans need to navigate in color space their intuitions about the directions that will take them to a desired result are totally inadequate—if that color space is an RGB space. To begin with, that statement is true qualitatively:

Suppose we want some part of a color graphic to be "more reddish", or "less reddish", and we adjust a redness control to effectuate that judgment. If we are observant, we are often baffled to find that parts of the image now become more vividly or less vividly colored, and parts of the image become lighter or darker. Furthermore, the added or diminished redness that was desired—and, we know, physically provided—may or may not even be perceptible.

The above statement of inadequacy of our intuitions is even more strikingly true quantitatively. Suppose that the person who wants some part of a color graphic to be "more reddish" is a knowledgeable color scientist who understands thoroughly what causes the baffling events just described. That person now will realize what compound blendings of color stimulus would result if merely the redness were turned up, and will understand also what overall maneuvers must be made to drive to the desired result.

As a general matter such a person will be able to make adjustments—of R and G and B—that will move in the right direction in trispace. Even that person, however, will find it extremely difficult to gauge in advance roughly how big the adjustments should be to closely approach the desired result with just one or two sets of adjustments.

Therefore it is desirable to drive the RGB machine-language stage of a color system with some other stage in which color can be manipulated in a more intuitive way. It is in recognition of this consideration, for example, that color television sets are provided with color-adjustment controls that are not labelled "red", "green" and "blue"—but rather with words intended to carry some intuitive connotations for guiding the user more directly toward a desired result.

The stage of the system which is inserted to allow for adjustments must produce output signals that are then converted into RGB signals, by an arithmetic transformation. That manipulation or adjustment stage also may be driven by input signals received from a computer-screen control system, or from a broadcast signal, or from a video-playback device—any of which, in principle, may be in RGB.

Now we come to the question of what color space should be employed inside the adjustment or manipulation stage of the system—the so-called "color compensation" stage mentioned earlier. This space, since navigation is the only or principal reason for its existence, should be one which is navigable as intuitively as possible.

Essentially all modernly significant efforts to develop such a space—including that of the present invention—lead to some derivation from the parameter set which FIG. 2 presents in a generalized form. In this space, color is characterized by the following three components or parameters.

(a) One of these relates to what has been termed "a mode of appearance of the color"—see Judd, *Color in Business, Science and Industry, Second Edition,* p. 45 (Wiley 1963)—and is often called "value".

In speaking of self-luminous objects it is also called "brightness" (ranging on a scale from invisible to dazzling); in reference to other objects it is "lightness" (on a scale from black to white).

The Other Two Perceptual Variables Describe The Chromaticness of the Perception:

(b) hue—commonly used to describe the colors around a color wheel, and (c) chroma, which is the saturation or vividness of a color.

This basic or fundamental set of parameters is often identified as the "Munsell HVC" color model.

As is well known, this parameter set is popular primarily because—besides potentially providing a full quantitative, analytical description of the experience of color—it also corresponds to properties of color that are readily grasped intuitively and that seem to be natural or even fundamental. The parameters correspond closely in intuitive significance to the three variations identified in Grassmann's First Law.

As seen in FIG. 2, a familiar implementation of Munsell color space retains some grounding in retinally-referenced colorants R, G and B. Rue is seen as the angular element of a polar-coordinate system, on a six-unit cyclical scale from zero through five (or six superposed upon the origin angle zero), and those three color reference points are generally identified as related to the points zero, two and four on the hue scale.

In this context the RGB points are no longer dimensions or parameters but rather only numbers along a parameter scale; they are called "primary colors" or "primaries". As is known, the R, G and B on a practical scale need not be identically the color reference points that earlier were suggested as "natural". Desired colors can be constructed from colorants that only roughly approximate those "natural" spectral sites—or indeed from other colorants that provide adequate chromatic gamut.

The value or lightness scale passes perpendicularly through the vertex or central origin of the hue plane drawn in FIG. 2. That plane is positioned in the drawing to suggest that the origin of the value scale may be taken as the center of the lightness-darkness range, with numbers L (light) as greatest available positive value and D (dark) the greatest available negative value.

The vividness or chroma scale is represented by perpendicular radial or horizontal distance from the central lightness-darkness line LD. As will be seen, this seemingly straightforward representation has led to some of the greatest problems in color-control efforts heretofore.

Of course any point in this tridimensional color space can be represented with these three parameters. As a matter of chromatic reality, however, not all points in this space have distinct physical meaning.

Some constraints are imposed by theoretical availability of pure colors in the spectral sense. In adapting this color space to generation of colors by use of fixed individual primaries, further constraints are imposed by availability of actual colorants.

Accordingly the ranges of permissible points are often said to be enclosed within various forms of color "solid". One such color solid is shown—again in very generalized form—in FIG. 3. Both the external contours and internal structure of that solid are characterized and illustrated differently in different color models.

Since the present invention proceeds from a way of thinking about color space that is fundamentally different from ways employed earlier, particularly as to color machines or devices, we shall continue slightly further with our summary of portions of the conventional analysis.

FIG. 3 may be taken as representing very generally the colors available from a large choice of colorants. The solid has rounded upper and lower surfaces.

Those surfaces represent the boundary of the so-called "gamut" of those colorants—in other words, the extreme boundaries of the range of all available pigment choices, and combinations of those choices. All the colors that are within those gamut boundaries can be formed from those available choices and combinations, and are said to be within the gamut of available colors of the system.

The limiting case of pure chromatic or spectral colors defines the extreme equatorial rim, or a vertical tangent along that rim—which in any vertical-section plane is rounded.

The top and bottom apices represent the light and dark extrema available in the particular colorant system. These light and dark extrema, like other points on the surface of the solid, correspond to the light and dark extremes of available pigments—here specifically the nonchromatic pigments.

The color solid of FIG. 3 has been drawn with a section removed. The two faces 11a, 11b of the section represent the gamut of colors available, for the assumed large selection of colorants, in two different hue planes. That is, each section face 11a, 11b respectively represents only colors that are formed by making a great variety of lightness and vividness shadings of one specific hue, exclusively.

FIG. 4 is a like generalized representation of colors available from a selection of many primaries of different hues, but just one primary for each hue. The rounded surfaces are replaced by straight lines which connect the light and dark extrema, respectively, to the rim.

All these lines considered together form a pair of opposed cones. The rim now represents just one single point for each hue—corresponding to the physical primary selected for that hue.

Thus the rim is now the sharp intersection of upper and lower cones. Further, as a practical example the boundary rim line at each point in FIG. 4 is defined by a color point that has been selected as within the color solid of FIG. 3: real-world colorants usable in machines usually must be selected to accommodate machine constraints on viscosity, physical and color stability, and cost. For the same reason the apical points are chosen within the lightness range defined by the apices of FIG. 3.

FIG. 4 thus represents one major step from the relative abstraction of FIG. 3 toward practical machine systems. Implicit in FIG. 4, however, remains an assumption of an essentially infinitesimal spacing of an infinite number of primaries about the rim. The next step toward a practical system is to replace these by some small number—such as three to seven—of colorants spaced somewhat evenly about the rim.

Only colors within the boundary formed by a straight line between each primary can be formed from those colorants; hence the gamut of the system at its equator becomes a polygon. Above and below that polygonal equator, the gamut is defined by planes extending from the sides of the polygon to the top and bottom apices; such planes form a gamut solid (not illustrated) composed of two opposed polygonal pyramids.

FIG. 5 shows four fine leaves 11R, 11PB, 11PG, 11Y sectioned from a large-colorant-selection solid very generally like that of FIG. 3. Such sections are called "hue pages".

Near top and bottom on each hue leaf or page 11R, 11PB, 11PG, 11Y there is drawn a set of diagonal straight lines such as would be found from a single-colorant-per-hue color solid very generally like that of FIG. 4. Superimposed for reference is a cylinder of constant vividness.

The hue pages here are merely for representative hues, but are far more realistic than in FIGS. 3 and 4. They illustrate very clearly that the equatorial rim sweeps about neither a constant-lightness height nor along a constant-vividness radius—but rather varies strongly, as a three-dimensional contour, with hue.

Thus both blue-green 11BG and red 11R gamuts are available with maximum vividness that is positioned at midlightness values along the vertical "value" scale. Blue-green vividness is distinctly truncated, whereas available vividness for red is emphatically greater than for other colors.

Purple-blue 11PB and yellow 11Y, on the other hand, both have very generally midrange vividness extrema; the purple-blue vividness comes to a peak at a very low point along the value scale—producing available colors often described as "deep". The yellow vividness, however, peaks very high on the value scale, to offer colors sometimes called "brilliant".

From FIG. 5, and particularly by reference to only the straight lines on each hue page showing the available gamut on that page for some practical colorant of that hue, it is possible to visualize a color solid in which the straight lines in the four different hue pages are connected together by triangular planes. At the outer edge, these planes form an irregular rim, not a regular equator as previously suggested.

That rim rather is a highly irregular one that pokes radially in and out to the different vividnesses of the several colorants, while riding up and down to the corresponding different lightness values at those vividness points. The solid so described would represent the gamut of colors that could be formed by direct combination of the four practically usable primaries selected just inside the radially outermost point of each hue page in FIG. 5—under the constraint of using each of those primaries only directly as a primary.

As can be appreciated from visualizing such an irregular pyramidal solid, with four (or more typically just three) colorants, very large peripheral (i.e., vivid) regions would be cut off by the outer pyramidal edges—and so would be outside the solid. Those regions would represent colors excluded from the gamut, leaving distinctly limited treatments of vivid colors situated between the colorant primaries.

Actually the gamut is not that severely constrained, even with only three colorants. Each pair of those colorants can be blended to construct a complementary color at a generally diametrical point of the solid.

These complements can then be treated as if physically present, and the polygonal equator thus puffed out (angularly) in the regions between the primaries that are physically present. Accompanying that equatorial restoration is a corresponding expansion of the pyramidal upper and lower surfaces.

Now when color is analyzed for the purpose of systematizing its generation or manufacture—and especially in allowing users and automatic-machine designers to adjust or control the resulting colors—it has been natural to attempt to adapt these same three color dimensions to the analysis. Device users would like to be offered controls or adjustments which they understand in intuitive terms: for example, a knob labeled "brightness" or a computer-screen menu choice (for color to be printed on paper) marked "vividness".

To draw an example from an analogous (phosphor-based) field, however, it is a commonplace observation that twisting the brightness control on a television set is likely to change not only the brightness but the saturation and even the hue as well. Chroma adjustments often are equally frustrating because the desired fine retouching of color saturation is often accompanied by gross changes in brightness—or, again, hue.

This example merely serves to couch the problem In familiar terms. Analogous difficulties are seen in all kinds of paper or so-called "hardcopy" color images: we all encounter marginal color rendition everywhere in everyday life.

Behind the scenes, in many of such cases, were efforts to correct what seemed to be just a small error in, for example, hue—but which efforts almost inevitably resulted in unacceptable accompanying shifts in chroma or brightness.

Such results are a direct result of the unfavorable economics in iterative efforts to bring the finished colors into a reasonable approximation of what is desired. When iterative efforts fail (as is often the case) to converge but rather seem to circulate endlessly around the desired accurate or natural appearance, terms such as "uneconomic" hardly suffice.

Two conclusions may be drawn about the present state of the color-compensation art: (1) color adjustments, identified by parameters that are readily comprehended as intuitive, suffer from a lack of mutual independence; (2) apart from that seemingly basic property under control, color adjustments also fail to be reasonably well-behaved in perceptual color space.

Although our earlier discussion of RGB color space emphasized difficulties of independence of available adjustment parameters in RGB space, we also mentioned the problem of quantitation of adjustment. Unfortunately, prior efforts to develop a formulation for intuitive management of color have seized with excessive vigor upon this second criterion—quantitative regularity.

It is true that in discussing color as perceived, it is helpful to employ a color space that is perceptually linear—in other words, a space in which equal steps along any dimension correspond to increments of color perception that also appear substantially equal.

Adoption of that criterion as the major objective, however, has been to the considerable detriment of the more fundamental criterion, parametric independence. It is at this point, as will now be shown, that the prior art veers sharply away from satisfactory solutions to the problem of providing good adjustability.

This detour taken by the prior art is not a fault inherent in the fundamental HVC color space of FIGS. 2 through 5. Rather it arises in unfortunate choices for specific definitions of the parameters—particularly chroma C.

True independence (or in mathematical terms "orthogonality") of parameters may be unnecessary, but at least very low mutual sensitivity or crosstalk is highly desirable. Similarly, precise perceptual linearity may be unnecessary, but it is sensible to pursue at least a fair degree of consistency in response to like adjustments of chroma, for example, in different portions of a hue plane. The same is true of uniformity in response to like adjustments of brightness in the presence of various chroma numbers; and so on.

In response to this line of thinking it might be objected that a clear design goal for the most modern equipment should be to substantially eliminate the real need for adjustment, and simply drive the color devices to a color presentation that is both "correct" or "accurate" and "natural". For two reasons, the requirement for independent and well-behaved parameters in an adjacent color space cannot be so easily dismissed.

First, consumers will continue to want fine adjustments for use as a matter of taste or preference. Second, in modern apparatus intended to produce correct or natural color the same problems of parametric independence and regularity resurface before the color device reaches the consumer: here it is the apparatus designers who struggle with the same problems.

The reasons for the importance of independent parameters are the same in supposedly automatic color-control systems as in an earlier generation of systems nominally dependent upon operator adjustments. The colorants used to produce color—pen-discharged ink dots, for instance—simply do not come with inherent, independent adjustments for chroma, brightness, or hue.

None of these physical substances is an ideal Munsell color machine. Neither are the devices—e.g., pens—used to actuate the colorants.

This momentary reversion to thinking about machine space and colorant language does invoke a third conclusion: (3) the so-called perceptual primaries and variables employed for color adjustment fail to correspond well to "device primaries" and "device variables".

Here is a summary of the conclusions reached so far. Industrial color science has failed to develop a model of color space that is both parametrically independent and perceptually uniform, and even more emphatically has failed to develop a model that is also reasonably compatible with device parameters.

The prior art has not reached a main objective: an ability to take the input desired-color information into such a space. Therefore it is not generally possible for perceptually meaningful and independent adjustments, compensations and rendering decisions to be made easily and straightforwardly—in particular, without need for iteration.

The prior art has also fallen short of another main objective: an ability to move on into machine space with minimal distortion of the perceptual adjustments, compensations and decisions.

After some further introduction, two prominently used color models will shortly be described; as will be seen they fall short of all three objectives—independences, well-behaved navigation about color space, and correspondence to device parameters.

c. Operation of Color-Creating Devices

Typical color output devices use a combination of—for example—red, green, blue, cyan, magenta, yellow and black colorants to generate color. These colorants conventionally are abbreviated R, G, B, C, M, Y and K respectively; or in a usual condensed notation "RGBCMYK". These systems are only capable of printing these distinct colors, limited in number, at each addressable location.

In this document these distinct colors will be called the system colorants. They include device primaries (i.e., chromatic colors RGBCMY that have hue) plus black K.

Typically the system colorants also include white ("W")—commonly for example the white of a sheet medium such as paper. In some cases white is instead constructed by blending chromatic colors—but when such blends are used in trying to produce white on an already-white sheet of paper or the like, the result is to waste pigment. Analogously, overprinting two or more pigments to approximate gray always wastes pigment and also usually produces a poor gray (i.e., one that is impure, in the sense that it includes a chromatic component).

Usually the number of actual system colorants—that is, those represented on a one-to-one basis by physical pigment substances—is small. In particular, instead of all eight colorants listed above, as mentioned in the preceding section it is common to form or construct some (e.g., red, green and blue, RGB) as combinations of others (the complements cyan, magenta and yellow, CMY).

Nevertheless these constructed (as distinguished from actual) colorants RGB usually are treated as device primaries available in their combinable form. This latter part (combinability) of the assumption results in very helpful analytical simplifications to the process of producing other colors generally—i.e., other than the full set of assumed system colorants RGB-CMY-KW.

In particular, in a system that has the six chromatic colorants CMY-RGB, plus black and white, it can be shown that in order to generate any color (within the saturation envelope of these colorants) using the device, it is necessary to apply only two colorants plus black and white. As will shortly be seen this technique for operating a CMYK device is important and valuable—but for a reasonably complete hue/saturation gamut does rest upon the assumption that the constructed colorants RGB do stand in some reasonable semblance of complementarity to the actual colorants CMY.

In order to create colors other than the actual system colorants CMYK, as is well known, the latter are positioned on the medium (e.g., white) in close adjacence. The viewer integrates perceptually the spectral bands physically emanating from the actual colorants.

The viewer thus perceives some color not present as a single pigment, and perhaps perceives a desired color or something near it. Of course, close inspection as under a magnifier reveals that desired blend is not represented as an individual colorant.

An important special case of this is halftoning, in which dots of different colorants are distributed over some area or region of the medium. Various degrees of freedom are available in such systems, depending upon the type of color device in use: dot size, for example, can be made variable.

In printing machines driven directly by digital computers, generally more straightforward and rapid operation results from controlling only presence or absence of dots, but the dots and their spacing can be made quite small to yield reasonable overall resolution. With such machines, often halftone technique is called "digital halftoning" and the dots are called "pixels"—from the familiar convention of video display.

Many digital halftoning methods are extensions of the gray-scale halftoning case, in which gray information is generated by combinations of black and white pixels. These methods, when extended to the color case, typically assume that the colorants obey a subtractive color law.

It is for this reason that—as mentioned above—all six chromatic device primaries RGB-CMY are treated as available in combinable form even though actually only three CMY (as well as nonchromatic K) are physically present. When the printer or other device fails to obey the subtractive color law, however, color errors result because it generates device primaries R'G'B' which are treated as if they were complements RGB to the actual pigments CMY, but are not those complements.

A better way to control the resulting color is to treat such a CMYK device as having six chromatic device primaries, and to construct three R'G'B' of those as crosscombinations of the three actually present, as before—but to drop the assumption that the constructed ones R'G'B' or pseudoRGB are accurately complementary red, green and blue RGB. This releases the need to depend on the subtractive color law, for establishment of primaries.

Color combinations now can be calculated using actual properties of the constructed primaries and indeed of all the primaries. Such a system—with six known chromatic colorants corresponding at least roughly to CMY and pseudoRGB or R'G'B', plus black and white—retains the capability to generate any color (within the available saturation envelope) using only two of the colorants CMY-R'G'B' plus black and white, taking into account the known departures of R'G'B' from the complements RGB.

This capability in turn enables generation of any such color using just the four actual pigments CMYK and the white background. In the remainder of this document we shall drop the notation R'G'B' and substitute the simpler RGB, with the understanding that typically one or more of these is a constructed primary.

Some known machines, particularly some using CMYK devices, are controlled by isolating black information K for separate processing in the color-compensation stage. Those systems then retain the separate black information channel in the halftoning or rendition-driving stage.

d. The HSV Color Space

FIG. 6 illustrates, for one traditional color model known as "HSV", the way in which perceptual variables H, S and V are found from a given definition of a desired color rendition. Those perceptual variables are then used to control device variables (not shown).

Discussion of the HSV system is appropriate because that system could be used to control a computer-driven CRT monitor in preparing a color graphic—which can then be printed on paper by a device also driven by the same computer.

The HSV color model corresponds to a color solid that is modified from those of FIGS. 3 through 5— which correspond more closely to the classical Munsell HVC model. In HSV the color solid is just a single pyramidal cone, rather than two opposed cones.

HSV is intended to model closely the intuitive concepts of tint, shade and tone used by an artist working manually in paints. While it may accomplish this, it departs considerably from relationships in classical HVC; the departures will be discussed in detail in the following paragraphs.

In the FIG. 6 diagram, the full available colorant range or full-scale color range is identified as the constant Full at the top of the graph. The heights of the three bars marked "$R_{in}$", "$G_{in}$" and "$B_{in}$" represent respectively an example of the amounts or sizes of red, green and blue input information—that is to say, an exemplary color that is defined as "desired".

Of course in any given real situation any one of the three inputs could be the largest, any could be the smallest, and any could be the intermediate or middle color quantity—so the identifications of the three bars as $R_{in}$, $G_{in}$ and $B_{in}$ also are only an example. The relative heights of these three bars also are only an example.

Generalized quantities—that is, the desired red, green and blue amounts in the general case—will here be denoted by the same notations in italic type $R_{in}$, $G_{in}$ and $B_{in}$.

In any situation, however, there must in fact be some largest, some smallest and some middle color amount: to facilitate general treatment, therefore, the three bars are labelled "Max", "Mid" and "Min" respectively. These same notations in italics—Max, Mid and Min—will be used to designate the relative bar heights in general, which is to say the three color quantities without regard to which is blue, red or green.

For simplicity we define or normalize Full≡1, so that all the numbers $R_{in}$, $G_{in}$, $B_{in}$, Max, Mid and Min are fractions. In typical machine operations Full is assigned some conventional numeric value such as 255, chosen for adequate dynamic range, and the other values are all counts too. Relative representation of all the numbers in this document as integers rather than fractions is to be considered equivalent to the fractional notation.

(These same understandings apply to FIGS. 9 and 11 too.)

Now we turn to the matter of conversion from RGB color space into HSV space.

In the HSV model as in other generally used polar models it is common to start by determining which of the RGB primaries is the largest, smallest and middle quantity, respectively, and assign values for Max, Mid and Min. Next, conversions from the input information to perceptual variables include three determinations.

One of these is a direct measurement of the variable "value" or V. This variable is set equal to the largest input number, V≡Max.

A second computation is addressed to "saturation" or S. It is set equal to the difference between Max and Min, but normalized by dividing into that difference the value Max: S≡(Max−Min)/Max, or 1−Min/Max.

A third computation determines the hue, according to a somewhat complicated formula: H≡C+Fh, where

C=0 if $R_{in} \geq G_{in} \geq B_{in}$

C=1 if $G_{in} \geq R_{in} \geq B_{in}$

C=2 if $G_{in} \geq B_{in} \geq R_{in}$

C=3 if $B_{in} \geq G_{in} \geq R_{in}$

C=4 if $B_{in} \geq R_{in} \geq G_{in}$

C=5 if $R_{in} \geq B_{in} \geq G_{in}$

F=(Mid−Min)/(Max−Min)

if C is even

F=(Max−Mid)/(Max−Min)

if C is odd.

This treatment—as well as the use of the hue variable—underlies all prevailing color models, including that used in the present invention.

This quantitation scheme is a specific implementation of the perceptually uniform Munsell HVC color space which we have illustrated and discussed at length, but now applying specific quantitative and conceptual definitions to the generalized Munsell concepts.

One major weakness of the HSV system is that V is set equal to the largest primary quantity present, regardless of which primary it is—and regardless of the amounts of the others that may be also present. Machine adjustments of brightness or value, conversely, are then effectuated by setting the largest primary color level equal to the user's desired overall value, or brightness, or intensity.

This is quite inadequate, because it fails to take into account either the spectral sensitivity function of the eye or the amounts of other colors that are present. Perceptually such other colors add to the apparent brightness, in complicated ways that relate to—among other things—the visual sensitivity of the eye in the corresponding different spectral regions.

One way to appreciate the problem of this misdefinition of value is to review FIG. 5. It suggests that some true or intuitive perception of lightness for saturated yellow may be in the neighborhood of 0.87, but for saturated purple-blue and red respectively may be only 0.42 and 0.38—less than half that found for yellow.

Another major inadequacy of the HSV model is the normalization of saturation S to the largest primary present Max. Conceptually a reasoned argument can be made for such a relationship, but it results in an inverse proportionality, rather than independence, between two perceptual variables S and V.

FIG. 7 shows parametric relationships on a representative hue page 111—such as any of the leaves of FIG. 5—in the HSV color model. The hue page is viewed perpendicularly.

The top diagonal line is defined as a line of unity value V. The bottom diagonal line is defined as a line of unity saturation S.

A great number of different examples could be presented to illustrate counterintuitive consequences of using such a system. Following are just three.

Suppose that a device user assigns a saturated red color to some the regions in a particular graphic and a saturated yellow to others—and then instructs the device to make all the regions equally light. The HSV-controlled device, however, will interpret this as a command to make all the regions of equal value V as defined.

It will make corresponding adjustments and report the mission accomplished. The puzzled user, however, will see clearly (and consistently with FIG. 6) that the yellow regions are twice as light as the red regions.

Next suppose that a user wishes to move 112 from a relatively light color of medium vividness to a relatively darker color of the same vividness and hue. The user is quite satisfied with the starting vividness: the color is not too gray, not to chromatic—just right in chroma—but just a little too light.

Thus the user, in effect, wishes to move vertically 112 within a hue page such as that of FIG. 7. Curiously, however, while continuing to call for progressively lower lightness (or greater darkness) the user will find 113 that the vividness is decreasing along with the lightness.

If progress on the FIG. 7 hue page could somehow be followed, the user would be surprised to find that the HSV control system, though receiving an instruction to change value only, is pursuing a diagonal route such as the path marked in FIG. 7. Not always available, however, is even this kind of map-like assurance that the user is not being deceived by the user's own senses.

The operator simply sees that the carefully adjusted, satisfactorily vivid starting color is becoming not simply darker, as desired, but also becoming, as the user might put it, "ruined". In more analytical color-science language, the color is becoming grayer or less vivid: the combination of the two effects is a color effect often called "dirtier".

At this point the user usually concludes that the control system is one of those familiar examples of a modern device to which the user becomes a servant. The user believes that the system can be made rational if the user will only develop a mental calibration—an attunement by the user to the degree of dirtiness that can be expected in darkening a color.

To make matters worse, however, just when the user may think a collaborative person/machine control stratagem has been found, the system is likely to defeat even those newly sophisticated expectations. Here the contortion is more subtle, but thereby seems only all the harder to grasp:

If the user happens to be operating in a more-saturated region than the one in which the user performed the mental self-calibration, the system makes the rate of dirtying per unit darkening rate higher (a steeper slope for the path, if it could be seen). If the user happens to be in a less-saturated region, on the other hand, the system makes the dirtying rate with darkening lower (a shallower slope).

A third example: a user has found a color that is satisfying in all respects except that it is not quite vivid enough.

The user wishes to raise the vividness without changing the brightness. That means, in classical Munsell HVC terms, a positive radial movement: a horizontal movement 114 away from the lightness axis.

The user will find here that the color becomes not only more vivid but also darker—or, in other words, deeper. FIG. 8 shows the path 115 followed.

Deep colors can be very appealing, but that is not what this particular user wants. The user may attempt to correct by increasing 116 lightness with the "lightness" control, but in the previous example the control system will respond with increased vividness too.

The user started out to raise the vividness, but had already moved it to a desired level, so now the control system is forcing the user to overshoot the desired vividness. The user now must lower the vividness to compensate for that.

Again, if able to see the map, the user would begin to doubt the rationality of the navigation system. The user would see that outward (toward-vividness) movement obtained with the "saturation" control alone is accompanied by downward (toward-darkness) movement.

Given the user's experience with the first iteration, the user feels that thereby a degree of intuition has been achieved as to operation of the control system—but now the user makes another disappointing discovery:

The adjustments required to obtain a desired incremental change of vividness will produce an accompanying change in lightness too—but at a different rate than before. In other words, the ratio of lightness increment to vividness increment is different, so that not only is the desired color not obtained but also the user's feeling of making progress in understanding how to use the system is defeated.

e. The HSL/HSI Color Model

FIGS. 8 and 9 represent another popular color-control protocol known by various acronyms such as "HSI", "HSL" and "HLS". Here the parameters are hue, saturation, and intensity or lightness—once again corresponding in a very general way to Grassmann's First Law and to the generalized three-dimensional color spaces of FIGS. 2 through 5.

The definitions of these control axes, however, differ somewhat from those in the HSV model already analyzed. This can be shown by comparing the expressions given above for converting RGB coordinates into HSL saturation S and value V with the analogous expressions for obtaining HSI/HSL saturation S and lightness L or intensity I. (To simplify matters we will use only the variable L, which is more appropriate for systems that print on paper as distinguished from self-luminous systems such as CRT displays.)

While hue is the same, the other two variables are determined from these formulae:

$$L \equiv (Max + Min)/2;$$

and $$S \equiv (Max - Min)/(Max + Min)$$

if $$L \geq \tfrac{1}{2} \equiv (Max - Min)/(2 - Max - Min)$$

if $$L < \tfrac{1}{2}$$

Another way to write the expressions for saturation S is:

$$S \equiv \tfrac{1}{2}(Max - Min)/L$$

if $$L \geq \tfrac{1}{2} \equiv \tfrac{1}{2}(Max - Min)/(1 - L)$$

if $$L < \tfrac{1}{2}.$$

At the outset it can be appreciated that the definition of lightness as an average of two primary quantities, namely the strongest and weakest, is intended to—and does—ameliorate the unnatural selection (in the HSV system) of lightness as equal to the single strongest primary.

The dual definitions of the saturation S reflect the fact that HLS creates an opposed-cone color space, more similar in this regard to classical HVC than the HSV space. In this respect the HLS system may be seen as more advantageous.

Nevertheless the saturation S here remains inversely proportional to a lightness or darkness parameter L, 1−L (depending upon whether the color of interest is above or below the midlightness plane defined by L≡½). This inverse proportionality gives rise to interdependencies and confusions of the same sort as discussed above for HSV.

It will shortly be shown, moreover, that the interaction between this interdependency and the dual definitions of saturation S introduces a new element of operational mystification. This far surpasses the disorientations encountered in HSV space.

As noted in FIG. 9, the upper and lower straight-line borders of the HSL hue page—connecting the upper and lower apices on the value axis with the defined primary—are here treated as a single locus of constant, maximum saturation.

In other words, each point along each of these two lines, as well as the equatorial apex, represents the greatest vividness that can be obtained for the particular lightness value at that height on the outer surface of the color solid. This interpretation alone, without considering navigation within the interior of the solid, does violence to intuitive feelings about color.

To see that this is so, consider a color on the outer surface very near the upper apex of the solid—that is, along the top diagonal line, but near the top-left corner. This color in truth appears to have virtually no vividness at all; it is nearly pure gray, because its horizontal (radial) distance from the lightness axis is extremely small.

Furthermore on the gray scale it is nearly white, because its vertical distance from the "light" pole is extremely small. Nevertheless in the HVC system this exceedingly pale color lies along a constant-saturation line which passes through the pure-primary colorant point at the equatorial apex and so is said to have the same—namely, maximum—saturation (still regarded as a measure of vividness: as that pure-primary colorant.

Also assigned the same saturation is a color on the outer surface very near the lower apex of the solid—i.e., along the bottom diagonal line, near the bottom-left corner. This color too appears to have negligible vividness: it Is an extremely dusky or dirty color, nearly pure gray and nearly black, but lies along the same constant-saturation line as the extremely pale color point (and the pure-primary colorant) considered previously.

If two colors are compared that are both along the two diagonal outer lines, in general the system's navigational equipment reports a difference in lightness. It persists in the interpretation, however, that no difference in saturation (vividness?) can be detected.

Small wonder that a user relying upon such a system is confused! This, however, is not the end of the story.

When the user takes controls in hand and moves off the relatively safe boundary of the solid into the interior, the maneuvering rules are generally analogous to trying to drive across a large, open, seemingly structureless which requires indirect routes. To simply move to a plane of greater lightness, the user shifts the "lightness" control—but instead of maintaining 212 a color of intuitively or perceptually unchanged vividness (FIG. 10), the perceived vividness first bounds rightward 215 to a maximum and then—with no change in direction of operation of the "lightness" control—reverses field and dives back leftward 217, 217', toward no vividness.

An undesirable result arises also in attempting to simply raise or lower the vividness. In complying with such a command the HVC autopilot will necessarily set off on a horizontal course 213, and reasonable response to adjustment will be enjoyed when the user is operating in, say for example, the midlightness region (FIG. 11).

Response would be slow, however, near the apices, the very-light and very-dark regions—and after cranking on the control for a long while 213' the user may be dismayed to find that a lot of time has been wasted: the end of the adjustment range will have been reached without reaching any appreciable perceived vividness.

Perhaps the machine designer will notice these effects and select instead a lightness region some two-thirds of the way toward top or bottom apices, and assign the full adjustment range to the corresponding length of the constant-lightness line at that height. This will be an improvement—but still by definition of the system cannot meaningfully improve performance very near the apices.

Such a redefinition of the control scale would be a typical accommodation or so-called "engineering tradeoff", but now results in unsatisfactory operation 213 near the midlightness point—in the range most often used. Now the control produces relatively large horizontal (radial) steps for relatively small adjustments, trying to equalize the incremental progress at the middle of the color solid with the analogous incremental progress at top and bottom of the color solid, in terms of saturation as defined.

Unfortunately now the high effective leverage of the control knob in the midlightness range will produce relatively large changes 213 in vividness as perceived, for relatively small adjustments. The machine, in short, now oversteers in perceptual vividness, making the vividness react too abruptly to small steering corrections.

The system condenses all of the user's potentially desired range of vividness numbers into a very small part of the available range of adjustment—and wastes a large fraction of that adjustment range. (At this juncture the skilled designer may join the user in dismay: it is not only hard to control the system but hard to produce a satisfactory design.)

Such operation may be more than merely annoying if the adjustment is attached to a digital control with a relatively limited dynamic range—such as the popular numbers zero through 255. That would be a reasonable expectation, since the control system is touted as perceptually uniform and in a truly uniform system $2^8$ bits should suffice.

In this case the entire candidate range of perceptual vividness could be forced into a narrow numerical interval. With that much granularity it would be a coincidence four the user to find an available vividness that is considered suitable.

Of course the system designer has a number of available options, such as gearing the adjustment sensitivity to lightness or providing "fine" and "coarse" adjustments, or allowing the user to set the adjustment range about a desired point. To begin with, the skilled designer in general may have little-better view of the FIGS. 7, 8, 10 and 11 road maps than the user, and so may be unable to systematize the observations enough to see what the problem is.

Furthermore the designer who somehow is able to see those strange detours taking place within the color solid may not be able to perceive how to prevent them.

f. Conventional Operation of Color-Rendition Drivers

As already mentioned in section c, computer-driven color devices for printing color images on sheet media generally produce colors as blends of just a few physically present colorants—and do so by taking advantage of the observer's ability to perceptually blend physically adjacent color dots.

In a sense this technique could be said to exploit a weakness rather than an ability of the observer, who is simply unable to resolve closely adjacent fine details and instead substitutes a perception as to their composite meaning. In any event the adjacency-blend technique for constructing a color pattern, diagram, picture or other graphic is well established.

Generally a separate computational stage—sometimes even embodied in a separate apparatus—is employed to determine the assignment of different colorants to the various available dot positions in a color-halftone graphic. This colorant-to-dot-position assignment stage is sometimes called "digital halftoning" or "rendition" of the desired color.

Since this rendition driver must make decisions about actual machine colorants, naturally it operates in machine-colorant space. Commonly therefore the earlier color-compensation or adjustment stage includes at its output a conversion step in which its perceptual-space decisions are translated (often translated back) to machine language—i.e., colorant space such as RGB or CMYK—for use in the rendition.

After such a system has done its work, it is natural for a user to compare the printed results with the desired-color input on the CRT screen. Such comparison generally reveals that the rendition driver has selected, for individual dot positions, colors that do not appear at all in the on-screen definition of desired color.

It might be thought that such distortions would affect only a few isolated dots, virtually invisible in large fields of color. Even in the interiors of large fields, however, that is not reliably so. At abrupt color-field boundaries and particularly in relatively small regions of distinctive color, especially serious problems can arise.

In those contexts, conventional digital-halftoning schemes allow accumulated errors to propagate as quite visible and even conspicuous sprinklings of chromatically anomalous dots. Critical customers find such renditions unacceptable.

The system workings that produce these questionable results will now be described.

Conventional digital color halftoning has evolved from a technique developed in monochrome by Floyd and Steinberg, "An Adaptive Algorithm for Spatial Gray Scale", *Intl. Symp. Tech. Papers* at 36 (SID 1975). The original technique, for use in devices using only two colorants—black and white— attempts to make statistical decisions about pixel-printing locations in such a way as to yield a smooth rendering of desired gray-scale information.

At each printer pixel location (x,y), the decision whether or not to print a black dot is made by comparing the total desired gray information $D_k$—in terms of white $W \equiv 0$, and black $K \equiv 1$—to a fifty-percent threshold. The subscript "k" identifies the processing as relating to grayness or in other words a quantity of black colorant.

If the quantity of the total desired monochrome level $D_k$ is greater than that fifty-percent threshold, $D_k > \frac{1}{2}$, then the pixel is printed black. Otherwise it is printed white—which ordinarily, with a white medium, simply means left unprinted.

In either case, in general an error ($E_k$) is generated which represents gray information that is not yet taken into account in terms of what actually appears on the printed medium. Subsequent pixels must account for this residual $E_k$.

When a total desired grayness level $D_k$ is less than fifty percent, $D_k < \frac{1}{2}$, and a dot is therefore not printed, the error $E_k$ from that pixel position is equal to the entire amount of the unrelieved quantity $D_k$—that is, the total desired quantity $D_k$ minus the actual quantity 0, for a deficiency of $E_k = D_k - 0 = +D_k$. When the total desired grayness $D_k$ exceeds fifty percent $D_k > \frac{1}{2}$ and a dot is printed, the error from that position equals the total desired quantity $D_k$ minus the printed quantity 1, which comes to an overshoot of $E_k = D_k - 1$, a negative number.

The error information $E_k$, whether positive or negative, is weighted and accumulated in future pixel locations—typically several different nearby locations—for use when those pixel decisions are made. FIG. 12 illustrates a conventional pattern for distribution of error from an active pixel (x,y), in other words the pixel for which a print decision is being made.

As can be seen, this diffusion pattern moves various fractions of the error from the active pixel into one not-yet-reached pixel in the same row—in other words, the next pixel in line for decision—and into three pixels in the following row. Errors propagated to unused pixel positions (past the edge of the frame, for instance) simply are discarded.

More specifically, the distribution typically assigns to the adjacent pixel (x+1,y) in the same row 7/16 of the error. To the centrally adjacent pixel (x,y+1) in the following row is assigned 5/16 of the error, and to the two pixels and (x+1,y+1) adjoining that pixel 1/16 and 3/16 of the error respectively. (Various other allocation patterns have been proposed, and some have been used, in attempts to obtain visually more satisfying results.)

Later the digital-halftoning system receives or takes up each subsequent pixel for processing of the desired grayness at its location. Before making the threshold decision for that subsequent, then-current pixel, the previously accumulated grayness error $E_k$ is added to the desired grayness K at the then-current pixel.

The sum represents the "total" desired grayness level $D_k$ used in the algorithm discussed in the second preceding paragraph. In that "then current" pixel, grayness error $E_k$ in general will have been accumulated from several different nearby prior pixels.

These same procedures are described below in terms formulae:

$$D_k(x,y) = K(x,y) + P_k(x,y)$$

$$A_k(x,y) = \text{Round}(D_k[x,y])$$

$$E_k(x,y) = A_k(x,y) - D_k(x,y)$$

$$P_k(x+1,y) = E_k(x,y) \cdot 7/16 + P'_k(x+1,y)$$

$$P_k(x+1,y+1) = E_k((x,y) \cdot 3/16 + P_k(x+1,y+1)$$

$$P_k(x,y+1) = E_k(x,y) \cdot 5/16 + P'_k(x,y+1)$$

$$P_k(x-1,y+1) = E_k(x,y) \cdot 1/16 + P'_k(x-1,y+1),$$

where
K=desired grayness level, amount of black pigment.
D=decision to print pigment (computational); or "total" desired colorant quantity
E=error propagated from the active pixel
A=actual decision to print pigment
P=total previous error
P'=partial accumulation of previous error
x=column number of the active pixel
=row number of the active pixel.

For reasons that will become clear, the decision and error variables D, E, A, P and P' as well as the position coordinates x and y are here defined in general terms for any pigment.

The process continues until all pixel decisions have been made. Statistically all the desired grayness information elements K then have been used to provide the best rendering of the image.

As seen in FIG. 12, the error E generated in each pixel is typically spread out over several adjacent pixels, and a contribution from that error often can be regarded as redistributed or respread from those into further adjacent pixels—and yet further ones, and so on. This behavior of the error is analogized to diffusion of a fluid; hence the term "error diffusion".

To effectuate this plan, an error-accumulation buffer or memory is established for each pixel location x,y as the progressive rendition process approaches that pixel. Errors allocated to that pixel from others previously processed are simply added into the corresponding buffer.

In color applications, the Floyd-Steinberg method is applied to each of the components or primaries of the RGB or CMYK machine space independently. That is, the pixel decisions for each device-primary color are independent.

Precisely the same formulae shown above for black are used for each of the machine colorants, except that for each chromatic primary of course the subscript "k" identifying black pigment is replaced by a suitable designation of that primary. Thus e.g., in the case of red, representative lines of the above formulae may read (F=desired input fraction):

$$D_r(x,y) = F_r(x,y) + P_r(x,y)$$

$$E_r(x,y) = A_r(x,y) - D_r(x,y)$$

$$P_r(x,y+1) = E_r(x,y) \cdot 5/16 + P'_r(x,y+1).$$

For color machines that can print black K independently, an effort is made to extract black information from the RGB or CMY pixels, and isolate that information to drive the black-printing device. This objective is salutary, since color-black is in principle produced far more efficiently and accurately by black ink than by combinations of others.

In general, however, such systems are able to extract only a rather poor approximation to the desired black information, thereby introducing another source of dissatisfaction with final printed colors.

To effectuate this plan in a color regime, the procedure establishes not just one buffer but three or four—in any event, one buffer or memory location for each machine pigment in use—for each pixel being approached. Error contributions can now be separately added (taking account of their algebraic sign of course) for each primary colorant RGB or CMYK.

The procedure leads to three or four actual print decisions $A_r$, $A_g$ and $A_b$—or $A_c$, $A_m$, $A_y$ and $A_k$ as the case may be—one for each colorant. In every way the decision for each pigment proceeds independently, to either print one or more color dots (or white W—i.e., no dot) in each pixel position.

In event the system decides to print more than one colorant in a single pixel, that is exactly what occurs: the pigments mix and the resulting color is formed by the combined influences of the colorants. As suggested already, it is often assumed that they will operate in linear superposition to produce the results predicted by a subtractive color law.

As indicated at the outset, the rendition system just described allows dots of all colors to propagate in areas where the desired color is a shaded device primary—which is to say, a combination of a pure chromatic colorant with gray. As a particularly flagrant special case of such situations, the machine output frequently contains color information where the input color is only gray information.

These effects are readily seen in some flesh tones of scanned images, in gray-scale images, and most interestingly even in large solid fields of shaded color—for instance, those used as backgrounds in business graphics.

Another manifestation appears at relatively abrupt color transitions—sharp divisions between regions of distinctly different desired color. Often the colorants of one region diffuse into the other, blurring the demarcation.

Such performance results in color effects often perceived as incongruous. Lemons, for example, that are tinted with green dots, and lawns sprinkled with pixels of blue, call particular attention to the inability of the rendition system to track basic decisions laid down firmly at the earlier color-compensation stage.

It should be emphasized that a rendition driver produces such effects while functioning correctly as designed. That is to say, as long as operation of the halftoning driver is evaluated only in, say, RGB space, that operation may be found flawless: the colors just described as "anomalous" are perfectly valid representations of the RGB input colors to the driver.

Ironically the very characteristic that would be particularly prized in operation of a perceptual color space employed for color-compensation or -adjustment purposes—namely, independence of parameters—is here seen to be associated with major problems in operation of a machine space employed for color-rendition or -halftoning purposes.

g. Summary

Prior color generation systems suffer from two distinct failings—first at the compensation stage and then later at the rendition stage.

The first places difficult hurdles in the path of an operator or system designer attempting to obtain color effects that are natural or accurate—or simply preferred. The apparatus interprets perceptually straightforward instructions in counterintuitive baffling ways, which require the user to struggle through multiple iterations in setting up the target color effects (typically displayed on a CRT).

The rendition-stage failings defeat expectations of the user who has patiently surmounted those operating hurdles at the compensation stage and has succeeded in creating a satisfactory color scheme. The user then anticipates a printed output color rendition closely tracking the satisfactory scheme, but finds instead a rendition containing blurred image-element edges, bleeding colors, and perceptually irrelevant pigments even within broad fields.

The literature of the prior art in this field has failed to identify either of these problems in terms of basic color principles or otherwise. The prior art fails to find underlying relationships between the two problems, and fails to resolve either one.

SUMMARY OF THE DISCLOSURE

In the course of making and refining the present invention, certain insights have been gained. They explain fully the mystifying behavior of the prior color models and halftoning systems discussed above.

Those analyses will be presented in later sections of this document—together with description of the current invention in a more narrative or tutorial manner. Those later sections will permit a fuller appreciation of how the stated advantages flow from the character of the invention.

In this section the invention will be introduced only in somewhat formal ways, and its advantages simply will be stated.

The present invention has several different facets or aspects. For fullest enjoyment of the benefits of the invention, all of those aspects or facets of the invention are preferably practiced together.

As will be seen, however, significant advances over the prior art can be achieved by practicing certain of the aspects without others. For this reason the several facets of the invention will now be introduced separately.

In a first group of such aspects to be presented here, the invention is apparatus.

Now, within that group, in its first aspect the invention apparatus is for use with a visible medium. The apparatus is also to be used with desired-color information from a color-image source.

The apparatus comprises a device for causing the medium to appear colored. It also comprises a programmed information processor for receiving the desired-color information, generating device-control signals for the device and (in the course of generating them) producing a certain complex effect.

That effect includes at least these components:

A. resolving that information into hue, Fraction-Colorant and black or Fraction-Black information;

B. performing color-compensation operations upon the so-resolved information to generate the control signals for the device; and C. expressing the control signals in a form applicable to control the device.

The meaning of the term "Fraction-Colorant" will be defined analytically in a later passage. For the present it will suffice to say that this parameter is very easy to grasp intuitively—simply the component of the entire color that is made using chromatic colorant, as distinguished from nonchromatic colorants such as black, white or gray.

In addition the apparatus also comprises some means for receiving the control signals, in that device-control-applicable form, and applying them to control the device. As a verbal shorthand to retain generality of reference, these means will be called the "device-control means".

The foregoing may constitute a definition or description of the first aspect of the invention in its broadest or most general form. Even in this broad form, however, this aspect of the invention is capable of resolving most of the problems of prior-art problems discussed earlier.

In particular by producing the effect of resolving the desired-color information into hue, Fraction-Colorant and black information the apparatus produces the effect of embodying the desired-color information in a form which is amenable to manipulation in a perceptually correlated way. That is true for two reasons:

(1) true physical meanings of the parameters Fraction-Colorant and Fraction-Black—as will be seen are intuitively grasped much more readily than the true physical meanings of the artificially defined "saturation" parameters and "value" or "lightness" parameters of the prior systems discussed earlier; and (2) the three parameters of the set are much more nearly independent than the parameters of the prior-art color spaces previously developed for apparatus that causes media to appear colored.

These characteristics make manipulations of color more tractable for two different kinds of color-space users. Those beneficiaries are (1) end-users of equipment which has controls that are manual, and (2) color-system designers who wish to provide built-in color-compensation stages that are automatic.

Another advantage of the first facet of the invention, even in its general form stated above, is that—despite being an intuitively grasped and independent parameter set— the three variables stated are also more directly transformed into device-language instructions. That is, these parameters are more directly correlated with pigment information.

As a result the color information coded in this fashion (so readily suited to color-compensation operations) can also be used in the device-control means. In other words, the information in this parameter set can be applied with relative directness to driving both the rendition stage and the pigment-delivery subsystems.

As will be seen, this advantage survives, to an extent, even in systems requiring translation of the control signals into some other color space (e.g., RGB) for transmission to the device, followed by retranslation back into the specific parameters that drive the actual subsystems of the device.

A particularly remarkable result arises from the ready adaptability of this parameter set for use both as a perceptual color-manipulation space and as a rendition space: this dual adaptation in effect enables halftoning to be conducted in a perceptual space.

Consequently colorant choice at each pixel can be manipulated in terms of input color, rather than after resolution into pigment terms. Taking advantage of this capability, the system then can be made to prevent rendition-derived color artifacts—such as pixels of pigment that are irrelevant to the desired color.

It is important to recognize at the outset that Fraction-Colorant and Fraction-Black, although closely related to the Munsell concepts of chroma and value, are not to be regarded as identical conceptual equivalents of those concepts. The invention derives from a return to first principles, and development of an entirely new way of conceptualizing color.

Some part of the inadequacy of the prior-art machine systems, discussed earlier, arise as defeated expectations. That is, they come from a user's reasonable belief that the control knobs or computer-screen menu selections really correspond to abstract "lightness" or "vividness".

This is not to say that all of that prior-art inadequacy is trivially semantic—i.e., merely a failure to put meaningful words next to the operating controls. The problems of those systems cannot be cured by merely describing to the user what the controls really do.

The reason is that in the actual working of each control the levels of abstraction used are simply too great to be grasped by most users. It is not the parameter names (e.g. "saturation") but their distorted physical significance—chroma corrected for lightness, or saturation normalized to the system gamut but symmetrical relative to the midlightness plane—that is intellectually unmanageable.

This will be demonstrated fully in a later dissection of how the earlier systems operate. The parameters of the present invention, however—being quite acceptable to users at a rudimentary level of color understanding, and also being comprehensible correctly at that level—create user expectations which can be satisfied rather than defeated.

Thus the first aspect of the invention even in its broadest or most general form does resolve most of the prior-art problems introduced earlier. Nevertheless for fullest enjoyment of its inherent benefits the first aspect of the invention is preferably practiced in conjunction with certain other features or characteristics.

In particular, the foregoing text points out that the programmed information processor is for producing the effect of the resolving, performing and expressing steps enumerated above. Preferably the processor actually comprises neither means for directly so resolving the information nor means for directly performing the color-compensation operations.

It is preferred that the processor instead comprise means for selecting values from a reference table, prepared in advance for a large number of desired colors, to produce the resolving-performing-and-expressing effect. This shortcut permits use of a processor with far more modest capabilities, and yet completes the entire process in a small fraction of the time—perhaps a thousandth of the time.

The reference table incorporates the influence of the resolution into substantially hue, Fraction-Colorant and black information. The table also incorporates the influence of the color-compensation operations, and expression of control signals in a form applicable to control the device.

The information processor comprises means for selecting values from the reference table to produce the resolving-performing-and-expressing effect. In addition, it is further preferred that the table-defining means in turn include some means for defining not one but two or more reference tables.

One reason for this last-mentioned preference is that the apparatus can be for use with any one of a plurality of different types of visible medium. For instance, if the device is a machine for printing on sheet media, the different types of medium may be plain paper, glossy paper, vellum paper or some other special type of paper, or transparent plastic sheet for making color transparencies.

In this case, the table-defining means comprise means for defining a plurality of tables, each as described for the single table above. Here each table further incorporates the influence of use of the apparatus with a respective one of the plurality of different types of visible medium.

Another reason for the desirability of defining more than one table is that the device-control means may comprise some means for performing color rendition—so-called "halftoning"—using any one of a plurality of different halftoning styles. In this case each table incorporates the influence of using a respective one of the plurality of halftoning styles.

It is preferred to provide tables that incorporate the effects of crosscombinations of different halftoning styles and different media.

In addition, advantageously different tables are provided to incorporate the effects of different color-control decisions. Preferably, for example, an operator may wish to have the discretion to select between printing color (1) substantially as it appears on a display screen or (2) with a clear, straightforwardly comprehended color modification.

Such modification can be incorporated in a particularly efficacious manner using the present invention. As already noted the hue/Fraction-Colorant/black parameter set is especially well adapted to perceptually meaningful color adjustments—which can then be communicated efficiently and effectively to a device.

Thus preferably it is desirable to provide the user with a capability to make the printout, for example, more vivid than substantially appears on the display screen. With reference to the earlier discussions of prior-art color spaces, it will now be appreciated that the user will expect such increased vividness to be obtained without change of blackness or hue.

In the hue/Fraction-Colorant/black parameter set, precisely such a change can be obtained by increasing the Fraction-Colorant without any other change. Fraction-Colorant corresponds very closely to vividness of perceived color, though not to the artificially defined "saturation" parameters of either the HLS or HSV system used heretofore.

This enhanced capability of a color device can be effected using the table-look-up configuration already described. In this case different tables are provided for different color-control decisions.

Thus pursuing the example of increased vividness, each table incorporates the influence of using a respective one of a plurality of different Fraction-Color settings. Preferably tables are provided incorporating the influence of crosscombinations between different Fraction-Color numbers, different media and different halftoning styles.

It is found that providing just a single increased-vividness (higher Fraction-Color) setting represents a substantial enhancement in the capability of a sheet-medium color printing device. This enhancement is very cost-effective; it is obtained at the incremental cost of only doubling the number of crosscombination tables.

In a second aspect of the invention, still within the first group, the apparatus is again for use with a visible medium. Here it is specified that the medium is capable of visible-light projection.

This word "projection" is hereby defined for purposes of this document, and particularly for use in certain of the appended claims, in a special way. The term shall be understood to encompass both reflection and also other ways in which media can interact with light.

One example of such other modes of light interaction is transmission—relating to situations in which a medium (e.g., transparent plastic sheeting or another type of visible medium) after being colored is viewed in transmitted rather than reflected light. Another example is emission, relating to situations in which a sheet or other medium is made to appear colored through use of, for example, phosphorescent or fluorescent substances; etc.

The apparatus of the second aspect of the invention also is for use with information from a color-image source that defines a desired color for at least one particular region of the medium. The apparatus comprises a device for causing such particular region to appear colored.

That device, in turn, includes at least these elements:
(1) some means for causing the particular region to selectively project visible light of an associated first device-primary color—and for use in connection with this color exclusively, and
(2) some means for causing the particular region to selectively project visible light of an associated second device-primary color—and, again, for use with respect to this color exclusively.

For some definiteness in referring to these two elements, the first-mentioned one will be called "a first device-primary means"; and the second, a second device-primary means". It is not intended to suggest that no more than two "device-primary means" are allowed; therefore in certain of the appended claims there appears the language "at least a second device-primary means".

The word "project" is to be understood in the same sense as the related form "projection" defined above.

A device-primary means may typically be embodied as a subsystem for discharging colorant, or for actuating or stimulating a predeposited or embedded colorant to actually become colored, and so on. Many different kinds of means for causing the particular region to selectively project visible light are contemplated within the scope of the invention.

Both the first device-primary means and the second device-primary means are "exclusively" for causing the particular region to selectively project visible light of a respective device-primary color—namely, the first such color and second such color, respectively. The word "exclusively" thus is to be read only as limiting the color which the device-primary means causes the region to selectively project.

Thus the word "exclusively" is not to be interpreted as a limitation that the device-primary means must have no other ancillary functions. To the contrary, the device-primary means may indeed have other functions, such as interlocks for generating automatic alarms when colorant is exhausted or when a colorant discharge system is clogged, quick-release-and-insertion mechanisms, etc.

The apparatus also comprises a programmed information processor for receiving the desired-color information, generating device-control signals for the device, and producing—once again—a complex effect. Here the effect produced by the processor is expressed in four parts:

A. First, the effect includes resolution of the desired-color information into substantially at least:
  (1) Fraction-Colorant information, namely the size of exclusively the chromatic fraction of the desired color, said Fraction-Colorant information being determined substantially directly from such desired-color information, and
  (2) hue information;

B. Second, the effect includes color-compensation operations upon the so-resolved information. The effect includes taking into account known Fraction-Colorant-distortion-introducing and hue-distortion-introducing characteristics of other parts of the apparatus.

One such part of the apparatus is the device and the color-appearance-causing device. Another part of the apparatus is device-control means which will be described shortly.

This second part of the effect includes color-compensation operations that take into account the distortion-introducing characteristics to generate at least these two types of information:
  (1) new Fraction-Colorant information that tends to nullify introduction of such Fraction-Colorant distortion, and
  (2) new hue information that tends to nullify introduction of such hue distortion.

The new hue information consists of at least these three hue-information elements:
  (a) identification of a particular one of the device-primary colors to serve as dominant primary for the particular region,
  (b) identification of a particular other of the device-primary colors to serve as subordinate primary for the particular region, and
  (c) the subfractions of the Fraction-Colorant to be allocated to the dominant and subordinate primary respectively;

C. Third, the effect includes generation of the previously mentioned device-control signals for the device, by:
- (a) applying exclusively element (a) of the new hue-information elements to generate a signal for selecting a particular one device-primary means to supply the selected dominant primary,
- (b) applying exclusively element (b) of the new hue-information elements to generate a signal for selecting a particular other device-primary means to supply the selected subordinate primary, and
- (c) applying exclusively the new Fraction-Colorant information and element (c) of the new hue-information elements to generate signals for modulating the operation of exclusively the device-primary means selected to supply the identified dominant primary and exclusively the device-primary means selected to supply the identified subordinate primary, respectively.

As will be recalled, element (c) of the hue elements is the subfractions to be respectively allocated to dominant and subordinate primary. Thus the effect includes application of these subfractions to develop signals for controlling the corresponding device-primary means, respectively.

D. Fourth, the effect includes expression of the device-control signals in a form applicable to control the device.

In addition to the device and the programmed processor, the apparatus of this second facet of the present invention comprises some means for receiving the device-control signals, and applying them to actuate the device. These "device-control means" receive the signals from the programmed information processor in the control-applicable form just mentioned.

The device-control means also apply the control signals to implement the effect produced by the programmed processor. In particular the device-control means apply the signals to effectuate the dominant- and subordinate-primary selections, and the exclusive modulation, which are parts of the effect produced by the processor.

The foregoing may be a description or definition of the second aspect of the invention in its most general or broad form. Even in this inclusive form, however, it can be seen to resolve the problems of the prior systems discussed earlier.

Generally most of the comments made in reference to the first facet of the invention apply as well to this second facet. Further specific benefits, however, can now be seen.

In particular, here it is made explicit that the system operates with respect to regions of the medium. This phrasing points up the fact that color decisions for different parts of a medium may differ—but at the same time suggests that they need not.

For example, if desired Fraction-Colorant and Fraction-Black might be set for an entire graphic, and only hue varied for different regions. Alternatively, hue and Fraction-Black might be set across the frame, and various regions distinguished exclusively in terms of Fraction-Colorant.

Further the invention as practiced in its second aspect explicitly produces the effect of correcting for known distortions of Fraction-Colorant, as well as hue, arising in the device and the control means—both stages being "downstream" from the compensation. In the process new values of Fraction-Colorant (and hue) are generated that take into account the anticipated distortions.

Even more specifically, the new hue information includes the subfractions of the Fraction-Colorant to be allocated to each of the two primaries that are active in each pixel. When applied to the Fraction-Colorant for the corresponding pixel, these subfractions yield desired quantities of the two primaries that are active at each pixel.

Because these effects are provided out in terms of Fraction-Colorant rather than in terms of, e.g., "saturation" as defined in prior-art systems, the hue and Color-Fraction distortions tend to be nullified more directly and effectively. The Fraction-Colorant variable offers a better-correlated link between perceptually desired corrections and device commands.

As a practical matter, the device is typically driven through a rendition stage, but as already mentioned that is not as remote a relationship when using the present invention as heretofore. It will be seen that other aspects of the invention—particularly relating to rendition methods—are more effective in making use of this close linkage than other types of rendition systems.

A preferred operation of the rendition driver according to another aspect of the invention will be discussed shortly. Within that rendition system, as will be seen, received information that calls for any input color (for example the dominant primary) is actually routed, saved in memory as required, and eventually applied to control the single corresponding device-primary means and no other.

Hence the better perception-to-machine correlation provided by the Fraction-Colorant variable is not merely an abstraction but can be actually carried into effect as an advantage of the invention.

As with the first aspect of the invention, however, not only is it advantageous to practice the invention in its broadest or most general form but it is particularly beneficial to incorporate further features or characteristics. Features that enhance performance include the following.

It is preferred that the color-appearance-causing device further comprise some means exclusively for causing a substantially achromatic suppression of a specified fraction of the visible-light projection of such particular region. These means will here be called the "gray-scale means".

In addition it is preferred that the programmed information processor further comprise means for producing the effect of:
- A. also isolation from the desired-color information of Fraction-Black information—namely, the desired fraction of the substantially achromatic suppression,
- B. color-compensation operations upon the Fraction-Black information too, taking into account known Fraction-Black-distortion-introducing characteristics of at least the device and the device-control means, to generate new Fraction-Black information that tends to nullify introduction of such Fraction-Black distortion,
- C. generation of further device-control signals—by applying exclusively the new Fraction-Black information to generate signals for modulating the operation of exclusively the gray-scale means, and
- D. expressing the further device-control signals in a form applicable to control the device.

In this preferred form of the second aspect of the invention, the device-control means also receive from the programmed information processor the further device-control signals in that control-applicable form, and apply them in the form to actuate and control exclusively the gray-scale means.

Thus the handling is of black information is parallel to that of the chromatic information. With addition of this independent processing of black data, however, arises a triad of striking and important new capabilities:

(1) First are the benefits directly paralleling those of the chromatic analysis above. Black is an independent parameter in the color space here described, and as will be shown this is perceptually intuitive—but in addition it is an independent element of the machine space.

Thus again there is a close link between the terms in which distortion-causing mechanisms are nullified—and other perceptual manipulations are effectuated, if desired—and the terms in which the device is controlled. This close nexus between perceptual and machine spaces yields a particularly powerful element of control to both the designer and the user.

(2) Second, independent handling of Fraction-Black information opens an opportunity to avoid the practice of representing blacks and grays by subtractive combination of chromatic colorants. That practice is both wasteful and inaccurate.

As will be seen, this opportunity is employed to particularly great effect in this enhanced form of the second aspect of the invention. Fraction-Black is derived very directly and accurately from the input desired-color information, at the very outset.

Hence the throughput from desired black to device black can be both extremely efficient in pigment usage and very linear. That throughput is interrupted only to nullify known distortions and to introduce desired modifications based on esthetic preference.

(3) Third, this handling of black information, in conjunction with the previously discussed concept of Fraction-Colorant information, produces an even more striking benefit. Subtraction of these two fractions from the totality of color available to the eye yields explicitly the quantity or size of one remaining colorant fraction: white.

Accordingly the present invention offers an opportunity to use the combination of the segregated black and white signals to effect simple navigation about the color space. The following describes how these two signals, either separately or collectively contain specific information relating to color space extremities.

The color triangle, or hue page, is formed by two lines: (1) the line, connecting white to the most saturated color—actually a color line where black is equal to zero; and (2) the line connecting black to the most saturated color—actually a color line where white is equal to zero. These two lines represent the outer perimeter of the color gamut.

Colors that are represented on the upper line, or upper gamut surface, may be accessed by simply clamping the black portion of HPG to zero. The lower gamut surface, or lower line, may be accessed by clamping the white portion of HPG to zero.

Thus in the vast majority of practical cases the system conserves on a nearly ideal basis: (a) physical coloring substance, (b) actuating energy, and (c) operating time. At the same time the invention avoids generating muddy grays, whites and blacks—with a trace of unbalanced colorant peering through the blend.

With respect to the second aspect of the invention it should be clarified that the first and second device-primary means each may be physically either a single unitary subsystem driving a single pigment, color-emitting substance, etc.—or alternatively may be a pair of such subsystems. This clarification is mentioned to take account of the commonplace need to effectuate primary colorants as, e.g., a subtractive blend of two pigments, substances, etc.

For instance in a machine for printing inks on paper, the first device-primary means may comprise a first device-primary color ink, a first pen, and a corresponding actuating circuit. Alternatively the same means may comprise a first device-primary color ink pair, a first pair of pens, and a corresponding first pair of actuating circuits.

The analogous statements are also true for the second device-primary means. Whether the first or second device-primary means is a unitary subsystem or a pair of such subsystems depends upon the desired color.

Generally in printing systems one of the two device-primary means is unitary and the other is a pair; and the first and second device-primary means normally share a particular one ink, pen and circuit.

These relationships follow from the fact that a desired hue, unless it is identically a primary colorant, is necessarily between two adjacent primary colorants. Commonly in present-day machines (but not necessarily) an even number of chromatic primaries is used, every alternate one of which is present in the device physically as a respective single coloring substance.

In such systems, therefore, one of every two adjacent primaries corresponds to a coloring substance physically present in the device, and the other of the two is formed as a blend of two physically present coloring substances. All this will be more clear from the detailed description following.

In a third of its facets or aspects, the invention is apparatus for generating a hardcopy output corresponding to a representation on a display-screen device. This apparatus comprises a black-pigment printhead, and a plurality of different color-pigment printheads.

The apparatus also comprises some means connected to the printheads for selectively activating the black- and color-pigment printheads. For definiteness of reference as above, it will be convenient to identify these means as the "driver means".

The driver means in turn include some means for modifying component inputs received from the display-screen device. These means will be identified as the "color-compensation means".

According to this third aspect of the invention, operation of the color-compensation means is based on a color model having these three parameters:

hue,
Fraction-Colorant, and
Fraction-Black.

Now this third facet of the invention, though once again expressed generally, has many advantages noted above for the other aspects. It more explicitly makes those benefits available for devices—such as printing devices—that place pigment on a hardcopy.

It also more explicitly links those benefits to such devices that are driven by applications programs employing color setup on a CRT, LCD or other color-display screen.

In a second group of aspects or facets of the invention, the invention is a method.

Within that group, in its first aspect the invention is a color-halftoning method for actuating a color-generating machine to cause a visible medium to appear colored. In particular the method is for causing the medium to appear colored in correspondence with desired-color information from a source of such information.

The method comprises several steps. The first step is receiving from the source the desired-color information, and if it is not expressed in perceptual parameters then resolving that information into perceptual parameters.

Another step is then utilizing the information, while it is expressed in terms of the perceptual parameters, to generate rendition-decision information. The latter information represents a specific colorant at each pixel location of the machine, respectively.

A further step is applying that rendition-decision information to control the machine by selecting specific subsystems of the machine for actuation in relation to specific pixel locations, respectively.

The foregoing may constitute a description or definition of the first method aspect of the present invention in its broadest or most general form. Even in this form this facet of the invention resolves the objectionable characteristics of prior halftoning systems described earlier.

More particularly as will be recalled those earlier systems produce dots of individual colors not individually related to the desired color. Although there is presumably some relationship when the entire array is viewed on some sort of averaged basis, the dot colors considered individually are irrelevant to the desired color.

A key to understanding this undesirable result can be found in one statement in the prior-art section on rendition drivers. The proposition is that because a halftoning system must control decisions about machine colorants, "naturally it operates in machine-colorant space."

The idea indeed is natural enough, but it lies at the root of the problem. This mode of operation typically entails translation from perceptual-space parameters to RGB or CMYK, preserving no identification of the actually desired color.

In other words, downstream of that translation the system loses track of the perceptually desired input color. The rendition driver has only information about the machine colorants from which that input color is to be constructed.

Since the target color is unknown, the system must work with accumulated residual fractions of errors from various earlier pixels. These propagated Floyd-Steinberg error numbers are unrelated to the perceptual color space used earlier in the color-compensation stage.

In fact these residuals from time to time do cumulate to colors not in the original—and nothing constrains the system from actually printing any colorants which thus pop out of the error-residual diffusion process. At the end of the process, the resulting pixels are combined for evaluation only spatially on the visible medium and perceptually by the observer—never within the rendition driver.

It is this mode of operation which leads to anomalous scatterings of alien colors, particularly but not only near abrupt color edges or small, distinctly colored image fields. The blurred image edges and bleeding colors across such edges follow directly.

The invention as described above provides the means for correcting this problem: it operates in perceptual space. It does preserve information about the desired color, enabling use of that information to screen the candidate colorants in the final colorant-selection process. In jargon of the present day, Such a process, may be described as an ongoing "reality check".

Although the invention as described above thus enables resolution of the problem, preferably the invention is practiced in conjunction with further features or characteristics that optimize its potential benefits.

In particular the invention in its first method aspect preferably further comprises an additional step after the information-utilizing step. That step is restating the specific colorant, at each pixel location, in terms of machine parameters—if its perceptual expression is not correctly interpretable as already being in machine parameters.

Here it is to be understood that the machine parameters correspond uniquely to separate physical coloring means employed by the machine. The applying step comprises addressing independent control signals to actuate separate subsystems of the machine which are associated respectively with the separate physical coloring means.

These subsystems further are controllable with respect to the pixel locations. In consequence the method effectuates a specific assignment of the separate physical coloring means to each pixel location.

It will be seen that there is a further key to especially effective application of the perceptual information to drive the color machine. That key is selection of a particular perceptual language that has an adequately close relationship with those signals—that is to say, with the language of the machine.

In addition it is preferable that the information-utilizing step comprise a further substep, performed after generating the rendition-decision information for each pixel. It consists of also determining for that pixel a resulting color error expressed in terms of the perceptual parameters.

Moreover it is preferable that the information-utilizing step comprises a further substep, performed after the error-determining step for each pixel. That step is distributing the color error, expressed in terms of the perceptual parameters, to other specific pixels for which the information-utilizing step has not yet been performed.

Also it is preferable, after the error-distributing substep, to later perform the rendition-decision generation and then the error-determining substep and then the error-distributing substep many times cyclically in that order but with respect to said other specific pixels. Before each such later performance of the rendition-decision generation, it is desirable to first incorporate into the desired color, for that pixel location, said color error distributed to that pixel from other pixels for which the error-distributing step was performed previously: this error-incorporation is to be performed in terms of the perceptual parameters.

A second facet or aspect of the method of the present invention is also a color-half toning method for actuating a color-generating machine. The machine is actuated to cause a visible medium to appear colored in correspondence with desired-color information from a source of such desired-color information.

The method comprises the step of receiving from the source the desired-color information, and resolving the information into substantially hue, Fraction-Colorant and gray. This resolving function is performed only if the desired-color information is not already so resolved.

The hue, Fraction-Colorant and gray are expressed in terms of fractions of four active colorants, which are defined for each pixel location of the machine as:
dominant primary,
subordinate primary,
black, and
white.

The second method aspect of the invention further comprises the step of then utilizing the information, while it is thus resolved substantially into hue, Fraction-Colorant and gray, to generate rendition-decision information. The rendition-decision information substantially represents specific desired hue, Fraction-Colorant and gray at each pixel location of the machine.

The rendition-decision information comprises a selection, for use at each pixel location, of a respective single colorant that can be implemented on the machine.

The invention in this aspect includes the further step of then determining a dispersable error resulting from use of said single colorant instead of substantially said desired hue, Fraction-Colorant and gray. A still further step is then dispersing said error substantially in terms of hue, Fraction-Colorant and gray to selected other pixel locations that are nearby.

Furthermore practice of the invention in this second method facet also comprises the step of—after the information-utilizing step—applying information related to the single selected colorant to select and actuate one or more specific corresponding subsystems of the machine.

Once again, while the foregoing may represent a description or definition of the invention in broadest or most general terms, even in such terms it can be seen to resolve all the difficulties of the prior art. Generally the above comments about the resolution of those difficulties by the first method aspect of the invention are applicable here as well.

Furthermore, interacting very beneficially with the favorable effects of that first aspect are advantages of the particular parameter set employed here. Simply because these parameters form a particularly advantageous perceptual space—by virtue of its parametric independence and its intuitive character—the fundamental thrust of the first aspect of the invention is effectuated in a particularly satisfactory way.

The second method aspect of the invention goes well beyond that advance, however. The salient benefit of this facet of the invention resides in the very direct relation between the hue/Color-Fraction/gray color space and the machine parameters.

That is, once the work has been done in terms of perceptual parameters, little is lost in the translation to machine operation. That is, in fact, because very little translation is needed.

Again it is preferable for optimum enjoyment of the benefits of the invention to incorporate certain other features or characteristics. For example, it is preferred that the error-determining step comprise expressing the dispersable error in terms of fractions of the primary colorants.

For purposes of expressing the second method aspect of the invention, the primary colorants are defined as:
the chromatic colorants, and
black, and
white.

It is further preferred that the error-dispersing step comprise contributing a portion of each of the dispersable primary-colorant error fractions to each of the selected other pixel locations, respectively. Preferably this contribution is performed substantially in accordance with a geometrical weighting pattern.

Also the method preferably comprises the further step of cumulating separately for each primary colorant, for each said other location, the error contributions from all pixels contributing thereto. In addition the utilizing step preferably comprises, in generating the rendition-decision information for each particular pixel, these substeps:
further determining, from the desired-color hue, Fraction-Colorant and gray, these additional elements of the desired color:
(a) identification of the desired dominant and subordinate chromatic primary colorants, and
(b) the desired fractions of all four active colorants;
then, for that particular pixel, adding the desired fractions of the four active colorants to that pixel's cumulated errors for the corresponding four primary colorants, respectively, to determine four respective composite errors for that pixel before printing; and
then making a decision to print, at the particular pixel, that one of the four active colorants which has highest composite error.

As can be appreciated this preferable mode of operation has the effect of actually constraining the information-utilizing step using the perceptual information.

A third method aspect or facet of the invention addresses a constraint principle independently, and without reference to use of a perceptual color space. More specifically, the third method facet is similarly a halftoning method for actuating a color-generating machine that employs a plurality of colorants, to cause a visible medium to appear colored in correspondence with desired-color information from a source.

The method comprises the step of receiving from the source the desired-color information. It also comprises the step of then utilizing the information to generate rendition-decision information representing a specific colorant at each pixel location of the machine, respectively.

This information-utilizing step includes these two substeps:
expressing the desired-color information in terms usable for constraining the number of colorants employed by the machine, and
constraining the generation of rendition-decision information to select only colorants having at least some specified degree of relationship to the input color expressed in said terms.

In addition the method includes the step of applying that generated rendition-decision information to control the machine. More specifically, it applies that information to select specific subsystems of the machine for actuation in relation to specific pixel locations, respectively; and actuate those specific substances in relation to specific pixel locations.

This general expression of the third facet of the invention would greatly ameliorate the prior-art problems discussed earlier. Its practice in conjunction with certain other features or characteristics, however, is preferred.

For example, preferably the degree of relationship mentioned above is that the selected colorant at least be one of a limited number of colorants that would be used as component colors or primaries to construct the input color alone. As will be seen, if this condition is to have significance, there is in turn implied some further limitation on the choice of perceptual space, for some systems may utilize fractions of all available colorants to form colors.

For best results the most highly preferred mode of practicing the invention is to incorporate all of the several above-presented apparatus and method facets together in a single system.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

In order to fully appreciate the operation of the present invention it will be helpful to first understand the internal operations of the two prior-art color spaces discussed in detail earlier. Unfortunately the prior art apparently has not provided an understanding of those color spaces adequate to explain the very puzzling responses of those earlier systems to color-adjustment commands.

Only in the process of completing the present invention has it become possible to obtain a more-detailed understanding of the reasons for those seemingly irrational responses. Therefore the explanations are presented here rather than in the earlier prior-art discussion.

1. Deeper Understanding of the Prior-Art "HSV" Color Space

Figure 7:
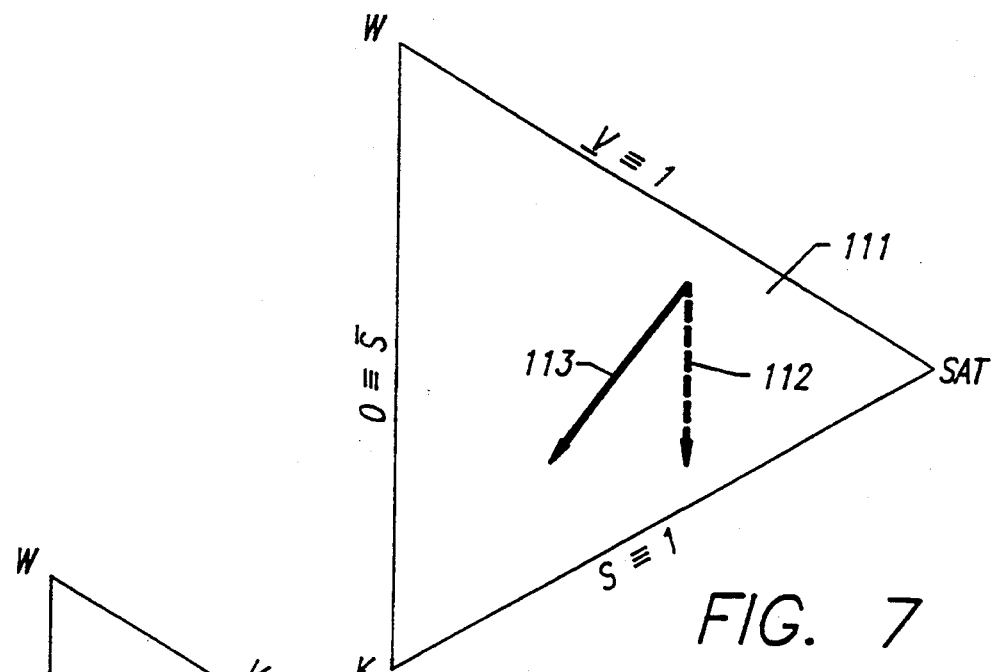
FIG. 7 represents an idealized or highly regularized hue page in the HSV color space—very generally analogous to any of the four FIG. 5 hue pages—and including a showing of response in an HSV system to attempts to obtain darker color exclusively.
Figure 8:
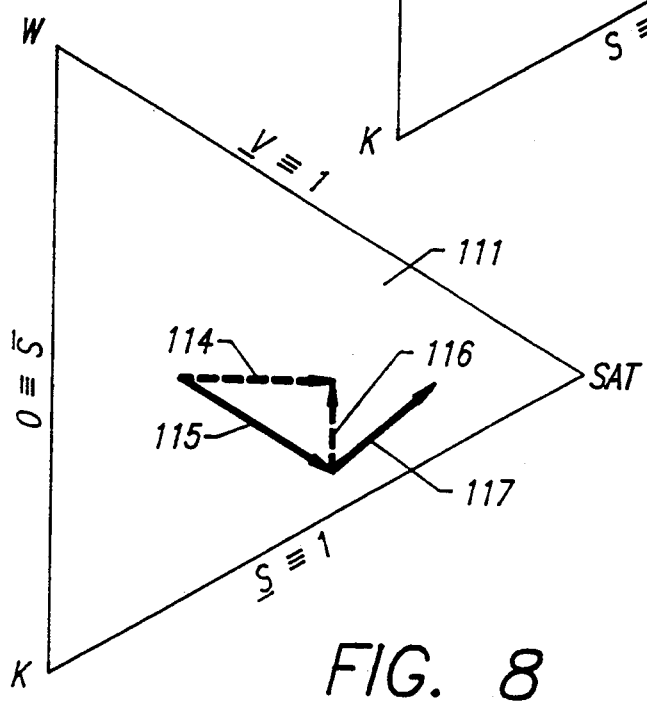
FIG. 8 is a like representation showing response to attempts to obtain more-vivid color exclusively.
Figure 13:
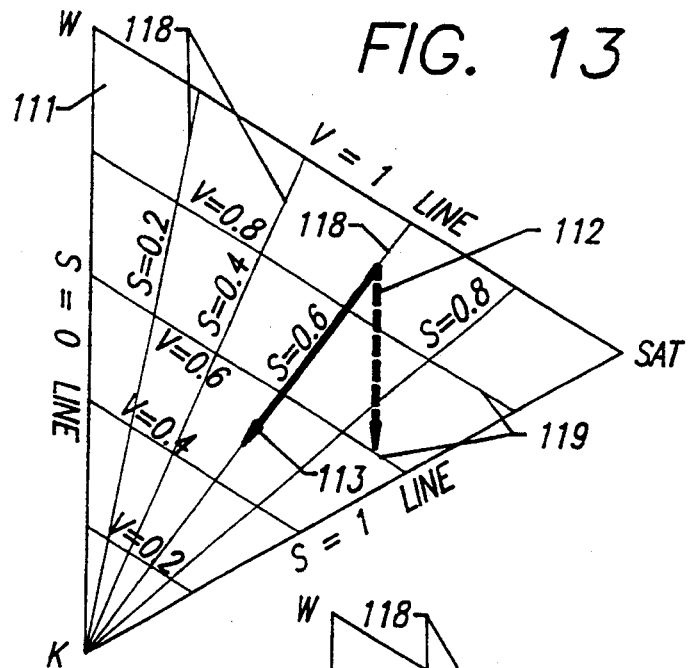
FIGS. 13 and 14 are HSV hue-page diagrams like FIGS. 7 and 8 but with internal lines of constant parameters S and V.

FIG. 13 is a representation of the same HSV hue page as in FIGS. 7 and 8. Also included in FIG. 13, however, are nomographic lines within the interior of the hue page—showing the internal structure of the color space.

In particular FIG. 13 includes not only the upper diagonal line representing value $V \equiv 1$, but also other interior lines 119 parallel to that line and representing other constant values V; for each of these lines the associated constant-value numbers are fractions.

These additional lines of constant value V may be regarded as intersections between cones of constant lightness and the hue page.

Also drawn on the hue page are analogous internal lines 118 of supposedly constant vividness—but in any event constant "saturation" S as defined in the HSV model. More specifically, these lines of constant fractional saturation S radiate at various angles from the black point, at the bottom vertex of the hue-page triangle.

Figure 6:
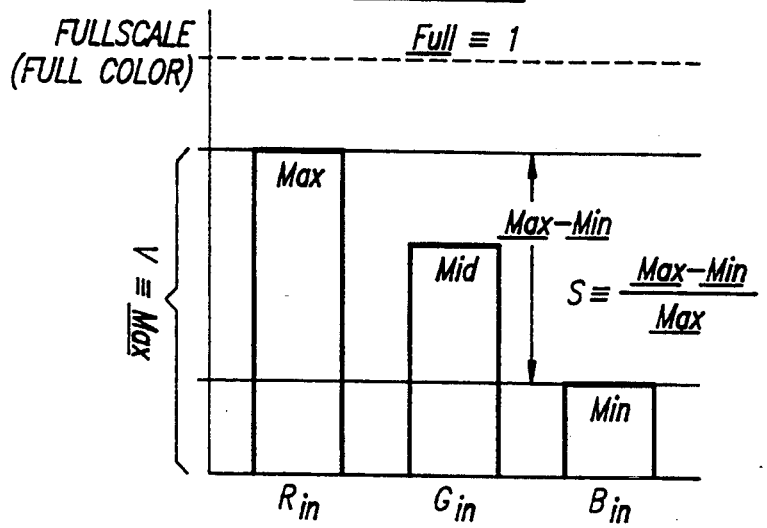
FIG. 6 is a mixed graphical and mathematical representation of the relationship between RGB and HSV color spaces.

The loci forming these various lines can be inferred from the RGB-HSV relationship just discussed in reference to FIG. 6—or, more specifically, from the mathematics commonly employed in working intimately with the HSV system.

FIG. 13 reveals the color-space rationale behind the strange behavior plotted in FIG. 6. When a user moves from a starting position by adjusting value V to decrease the lightness, the system constrains movement to a line of constant "saturation" S as defined.

Within the internal logic of the color space, this is sensible. The idea is that pure change of value V should hold "saturation" S constant.

Unfortunately, however, each such constant-"saturation" line, as seen in FIG. 13, is at some angle to the vertical. Therefore instead of following a desired vertical path 112, drawn dashed, the system instead takes the solid-line route 113 which follows a leftward-and-downward inclined constant-"saturation" line $S=0.6$.

Figure 14:
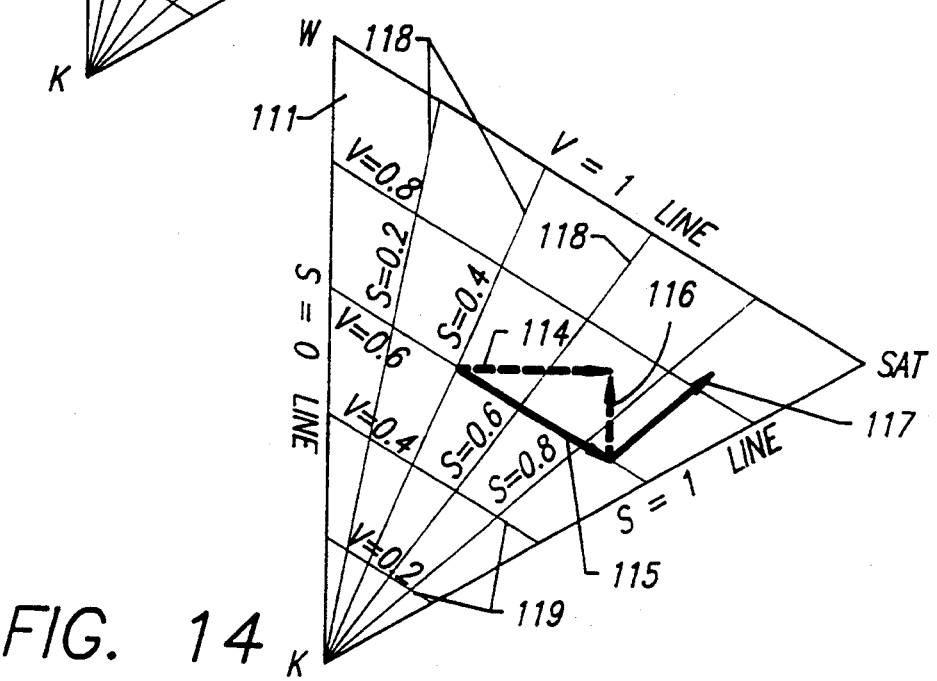

FIG. 14 discloses the similar rationale behind the peculiarities of FIG. 7. Here the user moves from the starting position by adjusting S to increase saturation—intending to move along an outward horizontal path 114, again drawn dashed.

The system responds now by following 115 instead the downward-inclined constant-value line $V=0.6$ to a point of increased vividness but decreased lightness. Once again the philosophy of independent variables says that a pure change of the "saturation" variable S should hold the value variable V, as defined, constant.

The reader—but not the untutored user—perhaps can now predict that the HSV control system will interpret the instruction as a command to increase saturation S as defined without changing value V. This means outward movement along a line of constant value.

All such lines, unfortunately, are angled downward and outward relative to the horizontal. Therefore outward (toward-vividness) movement obtained with the "saturation" control alone is necessarily accompanied 115 by downward (toward-darkness) movement.

If the user later tries to compensate by adjusting the lightness control to move 116 vertically, the system responds instead by moving along a constant-saturation contour 117, very roughly $S=\frac{2}{3}$ in the drawing. Because this is angled upward from the vertical, the attempt will also rapidly increase the vividness.

Figure 9:
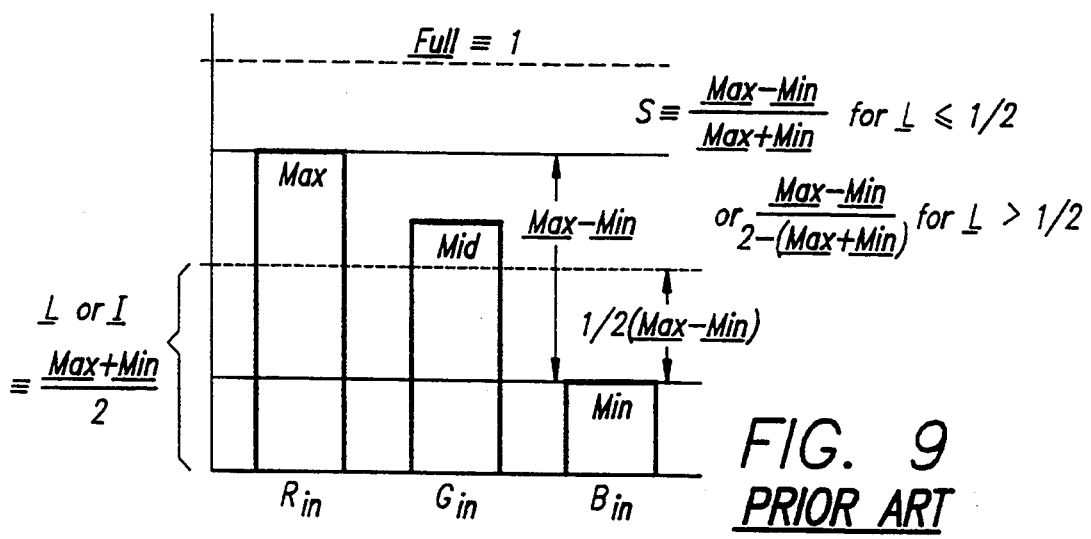
FIG. 9 is a representation, analogous to FIG. 6, for RGB and HSL color spaces.

The user would have to see and understand FIG. 9 to comprehend how to maneuver from one desired point to another. Even then it would be difficult, as will be shown momentarily.

In any event the user is not likely to be afforded such an opportunity. That would be tantamount to confession that the color-model which the device designers selected—presumably on purpose—to control the color device is an unfathomably nonperceptual one.

It was observed in the earlier discussion of FIG. 7 that the internal structure of the HSV space will also confound the user's efforts to achieve mental calibration. This can now be seen easily by comparing the sensitivities, as seen in FIGS. 13 and 14 respectively, of vividness change to lightness change.

As mentioned earlier, the angle of the constant-saturation lines varies with position within the hue page. In FIG. 14 the attempt to move upward occurs while the system is operating at a different point (lower) in the diagram, where the constant increments of lightness are spaced differently (further apart) along the constant-vividness lines than previously.

This means that the $S=0.8$ line followed upward in FIG. 14 is angled even more from the vertical than the $S=0.6$ line followed downward in FIG. 13. Consequently the apparent vividness will increase much more rapidly now than it decreased in FIG. 13.

In order to reach the desired point at the tip of the horizontal outward dashed arrow without iteration, the user would have to stop increasing vividness long before the apparent vividness reaches the desired visual effect. It would be necessary to stop at a point just past the $S=0.6$ line, and then move outward along an intermediate contour of roughly $S=0.7$, to achieve the desired effect in only two manipulations.

Still another now-evident failing of the system arises at the bottom vertex, where all constant-saturation lines converge. Theoretically for the HSV space the entire saturation range is compressed progressively toward zero as the system approaches the $V=0$ pole—where by definition saturation S is indeterminate.

In this region, as in the HLS example discussed previously and elaborated below, the sensitivity of the system to adjustment of saturation S differs drastically from that found in the middle to high range of V.

2. Deeper Understanding of the Prior-Art "HSL" Color Space

Figure 10:
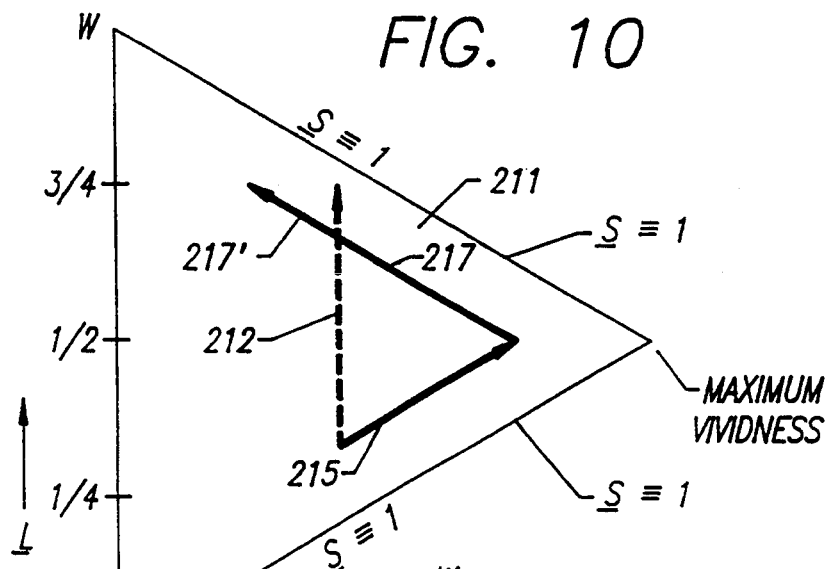
FIG. 10 is a representation, analogous to FIG. 7, for the HSL system and showing response to attempts to obtain lighter color exclusively.
Figure 11:
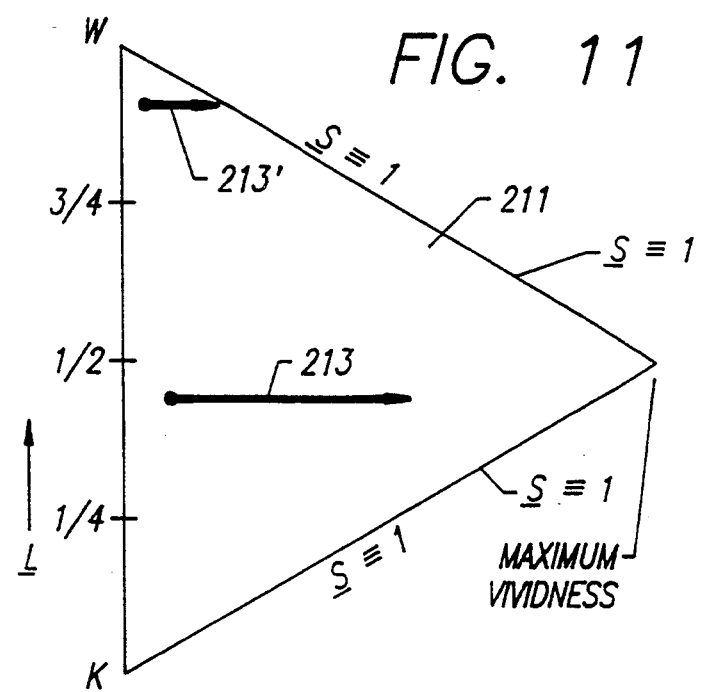
FIG. 11 is a like representation showing response to attempts to obtain less-vivid color exclusively.
Figure 15:
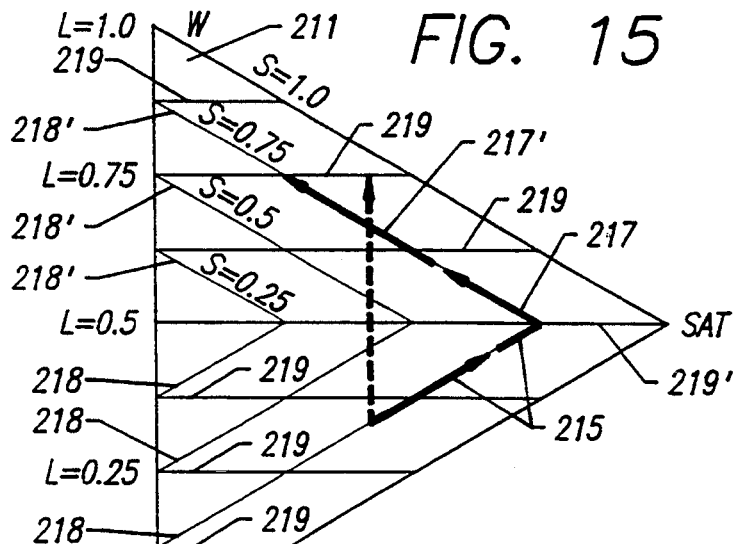
FIGS. 15 and 16 are like HLS diagrams for FIGS. 10 and 11 but with internal lines of constant parameters S and L.

FIG. 15 is a representation of the same HSL or HLS hue page as in FIGS. 10 and 11. FIG. 15, however, includes interior nomographic lines (as in FIGS. 13 and 14) to display the internal structure of the HLS space.

In the example previously discussed with respect to FIG. 10, the objective was simply to move upward along a vertical line (a dashed line as illustrated) from approximately lightness $L=0.35$ to $L=0.75$. As before, the control system demands that such a pure-lightness maneuver follow a line of constant "saturation" as defined.

All such lines 218, 218' within the solid have shapes similar to, but nested within, the two outer-surface lines discussed already in the prior-art section. The family of constant-S lines accordingly corresponds to intersection of the hue-page plane with a family of double opposed cones, each such surface representing a three-dimensional locus of constant "saturation".

Hence as a "lightness" control is operated in one direction to move upward 212, for example, from the $L=0.35$ plane below midlightness to the $L=0.75$ plane below, the system moves along the astounding path 215-217-217' shown (in solid arrows).

First it moves outward along the constant-"saturation" $S=0.75$ line 215, angling toward the midlightness line $L=0.5$ upward and outward shallowly. Then it reverses field abruptly to angle upward and inward shallowly along the upper continuation of the same line 217 of so-called "constant" $S=0.75$.

Notwithstanding that this entire movement follows what is interpreted as constant "saturation", the apparent vividness very evidently undergoes excursions that can only be described as bizarre. This can be fully appreciated upon taking into account that the lightness control continues to be operated relatively slowly in the same direction.

Given the starting position and the ending lightness number ($L=0.75$) selected for the FIGS. 10 and 15 example, the apparent vividness actually crosses over 217' its original level (corresponding to the position, in the right-to-left direction, of the vertical dashed line). Even greater crossovers are possible for other starting points.

Since all the illustrations of prior-art perceptual spaces have been defined and drawn for perceptual uniformity—and that is indeed their major claim to virtue—it is entirely fair to point out that these inner constant-saturation lines are all at very shallow angles to the horizontal. Hence the sensitivity of apparent vividness change to desired lightness adjustment is extreme, fully justifying such picturesque language as "bounds" and "dives".

Figure 16:
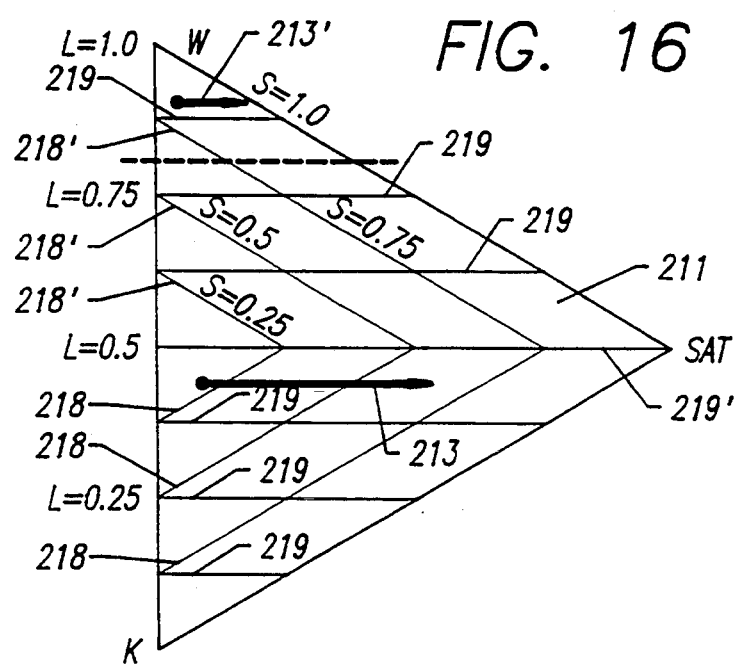

The discussion will turn now to FIG. 16. Some additional understanding can be gained for the earlier-described complex variations in the response of an HLS system to vividness adjustment at different lightness values.

Here the system is relatively well behaved in the sense that no interdependencies arise to deflect a maneuver from the naturally intended course. Pure changes in saturation, even defined in the peculiar fashion illustrated, correspond to movement 213 radially or horizontally outward along lines of constant lightness L.

Along the way the condition of the system crosses many of the chevron-shaped lines of constant saturation, producing a change in both defined saturation and actually perceived vividness. The change is proportional to increments in input saturation-control signal.

Nevertheless in a comparison of vividness responses for different lightness values, the system does not appear well behaved at all. The HLS system declares that the full range of saturation values is obtained in moving from the vertical lightness axis at the left edge of the diagram to either diagonal S=1 line at the right—regardless of position along the lightness scale.

The total perceived-vividness range, however, depends very strongly upon the position along the lightness scale—e.g., whether the user is being chauffeured along a short horizontal line 213' near top or bottom, or along a long line that passes near the midlightness point. If the machine designer assigns all these different distances to the same number of bits in a manual control system, resulting system response is sure to bewilder any ordinary user.

For example, suppose that movement along the solid rightward arrow at lightness just below $L=\frac{1}{2}$ (actually about 0.45), is made to use about half the full range of adjustment. This would be expected by comparing the length of the arrow with the full width of the hue page at that $L=0.5$ lightness level.

The small arrow at about lightness $L=0.9$ is much shorter, but as can be seen it is some two-thirds the width of the hue page at that near-apex lightness level. Therefore adjusting saturation by substantially more than the amount required to traverse the entire length of the lower, longer arrow will not suffice to move the length of the higher, shorter arrow.

Furthermore, operating the same control through two-thirds of its entire range (a patience-testing exercise for some types of equipment) would be required to take the system to the limit of maximum "saturation" as defined—i.e., to the S=1 envelope line. Once again, however, for reasons presented earlier the "saturation" parameter S corresponds poorly to vividness as perceived.

Thus in the present case, even driving the system to that maximum-saturation limit line would only produce a very low vividness. Specifically, it would be that vividness associated with the distance of the arrow tip.

That is the distance from the zero-saturation W-K axis to the S=1 diagonal, at the $L=0.9$ lightness level. This amounts to only perhaps on the order of one-quarter the full vividness range, as can be estimated from the drawing.

If system designers attempted to correct by placing a normal adjustment range in the neighborhood of the lightness level identified by the horizontal dashed line, then as mentioned earlier the operation very near either top or bottom vertex of the drawing still would be irrational. Furthermore the system would be overly responsive to the control adjustment nearer midlightness—as, for example, to obtain the adjustment suggested by the longer arrow in FIG. 16.

3. The Novel Hue-Plus-Gray Color Space

This invention returns to first principles for development of an entirely new color-management tool. The Hue-Plus-Gray (HPG) Color Model establishes a mechanism for direct controlling reproduction of the entire color palette of a color-reproduction process.

HPG incorporates the concept that renderings of a specific hue may be completely achieved by combining a quantity very closely related to the chroma of that hue with various levels of gray—hence the name Hue Plus Gray.

Hue Plus Gray is simultaneously a color space, a machine-space color vector, and a color-control concept that increases color control. It is a polar coordinate space and is designed to be consistent with the triangular shape of color palettes.

It is a particularly good color space because, for example, pale colors are never said to have full (large) saturation values. More generally speaking, the model is entirely well behaved near all its limit lines and vertices.

It is a particularly good machine space in that actual quantities of pigment put down are represented directly by color-space parameters—allowing even the rendition stage to be driven very straightforwardly in terms of the input desired color.

It is a particularly good color-control concept because it possesses better parametric independence than at least prior industrially applied perceptual spaces, and also because it satisfies reasonable intuitive expectations. That is not to say that the working parameters of HPG are precisely congruent with, for example, Munsell's HVC—for they are not.

As pointed out several times already, however, the invention returns to first principles. It is believed that a parameter set which possesses all the other striking advantages set forth here, particularly including reasonably intuitive definitions, can make slight deviations from classical concepts harmlessly.

This color model establishes a straightforward relationship between perceptual space and the color-delivery mechanism. In this model, color is divided into its two major components: chromatic and achromatic.

Each of these components in turn is subdivided into two respective subcomponents. The chromatic component is divided into two fractional components consisting of two colorants—sometimes called a primary and a secondary, but in this document more commonly called dominant and subordinate primaries, or dominant and subordinate primary colorants.

a. The Chromatic Component: control of hue and chroma

In this model, hue is controlled by combining only two colorants. The hue coordinates of the two colorants determine the range of hues can be reproduced by those two colorants. Specifically, the range is restricted to only those hues positioned between the hues of the two colorants.

As an example, hues that range from colorant 1 (here abbreviated "C1") through colorant 2 ("C2") may be achieved by applying quantities of C1 and C2 in which the fractional amounts of each range between zero and one, in inverse relationship, but summing to one.

Two favorable results are achieved by restricting the hues to those which are between the hues of the two colorants employed:

(1) Doing so removes any possibility of reproducing a hue by using colorants which are further away from the desired hue. At the rendition stage, this removes the possibility of hue artifacts common to error diffusion.

(2) Doing so also increases the ability to control hues, reducing hue errors—simply because the controlling hues are closer to the target hue.

In this model, hue can be correlated as a function of the fractional components.

Chroma is directly proportional to one coordinate of the HPG system, namely the quantity of colorant present. Chroma is controlled by controlling the quantity of colorant applied to the medium.

Chroma is difficult to control when based only on the chroma of the primaries and secondaries (or colorants). For pixel-based color printing machines the colorant in each pixel overlaps slightly with the colorant from adjacent pixels.

The resulting chroma is determined in part by the effective chroma for the hue that arises from mixing of the two colorant where they overlap. This effective chroma differs from the superposition or average of the two or several chromas nominally established by the apparatus for the primaries and secondaries in use.

In this model, the chroma component of HPG can be correlated or controlled as a function of hue. This control can be effected in such a way as to make allowance for pixel mixing of colors.

b. The Achromatic Component

Conventionally, as described earlier, the achromatic component of color is described by a single variable, value $V$ or lightness $L$. Achromatic colors, called grays, are measured by using intermediate numbers along those scales between the high and low extremes white $W$ and black $B$ or $K$. True grays have no chroma or zero chroma, and no hue or indeterminate hue.

In the HPG system the control of value is achieved by controlling the quantity of gray to be applied. In turn, a specific gray is achieved by controlling the quantity of black used—for example, in a color printing machine the amount of black pigment applied in the presence of white.

In this model, the quantity of black is also a coordinate of the system. Thus the gray component of the color can be controlled or established.

c. The Parametric Concept

The complete HPG model now will be described in terms of its individual parametric components. The color space is described fractionally so that it can be easily scaled to the color primaries of any specific delivery system.

It is also forward-compatible to machine systems which used grayscaled colorants or which otherwise increase the number of system primaries. For example the system is readily adapted to drive machines in which an orange pigment is added to CMYK.

The color space is divided into two components: the fractional part $F_c$ which is chromatic and the fractional part $F_a$ which is achromatic—i.e., gray. In this document the chromatic fraction is also called "Fraction-Colorant" and denoted by the symbol $N$. The sum of the chromatic and achromatic components produces unity:

$$F_c + F_a = N + F_a = 1.$$

The chromatic portion $F_c \equiv N$ is the principal parameter for control of chroma. It is further subdivided into two components $C_1$, $C_2$ to control hue. The fractional parts $F_{c1}$ and $F_{c2}$ required for hue control are required to fill the chromatic space:

$$F_{c1} + F_{c2} = F_c \equiv N.$$

The achromatic or gray component $F_a$ is further divided into two components to control value. The fractional parts of black $K$ and white $W$ are required to fill the achromatic space:

$$F_k + F_w = F_a.$$

In this document the variable $F_k$ is called "Fraction-Black" and also denoted by the symbol $K$.

The complete model of any color can be expressed as:

$$F_{c1} + F_{c2} + F_k + F_w = 1.$$

This form is called an HPG vector and is in a form suitable for halftoning either by ordered dither or error diffusion. This formulation allows control or so-called "printing" of white—in a machine that prints on substantially white media—as the difference $F_w = 1 - (F_{c1} + F_{c2} + F_k)$ or $1 - (N + K)$.

The HPG model is consistent with many color-reproduction processes. Compatible processes include thermal ink, thermal transfer, xerographic (sometimes called "electrostatic"), CRTs and others.

The application of principal immediate interest is the thermal ink delivery system with CMY pens producing the chromatic portion and a black pen producing the gray portion of the color. Such systems include thermal-inkjet devices manufactured and sold by the Hewlett-Packard Company, headquartered in Palo Alto, Calif.

In such devices the chromatic parameters of the HPG model are applied to drive the color pens. The gray portion, in terms of just the single parameter Fraction-Black $F_k \equiv K$, to drive the black pen.

The HPG system permits direct control of the three major color attributes—value or lightness, hue, and chroma or vividness. (Reference here is intended to the fundamental and intuitive HVC concepts rather than to their adaptations as parameters, sharing the same names, in the deficient prior color spaces that have been implemented commercially.)

Value or lightness is controlled by applying gray fractionally, e.g. by delivering black on a white medium. Hue is controlled as relative fractional proportions of two colorants—and chroma is controlled by applying this hue (i.e., actually by applying each of the two chromatic fractions) fractionally.

More specifically, hues are created using fractional combinations of adjacent dominant and subordinate primary colorants $C_1$, $C_2$. These are selected to most closely enclose the target hue.

The resulting color is shaded by inserting gray in place of some of the chromatic colorants—black to darken the color, white to lighten it. The total amount $N$ of chromatic colorant is directly proportional to the conceptual chroma parameter $V$ in idealized Munsell HVC space.

Because of good correlation or consistency with color-reproduction processes, the HPG system variables HNK or their elements $F_{c1}$, $F_{c2}$, $F_k$ can be applied with little variation in the process devices. Because the color is coded in terms which apply directly to the delivery mechanism, the HPG parameters can be halftoned directly.

Improvements in use of higher-order systems such as error-diffusion systems (as compared with clustered-dither systems for example) are particularly notable—because such rendition systems are capable of making fuller use of the benefits of the HPG space.

The HPG color space is particularly suitable for use with color-capture or color-reproduction systems—for example, systems in which a printing machine is directed to reproduce on paper a color image that appears on a display screen. Most of such systems are strongly nonlinear.

The color-space characteristics of such systems, however, correlate nicely with the HPG parameters. This correlation allows for color compensation, which is a necessary step for achievement of overall device-independence in matching the resulting printed output color to the desired input color.

Another feature of the model is that it facilitates a particularly straightforward compensation for the amount of gray in physically-available pigments. In other words the model might be said to "remove" the gray—more precisely, its effect—from the color component.

This is accomplished by adjusting the achromatic component $F_a$ to specify only the additional amount of gray needed to achieve the intended result. (Of course this is fully effective only if the intended gray is at least equal to that in the pigments.) Analogous compensations are readily made for hue impurities in any of the pigments.

d. Relationship to Usual Input-Color Parameters (RGB), in Mathematical Form

At present, conversion from the traditional representation of printing-device color is necessary because operating systems for display devices and the like are not yet available in HPG coordinates. That is by no means considered a permanent state of affairs, for—as mentioned above—the HPG model is fully compatible with at least most other practical devices.

Transformation from RGB space to HPG space, which is to say from the variable $\underline{RGB}$ to the variables HNK, is performed using three expressions. This is to be expected from the three-dimensional nature of both spaces.

The expression for hue is the same as presented in the prior-art section (specifically, in part 2-*d* on the HSV space). The expressions for Fraction-Color N and Fraction-Black K appear here:

$$N = Max - Min$$

$$K = 1 - Max.$$

In certain parts of this document the quantity Fraction-Black K is occasionally simply called "black". Although there may arise from that usage some slight confusion between the colorant black "K" and its quantity "K", the usage has been adopted in certain passages to more clearly emphasize certain other important relationships; and it is believed that the distinction will be clear from the context.

e. The Same Relations in Graphical Form

Figure 17:
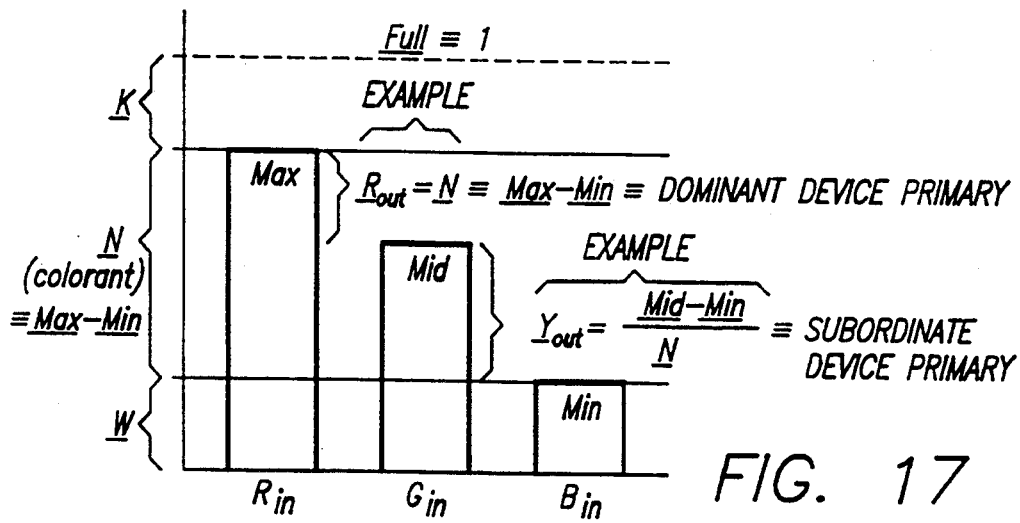
FIG. 17 is a representation analogous to FIGS. 6 and 9, for the HPG-color model.

FIG. 17 shows the above-stated relationships graphically. It illustrates how the new parameters N and K relate in an extremely straightforward and intuitive way to traditional ways of talking about color.

This way of showing these relationships graphically—like those of FIGS. 6 and 9 discussed earlier—is believed to be a novel form of representation. It is particularly helpful in comprehending the fundamental color-reproduction phenomenon.

FIG. 17 shows three input-color signals Max, Mid and Min. In the illustrated example, they happen to correspond to quantities $R_{in}$, $G_{in}$ and $B_{in}$ of colorants red, green and blue RGB respectively—but it is emphasized that this assignment is merely exemplary.

A first important fact that can immediately be seen from this representation is that the size Min (or, in the example, $B_{in}$) of the weakest input color B represents a level of colorant that is present in all three of the inputs. That is to say, the quantity Min is present in all three desired-colorant levels in common.

Although the identification of the weakest input color as blue is just an example, the broader conclusion of the preceding paragraph is not. In other words, the quantity Min is present in all three desired-colorant levels regardless of the assignments of Max, Min and Mid to specific colorants—or, even more simply, always.

This realization can next be connected with the well-known fact that equal quantities of red, blue and green when blended produce the visual experience called "white". The portions of RGB signal that are present in common simply make white, and the amount of white is equal to the size of the input signal Min always—irrespective of which colorant it is that has that signal.

Hence an HPG-controlled system can simply subtract that component of color away at the outset, identifying the corresponding fraction as the amount W of white that is required. In a machine for printing on sheet media—most typically white—this is a particularly powerful initial step, since as noted earlier white essentially comes free with the paper.

With that step completed, the remaining analysis can focus upon determination of colorant quantities to be actually deposited. In systems (for instance, CRT systems) that do not entail what might be called "free white", the great benefit just introduced is not enjoyed fully—but as will be seen shortly a corresponding advantage appears in its place.

Next attention turns to the gap, at the top of the diagram, between the full-color level Full=1 and the height Max of the strongest input colorant. This vertical gap is between the horizontal line across the extreme top of the diagram and the tallest bar, labeled "Max".

This gap corresponds to a fraction of the available dynamic range of color—but it is a fraction used neither by white W nor by any chromatic colorant RGB. The gap thus corresponds to absence of light—which is to say, darkness or blackness itself.

The height of the vertical gap is accordingly labeled K. The diagram shows that it is equal to $1 - Max$, as indicated by the equations presented in the preceding subsection.

In a printing system, black is not typically free—but ordinarily it is at least as economical as any chromatic colorant, and available in far more pure or accurate form. Hence separating out the quantity K of black for separate handling results in a certain level of economy.

Far more importantly, this approach results in a great operating efficiency and accuracy. The alternative for comparison consists of attempts to construct black by subtractive combinations of other colorants.

What is more, the corresponding advantage promised just above, for CRT systems and others unable to obtain free white, now materializes. In most of those systems, there is a colorant which is free, and that colorant is black—or at least a very dark grey.

So far it has been shown that the HPG color model deals with the nonchromatic colorants KW in remarkably advantageous and remarkably simple ways. The simplicity is in fact itself an additional advantage.

The same will now become clear for chromatic colorants as well. Since the foregoing discussion accounts completely for the achromatic elements KW of the full color space, necessarily the remainder of the space corresponds to the chromatics.

As a starting point, the full color space extends vertically from the horizontal line across the bottom of FIG. 17 to the like line Full=1 at the top. Whatever portion of this vertical distance is not used up by black and white KW must necessarily be that remainder which corresponds to chromatics.

As seen in FIG. 17, the remainder is the vertical distance between the top of the weakest desired-colorant signal and the top of the strongest one. That distance, shown in the drawing labelled N, corresponds to the difference Max−Min; thus N=Max−Min, just as displayed in the equations of the preceding subsection.

Now the upper portion of that central segment of the drawing, the part between the top of the intermediate-strength signal and the top of the strongest, can be represented by just one colorant. That is the colorant—in this document usually called the "dominant primary"—whose signal is the strongest in the particular case at hand.

For the particular input color assumed in FIG. 17, the dominant primary is red; however, once again the general statement is valid in every case: the fraction of the strongest signal which is not common to the other two can be represented by a single colorant. That colorant is always the one (whichever one) whose signal is in fact strongest of the three.

The part of the drawing corresponding to that fraction is equal in height to the difference Max−Mid. The HPG model sets the desired dominant-primary C1 output quantity $F_{c1}$ equal to this difference, $F_{c1}$=Max−Mid.

Assignment of this signal strength to the quantity of an output colorant is particularly straightforward in the present case since in many practical systems the identification part of the assignment is essentially one-to-one. Specifically, the colorant with strongest input signal is identically the colorant used as dominant primary C1 in the output device.

The remaining portion of the full color space in FIG. 17 necessarily corresponds to the portion of the Fraction-Colorant N strip which lies below the top of the input or desired-color signal of intermediate strength. The vertical height of that portion is equal to $N-F_{c1}$, and so could be calculated using that expression—but the drawing shows that same quantity is also found from the input signals directly as Mid−Min.

The conclusion is that the amount of chromatic colorant yet to be provided by the color-delivery device is $$F_{c2}=N-F_{c1}=Mid-Min.$$

It remains only to say what colorant it is that should be delivered in this quantity. In this document that colorant is usually called the "subordinate primary".

FIG. 17 shows that the remaining chromatic colorant consists of parts of the two active color bars, "Max" and "Mid". One of these is the upper part of the bar representing the intermediate-strength signal "Mid"; the other is the middle portion of the dominant-primary bar "Max" that has not already been assigned to drive printing of the dominant primary.

From the drawing it can be seen that these two adjacent color-space bars are of equal height, namely the height of that part of the bar for the midstrength input color which lies above the bar height for the weakest: Mid−Min. This is just the expression mentioned above for the strength $F_{c2}$ of the subordinate primary C2.

The desired color therefore consists of equal parts of two primaries—those whose signals are strongest and medium-strongest respectively. What is wanted in fact: is that same quantity $F_{c2}$=Mid−Min of a single colorant whose hue is the average of the hues of the "Max" and "Mid".

Exactly such an averaging combination of two equal parts of these two primaries can be provided by a single primary whose hue is substantially midway between the two. Such a single primary is attainable as can be seen from FIG. 2.

That drawing provides a reminder that the primaries RGB are spaced equally about the origin in terms of hue angle, and that three other primaries CMY occupy the alternating or in-between positions. A hue average for any particular two of the three primaries RGB thus is always available in the form of that one of the other primaries CMY that is between those particular two.

Figure 2:
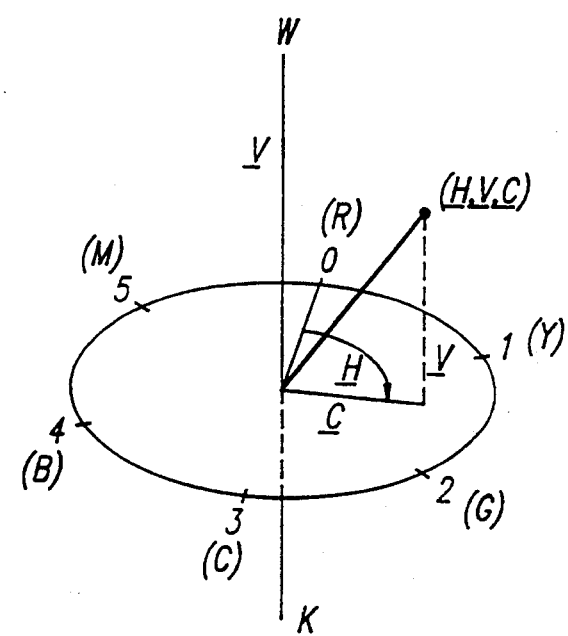
FIG. 2 is a like representation of a mixed polar/altitude color space corresponding generally to HVC or hue-value-chroma space.

FIG. 2 also shows what that subordinate primary will be for the FIG. 17 example. Specifically, it will be the primary which is midway between the red and green primaries which are strongest and next-strongest in the example; that primary is yellow. In the general case, it is the primary that lies between whichever two are strongest and next-strongest.

The primaries CMY for some purposes may be identified as "secondaries" or "complements"; however, for purposes of the present document it is more useful to designate them simply as primaries. This nomenclature helps to emphasize that in a practical case any of the six RGBCMY can be the strongest output colorant.

It should be noted that the output quantity of subordinate primary may be either larger or smaller than the output quantity of dominant primary. The matter turns only upon the relative heights of the "Max" and "Mid" bars.

If the "Mid" bar is nearly as tall as the "Max" bar, then the dominant primary will be printed only in a much smaller quantity than the subordinate primary. If the "Mid" bar is just barely taller than the "Min" bar, however, then the dominant primary will be printed in much larger quantity than the subordinate.

The subordinate primary, however, necessarily must always be one of the three primary colorants (here CMY) that are not employed in expression of the input color (here RGB), The subordinate primary always plays the role of supplying an average-hue colorant to represent the two equal-height input bar segments of length Mid−Min.

Reference once again to the hue disc of FIG. 2 will suggest that any input color must either be (1) identically one of the primaries or (2) between two of the primaries. The latter case is far more common, or at least more general; but the former case will also be stated.

If the "Mid" and "Max" bars have equal height, there is no dominant primary—or, in any event, identification of a dominant primary is indeterminate and its output quantity is zero. In that case the entire quantity N of Fraction-Colorant will be applied to drive the subordinate; as just noted, this will be one of the primaries CMY sometimes called "secondaries" or "complements".

At the other extreme, if it is the "Min" bar which has the same height as the "Mid" bar, then there is no subordinate primary—or, if there is one, its identification is indeterminate and its output quantity is zero. Then the entire quantity N of Fraction-Colorant is used to drive the dominant.

The foregoing comments may be compared with the earlier discussions of FIGS. 6 and 9, representing the corresponding relationships between RGB and HSV/HSL spaces, to better appreciate the appeal of the HPG system. Such review will reveal that—within the simple graphical presentation of FIGS. 6, 9 and 17—relatively little or no meaningful physical significance can be ascribed to the variables that constitute the prior-art parameter sets.

f. Color Compensation and Control in the HPG Model

The now-preferred embodiment of the present invention provides only relatively minimal color control as such, namely manual selection between two discrete levels of vividness as noted in the earlier "Summary" section of this document. A great part of the capability of the current preferred embodiment is accordingly devoted to color compensation rather than control.

Nevertheless, the functions used in compensation, and the relative straightforwardness or ease with which those functions can be performed, are to a significant extent the same as those used in color control. Further, a relatively full presentation of the deficiencies of prior-art control systems on a color-control basis appears in earlier sections of this document.

Figure 18:
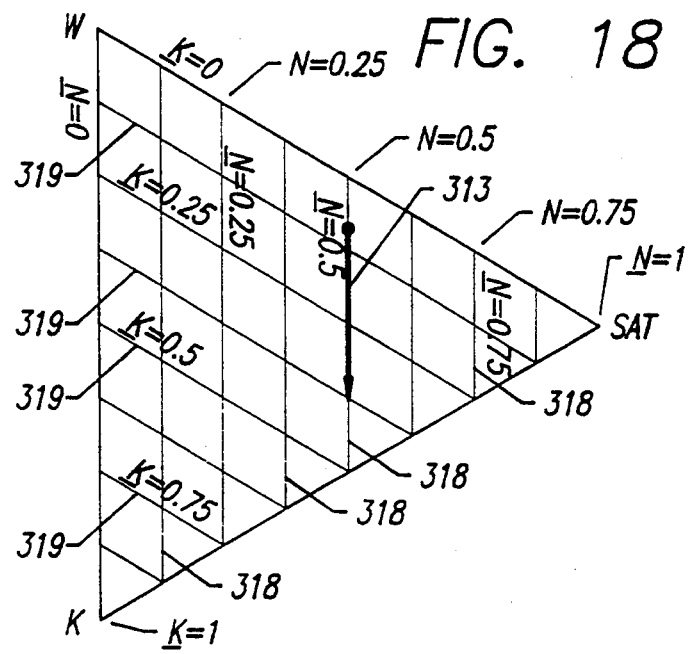
FIGS. 18 and 19 are diagrams like FIGS. 13 through 16, for an HPG hue page and increases in blackness and vividness.

Accordingly for completeness and to facilitate comparative understanding of the various systems a similar presentation will now be offered for the HPG system. FIG. 18, like the analogous nomographic drawings discussed earlier, is an idealized representation of a hue page—but now for the HPG system.

Here as in FIG. 7 the user's objective is assumed to be a darkening 313 of the color from a starting point, namely the upper end of the arrow that appears in the drawing. In HPG space, technically speaking, the perceptual or intuitive concept used actually is not darkening; rather the system operates in terms of blackening, or adding black colorant.

In purest principle thus it might be most satisfying conceptually if movement were perpendicular to lines 319 of constant Fraction-Black K. These constant-K lines 319 appear angled on the drawing—as are the constant-value V lines in HSV space, shown in FIGS. 6, 13 and 14. Hence these too correspond to plane-and-cone intersections.

An instruction to the system to decrease one variable (here Fraction-Black), however, as in the previous examples corresponds to movement along a line 318 of constant implication for the other variable—here, Fraction-Colorant N. Those lines 318 in FIG. 18 are vertical; hence the adjustment corresponds directly to vertical movement on the hue page.

Such a change fails to correspond to movement perpendicular to constant Fraction-Black lines 319. This particular departure from technical ideality, however, may be at least considered advantageous, in that the resulting descent parallel to the W-K axis is intuitively interpretable as increasing the darkness—without any conceptual change relative to the classical and intuitive HVC space.

Whether the movement is interpreted perceptually as darkening or technically as blackening, however, it will be found entirely satisfactory. The reason for this statement is that in neither interpretation can there result any change of Fraction-Colorant N—or of vividness. In this type of adjustment, both technical independence and perceptual independence of the two parameters are enjoyed.

Figure 19:
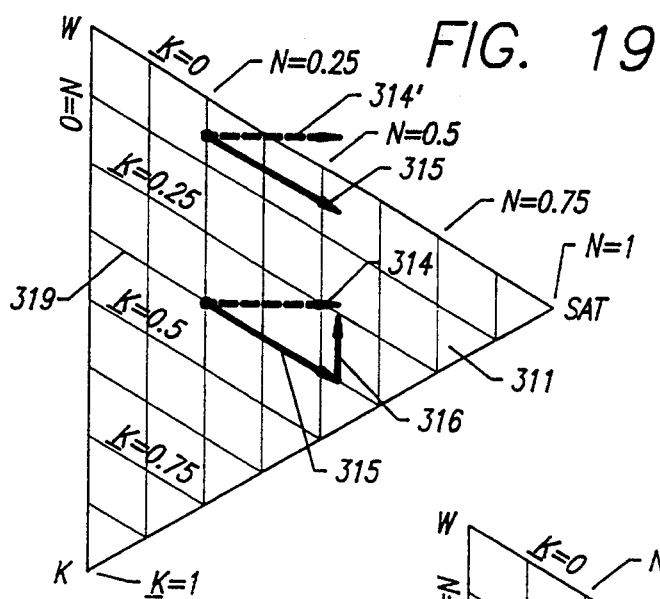

FIG. 19 illustrates the converse situation: an attempt to increase 314 vividness. Here the situation is more complicated and interesting.

The idealized HPG system interprets a demand for increased vividness or Fraction-Colorant N as an instruction to move along a contour 319 of constant Fraction-Black K. As already noted, these lines are angled relative to the horizontal.

Therefore as interpreted in classical Munsell terms the increased vividness can be regarded as accompanied by decreased lightness. An example appears as the lower, relatively long arrow 315 that angles outward and shallowly downward.

At this point, however, a better interpretation requires resorting to the parameters of the space as defined, rather than as interpreted in Munsell space. In terms of the parameters as defined, parametric independence is observed strictly and so is quite satisfactory.

The reader may now object that resorting to special definitions in the HSV and HLS systems led to exceedingly undesirable results. The unfavorability of those results, however, as pointed out earlier arose primarily from the unnaturalness and counterintuitiveness of those particular definitions employed—rather than from the use, as such, of special definitions.

In practice, therefore, it is appropriate to evaluate whether the special definitions, invoked to permit an interpretation of good parametric independence, are themselves acceptable. In the HPG model the parameter that departs from the HVC formulation is Fraction-Black K.

That parameter is not derived as a distortion of an intuitively sound variable (as is the case with "saturation" S in the HSV or HLS systems). It is not a bizarre double-valued function (as in HLS space).

Rather Fraction-Black K arises from a return to first principles and straightforward definition of an entirely new parameter. It has intuitive and perceptual integrity in terms of physical addition of colorant, to fill a color space—or, alternatively, insertion of colorant in place of a fraction of any other colorant (whether chromatic or white).

Consequently designers and end-users of systems using this parameter K can be informed of its simple meaning. They will understand readily that a constant amount of black colorant, or constant Fraction-Black K, is different from constant Munsell value V in the following sense.

Holding Fraction-Black K constant does not necessarily impose any constraint upon Fraction-White W.

The latter variable may shift in response to efforts to change Fraction-Colorant N—for the very reason that a quantity of chromatic colorant is being exchanged for a quantity of white colorant.

Holding V constant implies holding both black and white unchanged in relative amount, so that their proportions or their ratio remains static.

Thus individuals who are willing to understand what this new variable signifies will find the physical implication entirely satisfactory. They will also find the consequent darkening which accompanies increased saturation, as shown in FIG. 19, at least intellectually acceptable.

For some users, however, the objective is actually to move to a new position horizontally displaced from the starting point—in other words, as suggested by the horizontal dashed arrow 314 in FIG. 19, a pure change in vividness without any change in lightness. That maneuver in HPG space is necessarily compound, but can be performed:

(1) without iteration,
(2) without traversing double-valued parameter ranges, and
(3) without encountering any shifts (hidden or otherwise) of control sensitivity or calibration.

The maneuver proceeds in two independent steps as shown by the dogleg path in FIG. 19. That path corresponds to:

first following a downward-angling constant-K line to obtain the desired vividness (Fraction-Colorant N)—as shown by the downward-angled arrow 315, already discussed; and then moving vertically upward 316 to the desired point.

The first step 315 includes a vertical component that corresponds to giving up white in exchange for colorant. The second step 316 is a restoration of the desired white component, exchanging black for white.

In neither of these two steps is there any overshoot or undershoot, in terms of either vividness or grayness. In this regard the situation compares very favorably to those of FIGS. 14 and 15.

In FIGS. 18 and 19, all intersections between constant-K and constant-N lines are at the same angle, and the same vertical and horizontal spacings, throughout the diagrams. This means that adjustment sensitivity and calibration are uniform everywhere in the hue page.

For example, the same adjustments applied to the starting point represented for the upper arrow 315 in FIG. 19, as compared with the lower long angled arrow, will produce literally parallel behavior and lead to the same Fraction-Colorant N (vividness) level as the lower path. Similarly in FIG. 18 applying the same amount of adjustment at other points in the hue page will produce the same amount of vertical movement.

An exception to both these statements arises from the inherent fundamental character of the color space itself: not all possible amounts of lightness—or black and white colorant—have physical meaning. The manner of dealing with these fundamental limitations can make an enormous difference in the practical usefulness of a color system.

For instance a user may wish to move in a horizontal path from the starting point of the upper angled arrow in FIG. 19, as shown by the upper horizontal dashed arrow 314'. Regardless of color space employed, such a maneuver is an impossibility because the target point corresponds to colors unavailable using the color-delivery device that corresponds to the hue page—i.e., using the available pigments.

Figure 3:
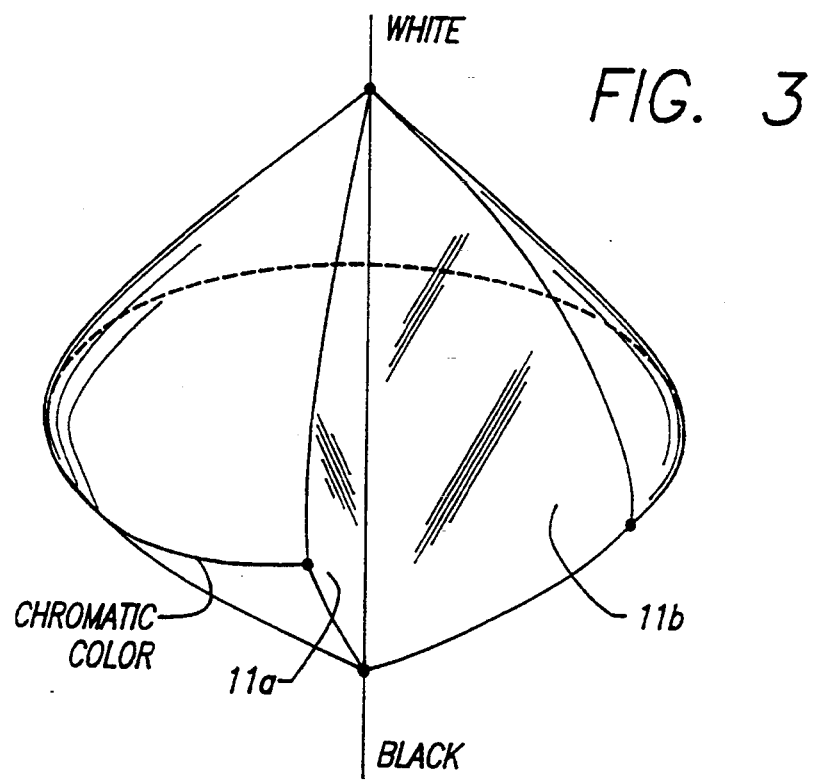
FIG. 3 is a like representation of an ideal color solid assuming an infinite selection of ideal colorants, after Judd, op. cit. at 206.
Figure 4:
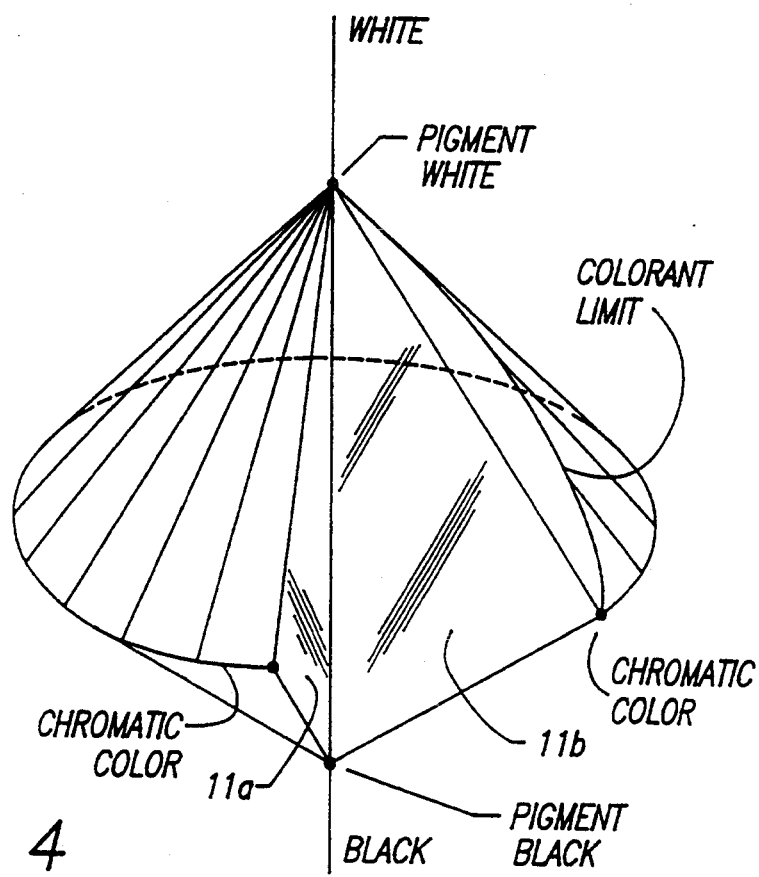
FIG. 4 is a like representation of a generalized color solid for an infinite selection of real primaries—just one per hue—id. at 214.
Figure 5:
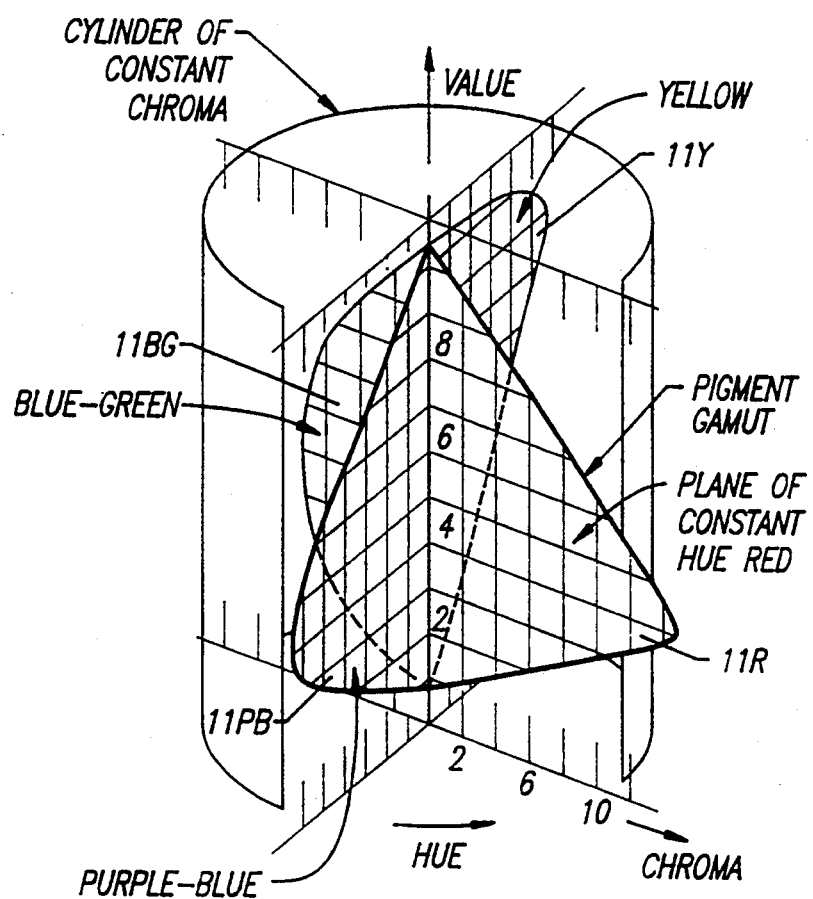
FIG. 5 is a like representation of four hue pages interrelating FIGS. 3 and 4, and showing superimposed a constant-chroma cylinder, id. at 226.

If the desired path extends far enough out of the device hue page to poke through the outer surface of the ideal color solid (FIG. 3), an even stronger prohibition arises. Such colors literally are not real: they correspond to sensations of which no human eye and brain are capable, to imaginary colors.

Similar situations arise if a user wishes to extend the vertical-arrow path 313 in FIG. 18 to and beyond the lower envelope line (K=1 to N=1)—or if a user wishes to move a system in the opposite direction, to and beyond the upper envelope line (K=0). In the Fraction-Colorant N direction, a user may wish to extend the lower-arrow path 315 in FIG. 19, for example to and beyond the lower envelope line as suggested by the lower angled arrow 315' and its dashed-line extension 314 in FIG. 20.

Logically, since no scale compression or expansion is desired, such adjustments should be within range of the controls. No system can comply with commands to attain unavailable-color or imaginary-color positions, but every system must respond in some way.

A question then arises what the best response should be, for optimum user convenience, satisfaction with the resulting color, and confidence in the rationality of the system. Major alternatives may be these:

halt operation at the color-space boundary, and leave it to the user to determine what adjustment to make next;

halt operation at the color-space boundary, and describe to the user what selections of further action are available and their consequences; then leave it to the user to determine what adjustment to make next;

proceed in a logical direction along the boundary, in an attempt to provide the closest real-color approximation to the user's objective; and pause progress at the boundary and offer the user an alternative of stopping, proceeding under system control in a logical direction along the boundary, or determining what adjustment to make next.

In each case, the system can be programmed to inform the user, first, that the boundary of available (or real) colors has been reached; and, second, what the system has been instructed to do about it. Some system designers, particularly output-device designers, may not have this option, since its implementation would be most natural through an applications program that is under control of other people.

Some system designers may prefer not to offer such information, on the basis that users will ascribe the limitation to the particular system in use, rather than to the fundamental nature of color. Such decisions are a matter of design choice.

In preferred embodiments of the present invention the first alternative is substantially excluded. It would leave most users at sea, without sufficient information to devise any reasonable action.

The second and third alternatives are both reasonable and acceptable, having complementary though minor drawbacks. The second essentially denies the user the benefit of the system designer's expertise in determining how to effectuate the next most natural adjustment—the one which most users would select if they knew how to go about it.

The third may be perceived as slightly undesirable since the user will find that a desired adjustment of one parameter is now resulting in admixture of change in a different parameter. This drawback, however, can be minimal in two different situations:

A system may be designed to offer users only a very limited number of discrete color-control options.

An inordinate amount of special attention may be required to flag situations in which it is necessary to invoke special methods to deal with requests, in effect, for unavailable/imaginary colors—and to announce and explain these to the user.

As already mentioned, a system may be set up to provide to users a clear indication of when special evasive maneuvers have been made, or must be made, to remain inside the color space.

When this occurs the user can decide to reverse the adjustment, or not to make it.

Thus the fourth alternative may be economic, and best, only when the system offers complex enough maneuverability within the color space to justify such an elaborately interactive capability.

Figure 20:
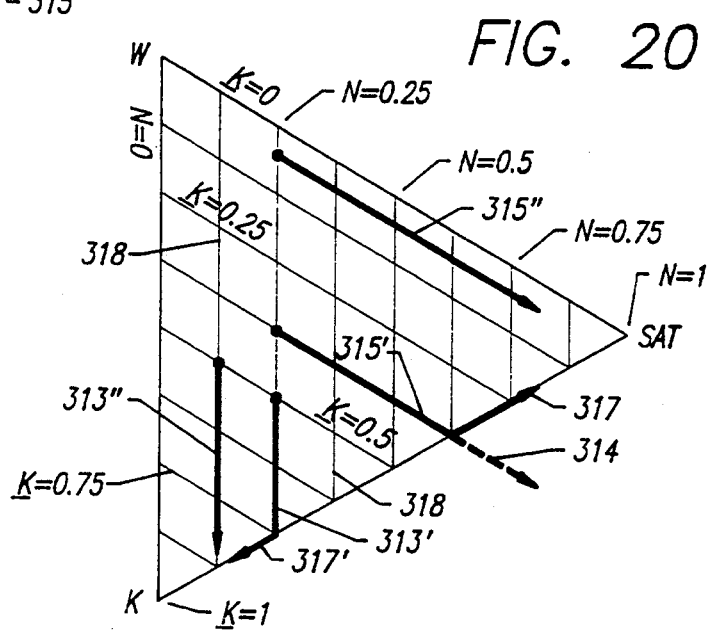
FIG. 20 is a like diagram showing boundary behavior.

With the foregoing discussion in mind, reference is now made to the lower, long angled-arrow path 315'-317 in FIG. 20, This corresponds to a user's or designer's desire for a longer excursion toward greater vividness that seen in FIG. 19.

Extension of the path to the system boundary is straight-forward, as shown by the longer downward-angling segment of the new path. The system cannot proceed along the dashed-arrow extension 314 of that segment, but the user/designer wants more vividness.

One natural choice would be to move toward greater vividness along the system boundary as shown by the upward-angled arrow segment 317. The desired vividness is thus achieved, but at the expense of blackness.

It is helpful to compare the two-segment path with the straight path represented by the upper long arrow 315" in FIG. 20. The total excursion in vividness along the two-segment path is the same as if the maneuver were begun at a point high enough in the hue page to avoid the system boundary entirely.

If the tradeoff of blackness for vividness turns out to be perceptually rejected, the user/designer may simply reverse the process—or part of it, if such control is available. This moves the system back to the original desirable blackness, and some lower amount of vividness than the maximum desired.

All the increasing-vividness examples discussed so far are applicable without any conceptual modification to adjustments that begin very close to the Fraction-Colorant $N \equiv 1$ vertex, at far right in the drawings. Naturally no Fraction-Colorant N adjustment range can extend beyond that vertex into unavailable or imaginary colors; the system response at that point simply stops.

Choices similar to the increasing-vividness examples arise in moving vertically along lines of constant Fraction-Colorant N, as shown by the segmented arrow 313' near lower left in the drawing. Here an adjustment is under way to increase 317' the blackness or Fraction-Black K.

The adjustment begins by exchanging 313' white for black, but at the system boundary the adjustment cannot proceed in that way because here too the trajectory would move into unavail-able/imaginary colors. The reason is that the part of the color space occupied by Fraction-Colorant N is all that remains: here there is no more white to give up.

The path is instead advantageously deflected 317' along the boundary toward the black $K \equiv 1$ vertex. Here added Fraction-Black K is bought with some vividness (Fraction-Colorant N) as currency.

Precisely the same total change of blackness is obtained as if the adjustment were begun at a point further to the left in the diagram. At that point, because initial vividness is lower, barterable white is available in greater quantity—and consequently a greater range 313" of blackness adjustment is available.

Once again, if the user/designer esthetically rejects the tradeoff of vividness for the last increment of blackness, the maneuver (or part of it, in some systems) can be reversed.

Closely analogous operations occur with vertical movement upward, corresponding to a desire to decrease blackness. When the top $K \equiv 0$ boundary is reached, no more Fraction-Black K remains to deduct, but a perceptually related further adjustment (increased whiteness) is available by moving toward the white $W \equiv 1$ vertex at expense of some vividness.

System operation has now been explored rather fully near the hue-page boundaries—particularly with regard to practical ways of dealing with fundamental limitations of the color phenomenon. As these explorations show, the HPG color space is entirely well behaved throughout.

Although it has limit points $W \equiv 1$, $N \equiv 1$, $K \equiv 1$, these are not singularities in the mathematical sense of imposing indeterminacies (and not even in the practical sense of imposing scale compression) on any variable. Range limitations are imposed only where physically necessary.

g. Computer Modeling of Practical Color Space

As mentioned previously all the diagrams of FIGS. 13 through 20 represent idealized analyses ignoring the effects of many real-world factors—such as, for example, chromatically impure real pigments, nonideal subtractive response, pixel overlap, device position-control imperfections, etc. Some of these factors vary within the color space systematically, and so distort the hue-page structure and accordingly the operation produced by any system.

All of these effects can be taken into account by computer modeling to give other views of hue-page structures. Such other views are more realistic, and represent the actual coloration that will result in any specific image—requiring compensating factors that are also modelable, and that will result in a better color product than the practical modeling might suggest.

Figure 21:
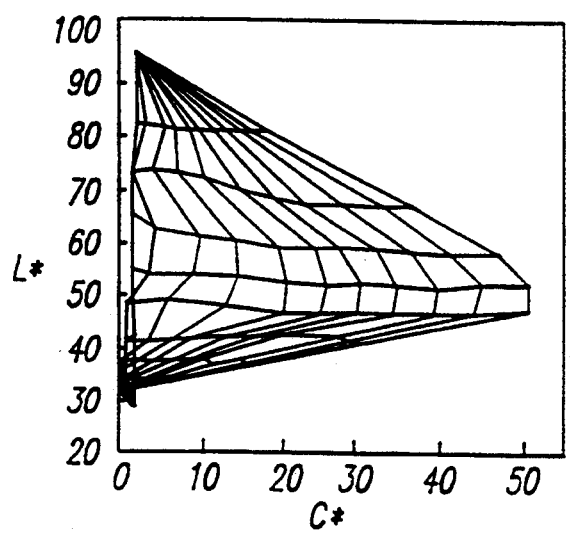
FIGS. 21 and 22 show computer simulations corresponding to the structural parts of FIGS. 15–16 and 18–20 respectively.
Figure 22:
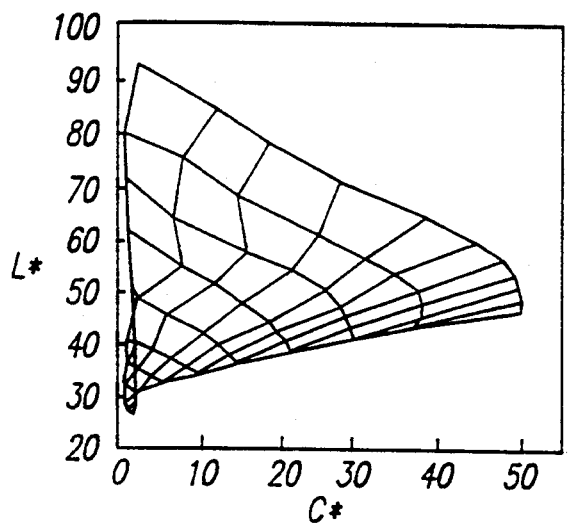

With these caveats it is instructive to study FIGS. 21 and 22, which represent computer-generated modeling of realistic implementations of the HLS and HPG systems respectively. Both plots of course suggest the effects of using real pigments, in the retraction of operating limits inward from the vertices of ideal spaces.

Both also suggest some double-valued behavior near the darkest regions at lower left. Here presumably gray components of chromatic pigments (and possibly chromatic components of black pigments) introduce perturbations.

Both cases of FIGS. 21 and 22 were produced by modeling of the same color-reproducing mechanism, in a nonideal environment. The system reproduced black by using dots that are much larger than ordinarily expected; correspondingly the deposition of black not only increased the darkness, as expected, but also overlapped with the color dots deposited.

The result was to cancel the chroma of the color information. Black therefore had the effect of reducing chroma and lightness simultaneously.

FIG. 21 clearly reflects the chevron-shaped constant-S structure, and the convergence of constant-S lines at the top and bottom vertices, as shown in FIGS. 15 and 16. This modeling therefore seems to confirm that the HLS system in use is indeed subject to singularities at these points.

It also suggests that a real HLS system—using current selections of pigments and the like—may be subject to undesirable asymmetry of the value scale, in that the constant-S contours are badly crowded below the lightness midplane. This would lead to exaggerated vividness response to value V adjustments, and suppressed value V response to vividness adjustments.

Such adverse effects are actually present and perhaps might be overcome to an extent by other pigmentation selections or modification of control regimes; the graph could be used to guide such efforts. That sort of modification, however, may not ameliorate the constant-S convergences at the vertices or the associated indeterminacies there.

FIG. 22 analogously reflects for an HPG system the advantageous intersection of constant-K lines with the lower boundary—thereby preventing convergence except where forced by the artificial pigmentation effects mentioned just above. The system as thus modeled would appear to be free of singularities such as found in the HLS (and HSV) systems.

In addition, however, the modeling suggests that a real color-producing machine—here too using current selections of pigments etc.—may be subject to undesirable angling of the constant Fraction-Colorant N lines away from the vertical, and nonparallelism of the lines. These effects would degrade significantly the parametric independence of the HPG space and its uniformity of control sensitivity, respectively, Such adverse effects are actually present in the equipment and are overcome by the color compensation step. Here the modeling graph can serve to guide such efforts, with some feedback from colorimetrics to determine the nature of the compensation required or desired.

Significant realignments may be realized in this way through compensation. The results show that fundamental performance of the HPG system, as to well-behavedness and the like, accords with expectations; such efforts would appear to be worthwhile.

Even in the presence of the nonideal response of FIG. 22, the color-compensation state successfully is applied because of the correlation advantage of HPG. Color tables provided in a microfiche Appendix to this document are the results of such color compensation in the presence of nonideal parameters.

h. Conclusion as to HPG

The Hue-Plus-Gray Color Model provides several advantages and solves numerous prior problems of color control. This summary will include, in passing, some not mentioned earlier.

HPG provides color control that is accurate and stable, and straightforwardly implemented in algorithms. It excludes murky colors from the palette, because it excludes distant primaries.

It yields intuititive machine-space color control. It is encodable as gray level and forward to multiple primaries.

It enables avoidance of the drawbacks in prior solutions such as combinatorial color mixing—which produces murky colors and cannot be converted to RGB. As to color spacing it overcomes problems of colors that are too closely grouped (see FIG. 21) and a sparsely filled palette.

Relative to HLS space it eliminates the problem of perceptually uncorrelated lightness and saturation, and inefficient coding of saturation. Relative to RGB it eliminates inefficient color coordinates, perceptually inconsistent color ordering, and poor interpolation.

4. The Novel Error-Diffusion Method

Certain preferred embodiments of the present invention make use of the same equations as set forth in the discussion of prior-art error-diffusion methods. Those equations, however, are applied to a different assemblage of input information from earlier system stages, and the results used in different ways.

In particular the preferred embodiment keeps track of accumulated error for a larger group of colorants—corresponding substantially to a full specification of color needed to guide each pixel-printing decision. The preferred embodiment in particular keeps track of enough colorants to maintain identification of the user's desired input color, and employs that information to constrain the printing decision actively.

Even more specifically, in the preferred embodiment this identification is performed and maintained in a perceptual space, so that the user's perceptual expectations are realized directly in perceptual terms. The perceptual space utilized is the HPG space discussed above.

The system performs its decision-making processes for each pixel location in turn. The particular location on which the system is operating at a given time will be called the "current" pixel.

Figures 23, 26:
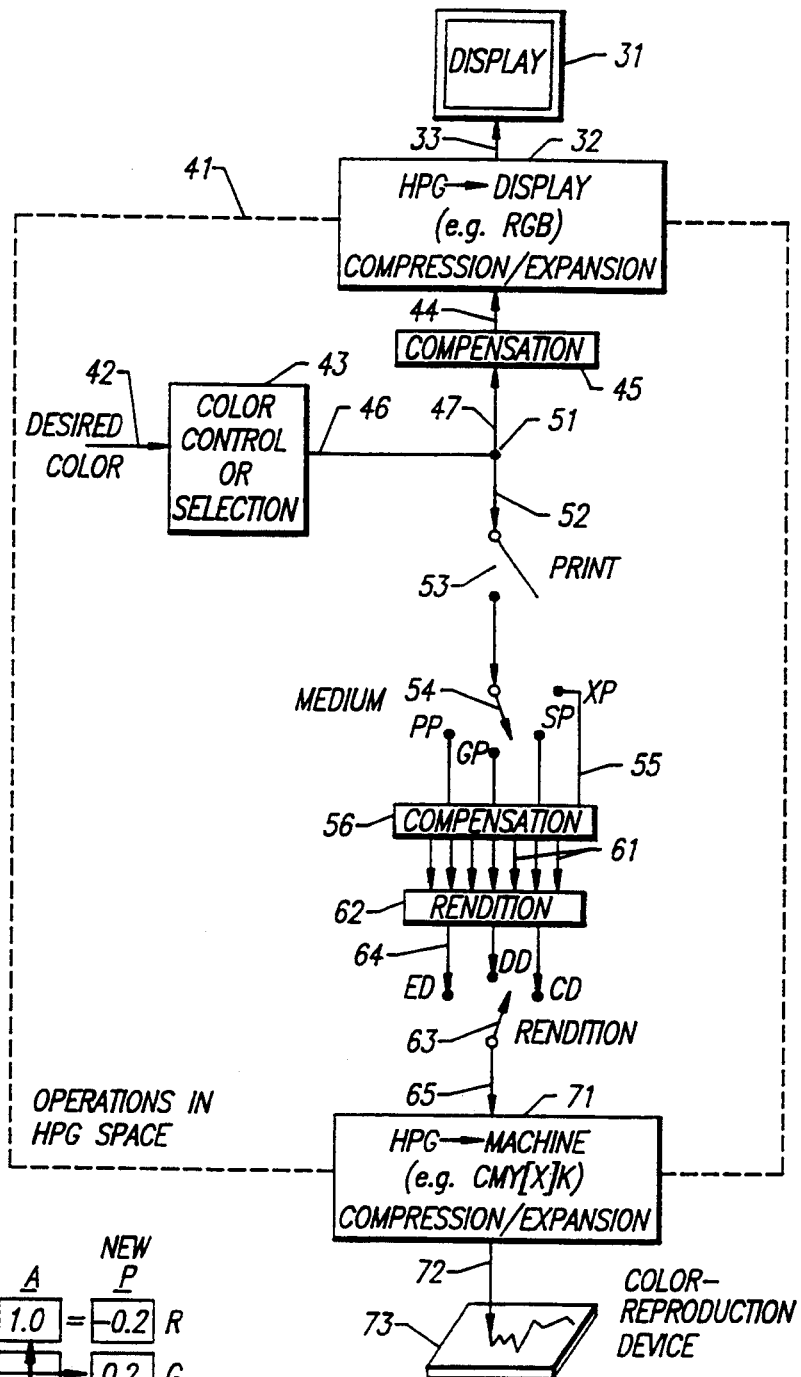
FIG. 23 is a diagrammatic showing of the error-diffusion method as information movement relative to memory buffers.
FIG. 26 is a block diagram of a color-reproduction system operating almost entirely with HPG parameters.

FIG. 23 illustrates how the process works, in terms of the accumulators or memory buffers used along the way. The desired input color for the current pixel is expressed in terms of the HPG components HNK—and more specifically in terms of the six chromatic and two achromatic colorants typically employed.

As will be recalled, only two chromatics are used to express any color in the HPG system. Hence only the dominant and subordinate primaries, and the achromatics black and white, are active for any particular input color—and therefore for the active pixel.

The system adds to the numbers for those four colorants the accumulated errors from earlier calculations—i.e., pixels that were active previously, or in verbal shorthand "earlier" pixels. In general all the other six colorants will have been active in those other calculations; therefore the result in general is an array of not four but eight numbers for the active pixel.

For example if the desired color at the active pixel is expressed in terms of YGK, the active colorants are YGKW—but the accumulated errors from earlier pixels generally will be expressed in terms of RGBCMYKW. To effectuate this scheme eight different memory buffers are established for each pixel to which error contributions have been made, and the accumulated errors physically reside in these buffers.

When these eight-number contributions from earlier pixels are added to the four numbers for the active pixel, new error numbers for the active pixel will stand in the eight buffers for that pixel. The system nevertheless keeps track of the identity of the four active colorants—those which were used to express the input color desired and specified by the user.

Next the system prints just the one of those active colorants whose error composite (desired component plus contributions from earlier pixels) is greatest. Even if one of the buffers for some other colorant contains a larger number, the system will never print any such "other" colorant; it is required to print one of the active colorants only.

This procedure departs in several respects from prior-art error diffusion. Decisions are not made in an artificially limited machine space, divorced from information about the input color—but rather are made in a perceptual space, the novel HPG space, and are constrained by the components of the desired input color.

Furthermore decisions for different colorants or hue pages are not made independently and then left to the vagaries of color subtraction for implementation. Rather the overall process for the entire active-pixel input color is integrated into a single decision.

In addition, the preferred embodiment does not necessarily wait until a colorant reaches some threshold strength—some minimum error size. Rather it prints whichever active colorant has strongest composite error.

If two or more colorants have the same maximum composite error, an arbitrary decision is made. Typically the system simply prints whichever of the ties for first place comes first in some predetermined sequence.

After the decision is made, the system commands printing of the color which it has decided to print. It also adjusts the composite accumulation in the active-pixel buffers to reflect the printing decision, and then distributes the adjusted accumulation to nearby pixels.

The two main steps can be effected in either order: either print-command first and then composite-error adjustment/distribution, or conversely. Analogously the distribution substep might be done after the print command is issued, but the adjustment substep before.

In any event, to perform the composite-error adjustment the system deducts the quantity one from the buffer for the single active colorant which it has decided to print. This step makes clear that the buffers can and indeed often must hold negative numbers.

Figure 12:
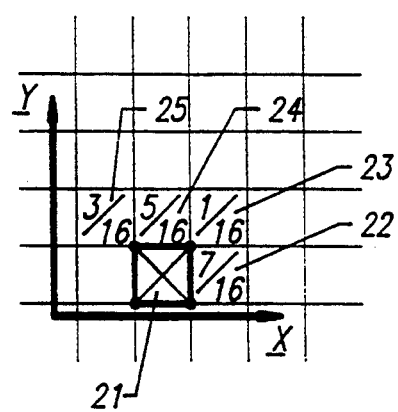
FIG. 12 is a diagrammatic representation of an error-diffusion weighting pattern used in the prior art and usable with the present invention.

Then the system distributes the revised buffer-memory contents to nearby pixels in accordance with a geometric weighting pattern. The preferred embodiment uses the prior-art weights shown in FIG. 12.

Alternatively a system in accordance with the invention can use any of a great variety of other patterns. These include some previously put into use or proposed, and still others that may be seen as preferable for particular purposes.

In some cases when the system prints an active colorant whose preadjustment total does not happen to be largest, this occasion may arise because the desired input color for the active pixel happened to be a relatively isolated choice. It may be a very small feature in a large field (such as part of a fine-line symbol, e.g. an alphanumeric character, superposed on a green background), as requested by a user working at a display device.

The occasion may arise instead because the processing has reached a part of the image where two relatively large fields of different colors abut. The system response in these two cases differs importantly when the active pixel later has become an earlier pixel.

In the first instance the system may soon move on past the small feature and so again into the broader background. Then those previously reserved composite-error numbers—for the unused or "inactive" six colorants—can become an "active" part of an active-pixel calculation.

In other words, the unused error numbers that were scattered into the then-nearby unprocessed pixels will be added to desired-color numbers for those later pixels. Those unused numbers that correspond to active colorants for a later pixel can add to those actives and sum to a composite error for a colorant that is strongest there—and so is printed.

In the second instance the system does not soon leave the newer colors of the relatively large field which it has just entered. The unused error numbers redistributed from an active pixel near the line of abutment are relatively small fractional values of the numbers which that active pixel received from earlier pixels.

These small numbers are in turn subdivided into still-smaller fractions of error for redistribution at a later pixel—and then resubdivided yet again and again. As this process goes on there is a tendency for the numbers corresponding to colorants that are now in alien territory to become very small.

In a sense, whether they become small or not is inconsequential, since they cannot be part of a printing decision unless processing later reaches an image region where the corresponding colorants are active. Nevertheless if that processing contingency does occur they can yet become contributors to an active pixel as they never or seldom decay entirely to zero.

As a mechanistic step in the overall process of the preferred embodiment, as in some prior-art systems, the system must determine whether a selected colorant corresponds directly to a single pigment which the color-delivery device can use. If not, the system at some level identifies a plurality—usually exactly two—of the device pigments for use in constructing the selected colorant.

The system then commands actuation of the associated system hardware—e.g., pens and drive circuitry—to deliver the selected colorant. The combination of an ink, a corresponding pen, an associated drive circuit etc., or the like, corresponds to the language "separate physical coloring means" employed in certain of the appended claims.

In the preferred embodiment using HPG space, the separate physical coloring means employed by the machine (or in a related sense the machine parameters) correspond one-to-one with elements of the perceptual parameters. That is, a color-delivery device may be used which is capable of CMYK(W), and the elements of the perceptual HPG system are RGBCMYK(W). The former correspond directly to the latter—not to all of them, as can be seen, but to certain ones, a subset, of them.

Figure 24:
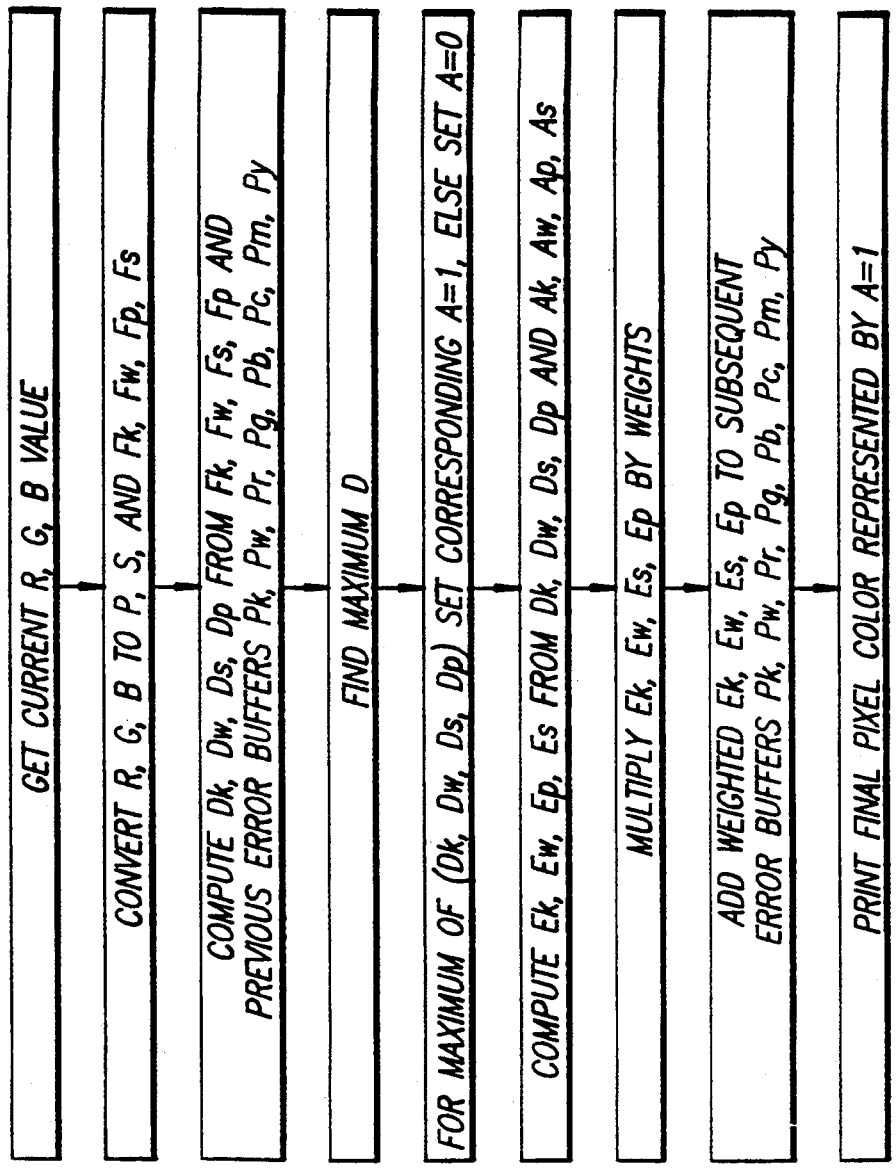
FIG. 24 is a software flowchart for the same method.

FIG. 24 represents the above-described processing in terms of a firmware or software flowchart. It will be found self explanatory by those skilled in the field of implementing color processing in microprocessor routines.

It will also be understood that the first block or two may be unnecessary or may require modification. If input color information arrives expressed in some terms other than RGB, then different conversions are required; and if it arrives already expressed in HPG, no conversion is required.

5. A Novel Clustered-Dither Method

The preferred embodiment includes offering users an alternative method of halftoning, known as clustered dither. The concept of clustered dither is not new in itself.

Use of this technique with the HPG color model, however, has been improved and refined as still another aspect of the invention. Following is a description of halftoning HPG color using the clustered-dither cell.

a. General Halftoning Concepts

The area of an image to be rendered is organized as a collection of pixels oriented in both horizontal and vertical directions. Halftoning is required where the data representing each pixel contain more information than the device pixel is capable of reproducing.

Halftoning reduces the quantity of information to the level required by the device at each pixel in such a way that the aggregate of reproduced pixels appears to contain substantially the same amount of information as found in the original pixel data representation before halftoning.

Halftoning requires a rendering decision-making process used to achieve these objectives, coupled with a pattern-placement process suited to the image area that is being rendered.

Error diffusion, discussed in section 4 above, usually provides better results at sharp transitions or small image features. It is often problematic, however, in rendering more-gradual transitions and larger fields.

Problems in such environments are due to interference effects between the mathematics of error diffusion and the geometry of an image—as well as snowplow-like tracks of a diffusion pattern. Here dithering, such as the improved method described below, is distinctly favorable.

Clustered dither cells—The pattern created by a clustered dither cell is designed to create the impression when viewing the results, that dots are formed at specific locations which grow in size as the amount of colorant or black is increased. The method of designing the dither requires generally that each new dot which is placed near a prior dot be positioned in such a way that it overlaps with the prior dot.

Dispersed dither cells—Dispersed dither cells, another type of ordered dither, are designed to create the opposite effect, that of placing dots in unoccupied areas of the dither cell, preventing overlapping with other dots as much as possible, until the whole of the dither cell is filled with dots.

b. Dither-Cell Placement During Rendering

Dither cells are customarily placed initially in a position where the upper left corner of the cell corresponds to the upper left corner of the image being rendered. This placement causes each dither cell location to now correspond to specific pixels in the image area covered by the dither cell.

The color printed by the halftoning process is determined by the combination of the color of the pixel, and the values of the dither cell that corresponds to that pixel. Rendering of that area of the image is therefore possible.

The dither cell is now re-placed upon the image by shifting the cell to the right by the amount which corresponds to the width of the cell. This new placement of the cell covers new image area, but is immediately adjacent to the area of the image previously covered.

This part of the image may then be rendered. The dither cell is moved again and again until the right hand side of the image is reached.

The process continues by returning the dither cell to the left side of the image and shifting it downward by the amount which corresponds to the height of the cell.

The process of the prior five paragraphs is then repeated. When the entire area of the image has been covered and rendered, the dither placement process is complete, and so is the rendering process.

c. Halftoning HPG Color

Figure 1:
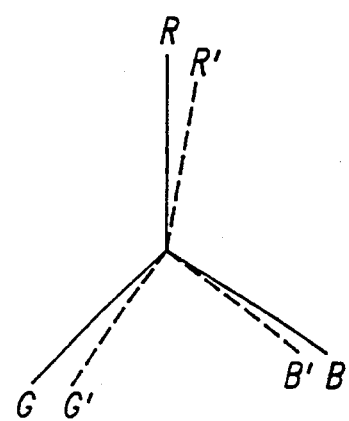
FIG. 1 is an abstract representation of rectangular RGB color space.

Described here is the method of halftoning color data represented in the Hue Plus Gray color space using a specific ordered dither called a clustered dither pattern. The pattern of the dither is shown in FIG. 1 and is comprised of a collection of numbers ranging from 0 to 255.

HPG color conversion to fractional components—The HPG color triplet consists of hue, fraction color and fraction black. As described elsewhere in this document, this triplet is converted into a form consisting of Fraction-Colorant 1 or $F_{c1}$, Fraction-Colorant 2 $F_{c2}$, Fraction-Black K and Fraction-White W such that the sum of these values is unity. Each of these values is multiplied by 255 to scale HPG to the scale of the clustered-dither pattern of the accompanying table.

TABLE

| 16 × 16 Clustered Dither Cell | | | | | | | | | | | | | | | |
|---|---|---|---|---|---|---|---|---|---|---|---|---|---|---|---|
| 1 | 17 | 81 | 223 | 255 | 239 | 111 | 52 | 4 | 20 | 84 | 222 | 254 | 238 | 110 | 49 |
| 33 | 161 | 193 | 149 | 69 | 133 | 181 | 116 | 36 | 164 | 196 | 152 | 72 | 136 | 184 | 113 |
| 241 | 225 | 97 | 53 | 5 | 21 | 85 | 212 | 244 | 228 | 100 | 56 | 8 | 24 | 88 | 209 |
| 73 | 137 | 185 | 117 | 37 | 165 | 197 | 156 | 76 | 140 | 188 | 120 | 40 | 168 | 200 | 153 |
| 9 | 25 | 89 | 213 | 245 | 229 | 101 | 60 | 12 | 28 | 92 | 216 | 248 | 232 | 104 | 57 |
| 41 | 169 | 201 | 157 | 77 | 141 | 189 | 124 | 44 | 172 | 204 | 160 | 80 | 144 | 192 | 121 |
| 249 | 233 | 105 | 61 | 13 | 29 | 93 | 220 | 252 | 236 | 108 | 64 | 16 | 32 | 96 | 217 |
| 67 | 131 | 179 | 125 | 45 | 173 | 205 | 146 | 66 | 130 | 178 | 128 | 48 | 176 | 208 | 147 |
| 3 | 19 | 83 | 221 | 253 | 237 | 109 | 50 | 2 | 18 | 82 | 224 | 256 | 240 | 112 | 51 |
| 35 | 163 | 195 | 151 | 71 | 135 | 183 | 114 | 34 | 162 | 194 | 150 | 70 | 134 | 182 | 115 |
| 243 | 227 | 99 | 55 | 7 | 23 | 87 | 210 | 242 | 226 | 98 | 54 | 6 | 22 | 86 | 211 |
| 75 | 139 | 187 | 119 | 39 | 167 | 199 | 154 | 74 | 138 | 186 | 118 | 38 | 166 | 198 | 155 |
| 11 | 27 | 91 | 215 | 247 | 231 | 103 | 58 | 10 | 26 | 90 | 214 | 246 | 230 | 102 | 59 |
| 43 | 171 | 203 | 159 | 79 | 143 | 191 | 122 | 42 | 170 | 202 | 158 | 78 | 142 | 190 | 123 |
| 251 | 235 | 107 | 63 | 15 | 31 | 95 | 218 | 250 | 234 | 106 | 62 | 14 | 30 | 94 | 219 |
| 65 | 129 | 177 | 127 | 47 | 175 | 207 | 148 | 68 | 132 | 180 | 126 | 46 | 174 | 206 | 145 |

HPG color-vector Generation—The next step is to construct an HPG Color Vector. The four fractional components are arranged in the following order: first is Fraction-Black, second is the Fraction-Colorant which is the darker of the two, third is the Fraction-Colorant that is the lighter, and fourth is Fraction-White.

This reordered collection of components is identified by the notations K, FcD, FcL and W respectively, where the numerical values were determined by the multiplication step in the paragraph above. Next, several threshold values are calculated thus:

$$V_1 = K$$

$$V_2 = V_1 + N_{cD}$$

$$V_3 = V_2 + N_{cL}.$$

Figure 25:
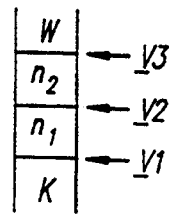
FIG. 25 represents a clustered-dither color vector.

FIG. 25 is a diagram of the resulting HPG Color Vector.

The rendering decision—When the dither cell is placed upon a portion of the image, the rendering of each image pixel is achieved by comparing the dither cell's value with the threshold values in the HPG Color Vector for that pixel. The decision process is achieved by testing the relationships indicated below, in the order shown.

If the decision specifies printing, the remaining relationships are disregarded, and the next pixel is then considered. The decision steps, for each pixel in turn, are:

If the dither cell value is less than or equal to:
1. $V_1$, print black;
2. $V_2$, print the color of $N_{cD}$;
3. $V_3$, print the color of $N_{cL}$;
otherwise,
4. print white.

6. Overall System Concepts and Implementation a. An HPG Color-Reproduction System In principle there is no need for conversion into HPG, as input desired-color information can be formulated by a user in HPG parameters HNK at the outset. Since these parameters are particularly easy to comprehend and use, their use in the first step of color selection and modification is natural.

FIG. 26 represents such a system. Color choices and desired adjustments are entered 42 at a keyboard console, or using a computer so-called "mouse" input device, or with selector switches or other types of control—but in any event the parameters under control are substantially H, N and K.

Many variant input formats could be used in such a system, such as direct entry of component elements of the HPG parameters—e.g., fractional parts of RGBCMYKW. These are not the only possible element names in an HPG system, since in purest principle hue and gray can be expressed simply in numerical terms.

Moreover, other points than RGBCMY about the hue scale can be selected to serve as primaries, or as integral values 0 through 5. Indeed the HPG system does not rest upon use of those particular numerics, but as can now be appreciated is a far more fundamental construct.

Information developed in the control/selection block 43 proceeds in HPG parameters toward both a display device 34 and (when a printing instruction is issued) a printing device 73—through respective intermediate modules.

The printer signal passes first through an HPG color-compensation block 56 that effectively adjusts the levels of H, N and K to account for known distortions that are expected to arise in the printer. Next the signal is converted into control signals 72 which must be in a language or space suitable for driving the printer directly.

As previously mentioned, the preferred printing devices are operated by CMYK signals—and these are nominally a subset of RGBCMYKW. Accordingly, signal conversion 71 for the printer may be regarded as a compression of the parameters set.

In the process, as will be recalled, transformations are required to account for those chromatic primaries which are absent from the device command set: they are constructed subtractively from those which are present. Also it is necessary to make suitable provision for one achromatic colorant that is delivered, so to speak, by loading paper of that color into the printing machine.

The invention contemplates use of other printing types, such as xerographic units, and in any case other colorants than CMYK—either instead of or supplementing the RGB elements. Such other colorants need not be elements of the HPG primaries in use:

As mentioned previously, orange or some other primary could advantageously be added to a printing machine. In the case of adding display colorants not part of the HPG primary set, an element of expansion (as well as compression) of the colorant set arises at the interface module.

The printer 73 also may be an entirely different type of device, as technical improvements in such devices may permit. Any such printing device can be driven from an HPG-space selector and compensator, with suitable conversion at the interface module as illustrated.

The compensation module that is traversed en route to the lower interface module (the printer-compression-/expansion block) must nullify, to the extent possible, hue anomalies and other nonlinearities expected to arise in the compression or expansion. These sources of error are in addition to those already mentioned that are inherent in the operation of the printer itself.

The display signal 33, similarly, passes first through an HPG color-compensation block 45 that effectively adjusts the levels of H, N and K to compensate for known distortions arising in the display device. Next the signal is converted 32 into control signals which must be in a language or space suitable for driving the display directly.

Predominantly used display devices 31 are CRTs, operating from RGB signals—and RGB is nominally a subset of RGBCMYKW. It may be supposed accordingly that signal conversion for the display is a relatively simple compression of parameters, similar to that previously described for extracting printing-machine control signals from HPG parameters.

In a very broad sense this is true, but again transformations are required to account for colorants absent from the machine command set, etc. At least most CRT devices are not capable of CMYW as independent machine variables.

Therefore chromatics CMY must be constructed additively from drive information coordinates RGB, and black K is approximated by the dark gray of the unilluminated display screen. The extent of achromatic suppression of the RGB signals—i.e., suppression of those three signals in common—that is required for suitable use of the dark gray screen is to be controlled by the Fraction-Black variable K.

So far the provisions are analogous to those for the CMYK printing machine, but somewhat the converse.

An additional provision is required in conventional CRT units to form white.

That colorant must be additively constructed from equal parts of R, G and B. The additional common signal required at all three CRT guns to accomplish this is developed from the white signal W in the HPG system.

Color displays may operate using CRT phosphors other than RGB—either instead of or supplementing the RGB elements. Such other phosphors need not be elements of the HPG primaries in use, just as orange or some other primary might be added to a printer.

Once again in the case of adding display colorants not part of the HPG primary set, an element of expansion (as well as compression) arises at the interface module. The display also may be an entirely different type of device—for instance an LCD unit—as technical improvements in such devices may permit.

Any such display device can be driven from an HPG-space selector and compensator, with suitable conversion at the interface as illustrated. The compensation module here too must deal with distortions that will arise in the compression or expansion, in addition to those at the display.

Another step, required in the control of present-day printing machines though not display units—or at least not those of the CRT type—is rendition or halftoning 62, as shown in FIG. 26. This step does not arise from the pointillistic character of the delivery mechanism, and is not simply a matter of imposing a raster delivery sequence on the data, as these characteristics are common to both display and printing.

Rendition, rather, serves as the analog of variable intensity in CRT-type displays. It enables production of gradual-looking, smooth-looking variations in hue, Fraction-Colorant and Fraction-Black—or, more generally, chromatic and tonal gradations.

Most computer-controlled printing devices are best 24 operated on the basis of either printing a pixel or not—rather than attempting to print weak and strong dots, or (as in lithographic work) dots of different sizes. Therefore some mechanism similar to halftoning may be required for any color-delivery system, displays included, whose operation most efficiently proceeds on substantially a go/no-go basis.

The processes occurring within a rendition module are the expression of relationships between the specific or unique image specified by a user—in terms of shapes and coloration—and the geometry of the delivery system. Therefore, in general, they cannot be worked out in advance for all images and instead are necessarily performed in real time.

As a practical matter, the various blocks illustrated may be distributed in various ways between, ordinarily, an applications program in the form of desktop-computer software and final processing steps in the form of printing-machine firmware. Commonly compensation and the conversions leading to it, and to the display, are embodied in the software (or partially embodied as firmware at the display); while rendition and the conversions to print commands are embodied in the firmware.

Such an allocation of functions is practical for most cases, since desktop computers generally have limited capability to perform parallel processing. Such capability as is present may not be readily invoked to handle both compensation and rendition procedures simultaneously.

With further development of the present trend toward parallel capabilities in desktop machines, future systems may provide for halftoning decisions within the computer software—and in some perceptual language, integrated with the color-compensation stage. For the present, however, such a development does not appear to have been attempted.

One integration which is feasible, however, is to move the compensation into the firmware with the rendition stage.

FIG. 26 also accounts for two important enhancements of printing-system performance that are facilitated by the present invention. These enhancements arise as solutions to two kinds of problems:

First, printed pigments interact differently with different types of sheet medium—such as, for instance, plain paper, glossy paper, special paper such as draftsman's translucent vellum, and plastic sheeting used for transparencies. Printing on different media therefore distinctly influences the resulting perceived color.

Second, printing different types of images is best effectuated with correspondingly different rendition procedures—such as, for instance, error diffusion, clustered dither, and dispersed dither. Some reasons for this have been mentioned in section 5-$a$ above; and other systems (such as perhaps dispersed dither) may be in demand as a practical matter simply because they have established a following.

Accordingly FIG. 26 shows symbolically how color-compensation procedures should be made selectable 54 to take into account the effects of different media, and rendition procedures should be made selectable 63-64 to take into account the effects of different images. To an extent each of these selections may be made automatically, in response to machine determinations of the medium type and image character at hand; however, the invention also contemplates user selection of either or both—either through machine controls or computer commands.

Furthermore color-compensation corrections are necessary for different rendition selections. This is symbolized in FIG. 26 by use of several signal lines 61 from the compensation module to the rendition module—corresponding to the several distinct halftoning selections indicated below.

b. An HPG Color-Reproduction Subsystem Driven by an RGB Application Program

Figure 27:
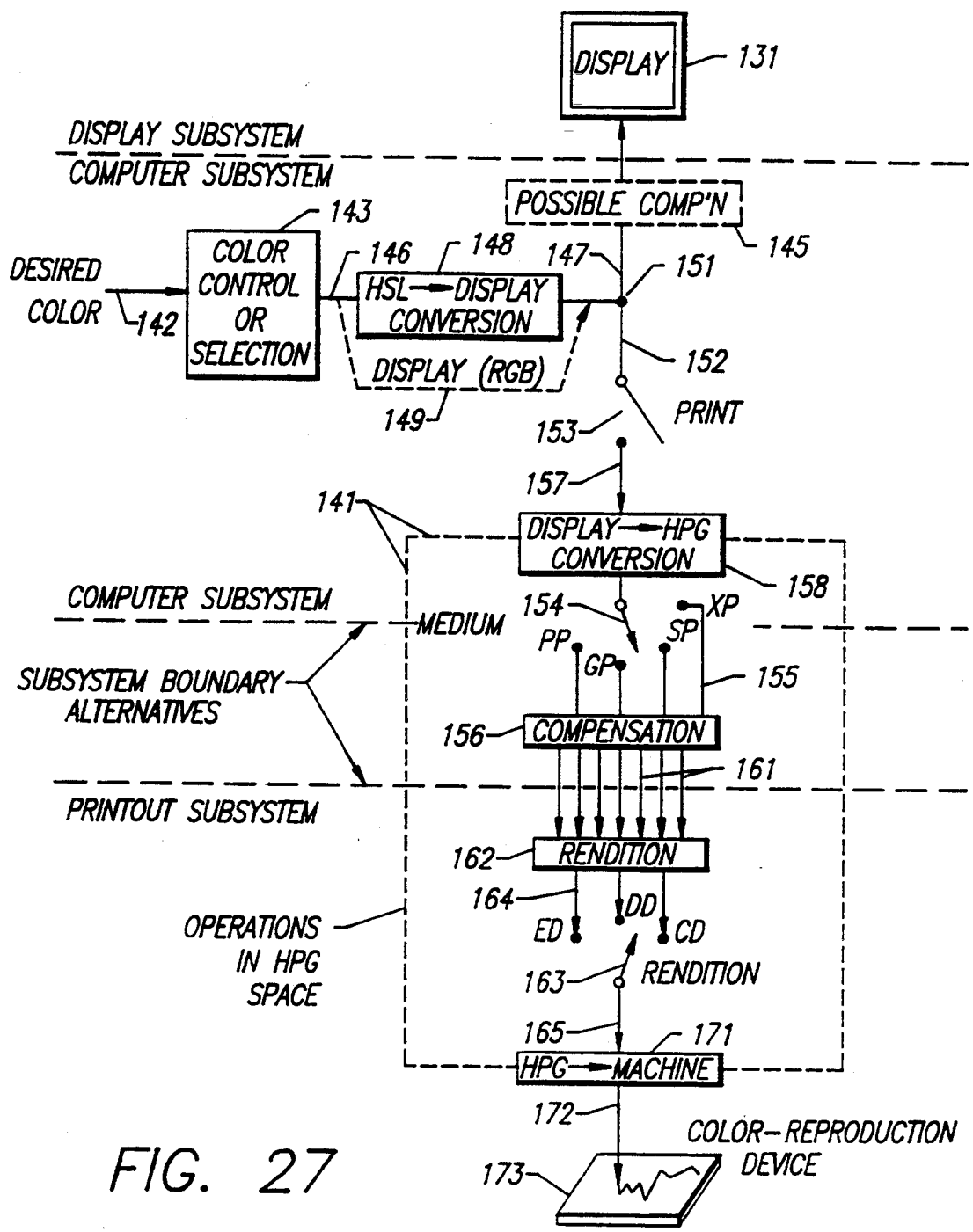
FIG. 27 is a similar diagram but with an existing input subsystem operating with RGB signals.

FIG. 27 represents one step in the direction of a system that is compatible with color-graphics application programs and delivery-system architectures that already exist now.

Such applications programs typically operate in HSL coordinates—and some in RGB coordinates—to drive a display unit, typically in RGB. Therefore most systems include a conversion 148 from the color space used in selection 143 to that used in display, as illustrated.

In the system shown, the previously discussed problems of parametric independence and color-modification are simply accepted as givens. In other words, the relationship between the input and display modules is considered to be outside the control of the printing-subsystem designer.

In practice the intrusion of that printout designer into the applications-program world is ordinarily limited to provision of a printout-color "driver"—analogous to a printer action table for word-processing programs. Typically the driver is furnished to the applications-program vendor for inclusion in the applications-program package as sold. The applications program will not ordinarily permit the printout driver to intercede in its communications to the display.

Further, it is necessary to make some assumption about what the user actually wants. In principle it may be logical to assume that the user's intention is represented by the input color-selection settings, or the resulting signals from the color-control module.

This may sometimes be correct if the user simply seeks some sort of replication of a color image provided by someone else—e.g., an image prepared commercially. In practice, however, usually either the user or someone else has made input color settings based on looking at a display screen in some system such as represented in the upper part of FIG. 27.

The only signals that have real physical meaning and which have been evaluated perceptually are therefore the optical data traveling from just such a screen to the eye of the user (or someone else). It is therefore reasonable to treat these too as givens.

In short, a user is assumed to have put up on the screen what the user wants. Whatever colors physically appear there, the remainder of the system is designed to effectuate.

It is possible that an applications program may include some sort of compensation module 145, either in the color-control block 146 or between the signal-split point 151 and the display unit. In the former case the effects of compensation are irrelevant to the printout designer's problem, which is simply to relate what is printed to what is on the screen.

In the latter case, however, the signals going to the printer depart from those reaching the printout subsystem. In either case the printout designer's driver can operate effectively only if it was prepared to take into account:

whether a compensation module 145 is present (making the printout system receive different signals than the display receives), and if so the detailed working of that module.

As in FIG. 26, the display-to-HPG conversion 158 and the color-compensation module 156 are likely to be incorporated into a color-printout driver—which is loaded into a computer. For some systems, however, as mentioned in the preceding section the driver can be included in the printer firmware.

The remainder of the system (at lower right in the drawing) is likely to be incorporated into the firmware. The FIG. 27 system is still a step away from what now appears feasible or at least optimal commercially.

c. HPG Color-Compensation, Rendition and Printing Subsystems Driven and Interfaced in RGB FIG. 28 moves a half-step in the direction of present feasibility. It takes into account the established interfacing architecture of existing systems.

Many color-generating devices are already purchased and in use. Many more devices are already basically designed as to basic architecture, and actually working well.

These designs and architectural implementations represent monumental and difficult undertakings. As a matter of good design practice and business practice alike, it is a crucial necessity to evaluate at each stage of progress how best to implement advances.

Such evaluation must include whether better promotion of progress in the useful arts will be achieved through sweeping away old working environments and implementing new concepts more efficiently in new ways—or through cautiously embedding the new implementations in the proven working environments. All such decisions must be unsatisfactory to some degree, whether because of inefficiency in old architectures or risk in new ones.

A major consideration in such evaluations is the extent to which new implementations will accommodate field-retrofit, or factory refurbishment, of apparatus or applications-software packages already in existence. In existing systems, as will be recalled from the preceding discussion, the interface between the computer and printout subsystems most typically falls between the compensation and rendition stages.

Therefore ready retrofit of existing computer-and-software installations can be achieved by preserving that interfacing, and with it most preferably the language transmitted across the interface. All such considerations militate in favor of the practical solution seen in FIG. 28.

As can be seen, the computer subsystem thus includes an output conversion 266 to popular RGB coordinates. At the other side of the interface 269, the printer system promptly reconverts 267 the received data back into HPG.

As noted earlier, color compensation 256 and the input conversion 258 from RGB to HPG take the form of a color driver. The driver is most typically loaded into the computer but sometimes instead, to accommodate some applications-program vendors, included in the printer firmware.

In either case the driver is typically under control of the printer-subsystem designer. Accordingly the designer has an option of programming the printer firmware to determine for itself whether its input signals are coming precompensated (as in FIG. 28) or require compensation.

If necessary this may be facilitated by, for example, including noncolor-data flags in outputs of the software version of the driver. The firmware can test for these flags to determine whether the arriving data are precompensated.

If so, the firmware then can decide to route the input data directly to the rendition stage 262; and if not, then through an internal compensation block first. Such tactics enable production of a machine in just one model, to accommodate either type of applications program automatically.

If preferred the decision can be effectuated in other ways—including, for example, use of a plug-in compatibility module, and manual switching of a built-in module. These can be set up to accommodate different applications programs in which a driver may be either present or absent.

As in FIG. 27, the compensation block here preferably operates to take into account color distortions occurring in interpretation of RGB signals by the display—as well as those introduced in the rendition system, at the printer, and in the several conversion blocks shown along the way.

Figure 28:
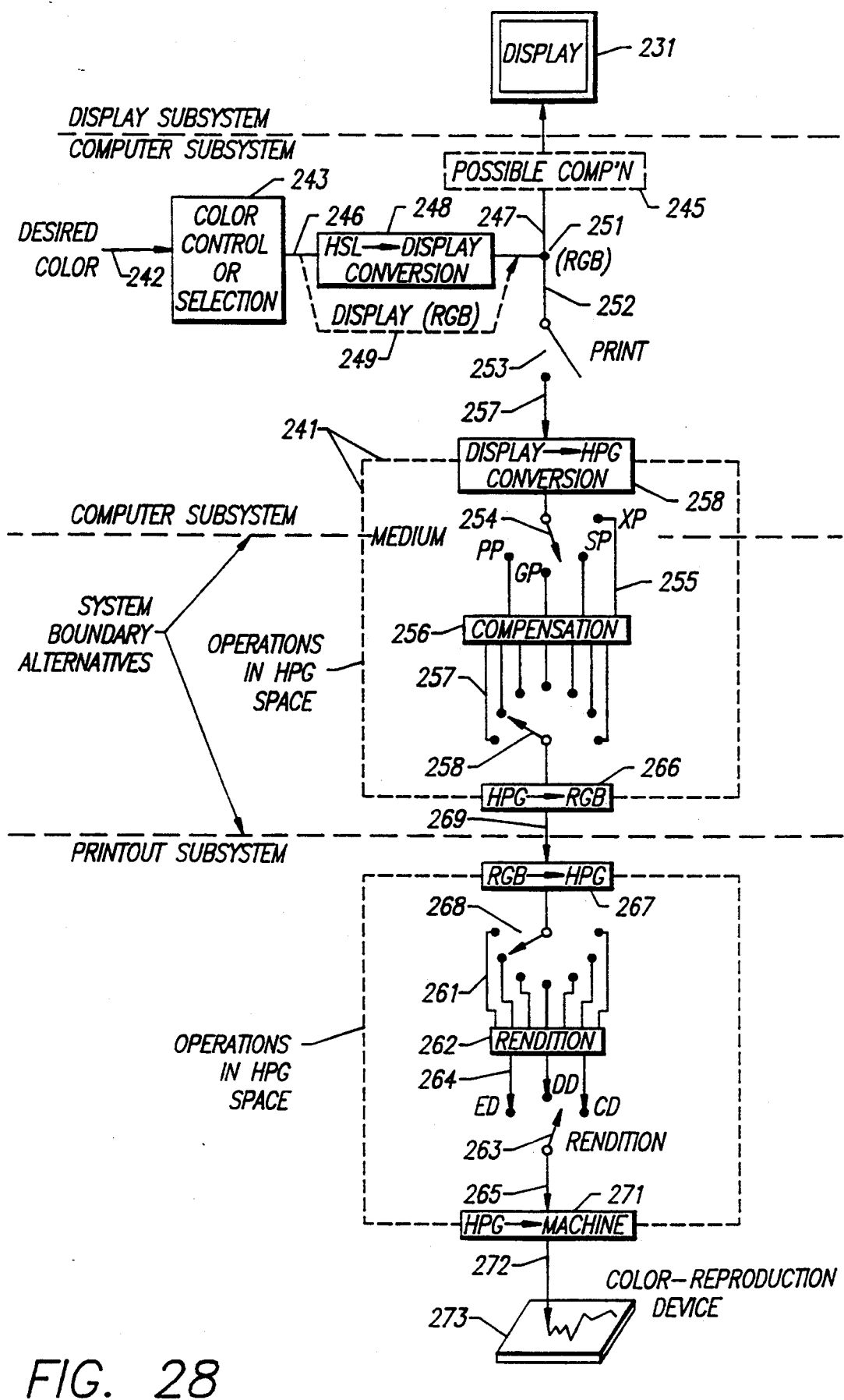
FIG. 28 is a like diagram but RGB-interfaced throughout (except at the printer)

FIG. 28 also reflects an additional practical necessity that arises in separating the computer and printer subsystems along the typical boundary that appears lower in the drawing. Rendition selections 263, particularly if made only in the printer subsystem, may have to be conveyed back upstream to the computer subsystem—in order to effectuate the corresponding necessary selection of color-compensation numbers.

Figure 29:
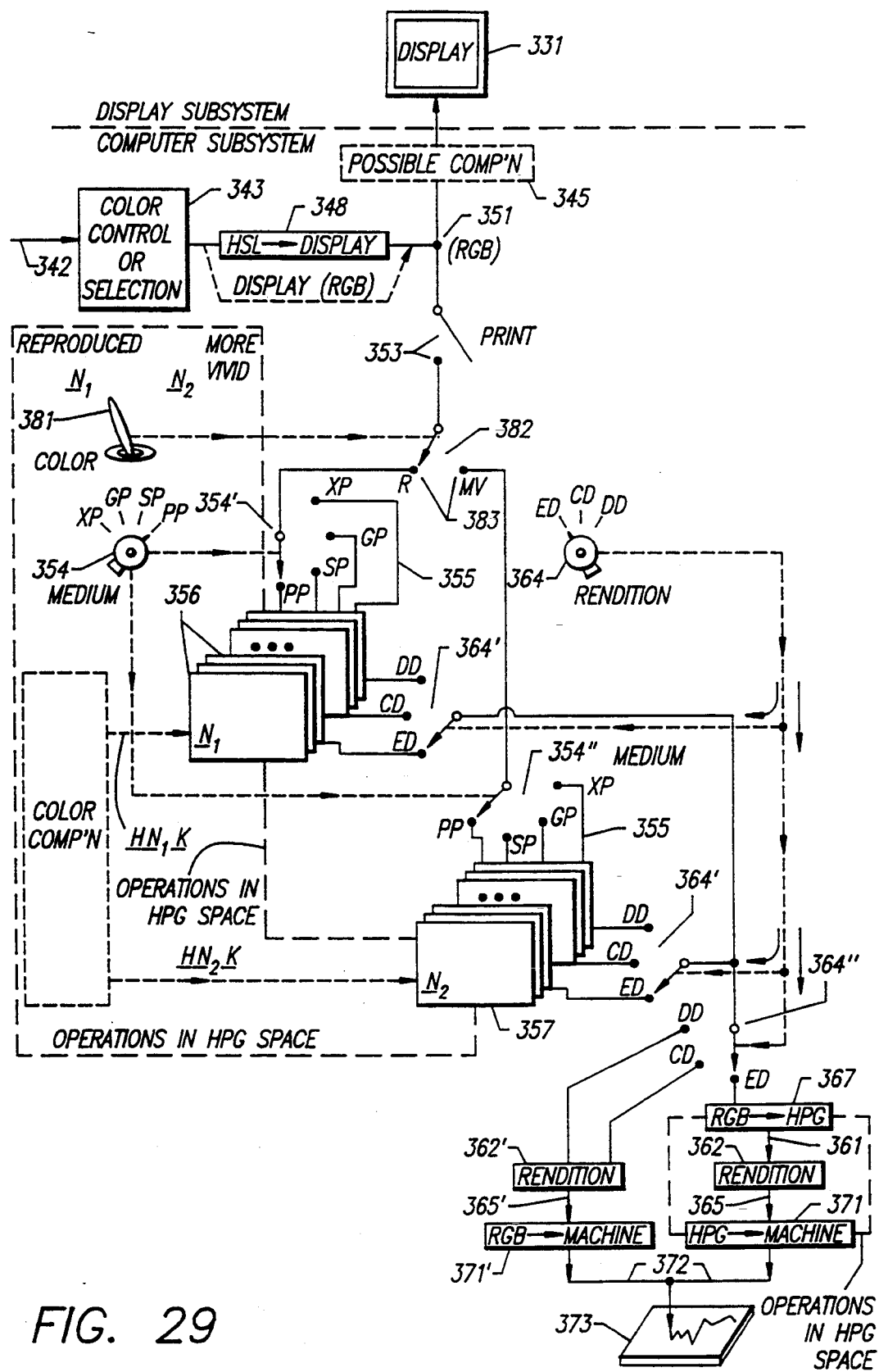
FIG. 29 is a like diagram but showing look-up operations.

In any event, switching or control of the compensation and rendition stages must be coordinated to maintain correspondence between compensation arithmetic and rendition method. FIG. 28 symbolizes this necessity as duplicate selector switches 258, 268:

One 258 is just before HPG compensator-output conversion to RGB; the other 268 is just after RGB rendition-input conversion back to HPG. As before, these selections may actually be made by computer commands, and may be entered by a user or established automatically by the system.

d. RGB-Interfaced HPG Compensation, Rendition and Printing with Selectable Halftoning, Sheet Medium and Vividness FIG. 29 represents the embodiment of the invention which is now most highly preferred, particularly in view of the several factors of practicality considered above. While preserving the manifold benefits of the HPG color model and new dithering methods introduced above, this embodiment further addresses the difficulty of completing color-compensation calculations in real time or on line, with desktop computers of the type now predominantly available.

Discussion of this drawing will dwell only upon its points of divergence from the previous three figures illustrating preferred embodiments of the invention. The first of these is that look-up tables 356,357 having the effect of the conversions into and from HPG space, and color-compensation intervening operations within that space, have been put in place at the position of the upper HPG-space block of FIG. 28.

The preparatory steps, plainly performed in HPG space, of constructing the tables 356, 357 is symbolized by an inner block—presented in dashed lines as it is not performed by the equipment as manufactured and distributed, or directly as used, but by other instrumentalities and at an earlier time.

The system allows for user selection of different color adjustments or compensations. As previously mentioned, in the embodiment now most highly preferred exactly two different discrete sets of such adjustment or compensation are made available.

These adjustment sets correspond respectively to printing of color:

(1) as it appears on the display screen, as closely as can be, and
(2) more vividly.

To be specific, the increased vividness in the second selectable set corresponds to increased Fraction-Colorant N.

For that reason the symbolism of this selection by the "COLOR"-switch handle 381—and also the user's selection as between the "MORE VIVID" option and the "REPRODUCED" option—have both been placed inside the upper dashed-line HPG-space area of FIG. 29.

The selection ordinarily is made by means of either computer commands or an actual machine control. In any event it is conceptualized as performed in HPG space.

The actual implementation, however, is applied to RGB signals and produces more RGB signals. It is therefore here symbolized by switch contacts 382, 383 that are outside the HPG-space area.

A similar convention has been applied to symbolization 364-364'-364" of the compensations applied for use of the equipment with different sheet media. Representation of the user's selection process as in or out of HPG space is somewhat moot, for the following reason.

As presented earlier, error diffusion and clustered dither in accordance with the present invention are both performed using HPG parameters and their elements. Nevertheless, because dithering is a first-order process it is not capable of effectuating or developing the latent advantages of HPG processing.

Consequently in fact exactly the same numbers, printing decisions, and output appearance result from implementing clustered dither in HPG and RGB. Although the algorithmic procedures differ quite significantly, therefore, choosing between them is merely a matter of design choice—or even at a more pragmatic level, of programming preference.

In the physical embodiment of the invention that has actually been developed for commercialization, that preference happened to be for implementation in RGB coordinates. Accordingly—but somewhat arbitrarily, since the choice is not material to the operation of the invention—the dither halftoning functions 362' are shown as outside HPG space.

Whether the color-compensation table functions are performed in HPG or RGB space makes a nice semantic question, but here is resolved by showing the tables 356, 357 partially inside and partially outside that same upper HPG-space area.

The most-advanced manifestation of this preferred embodiment of the invention has been collaboratively prepared for use on the Mcintosh ® computer. It includes selectable rendition methods—the options offered being error diffusion ED, clustered dither CD and dispersed dither DD—and four selectable media compensations for plain, glossy and special paper and transparent plastic sheet PP, GP, SP, XP respectively, as well as the selectable vividness mentioned above. These options come to a total of twenty-four crosscombinations, and in fact twenty-four look-up tables are provided as part of the commercial package of hardware and software.

Another manifestation has been prepared for use with the IBM-compatible Microsoft Windows ® system, offering a selection between clustered and dispersed dither, and the same eight crosscombination selections of medium and vividness. Here sixteen crosscombinations of options are found, and that number of look-up tables is commercially provided.

Yet a third manifestation has been prepared by the Software Publishing Corporation for its Harvard Graphics software package, as an adjunct to Microsoft DOS ®, and offers a selection between (1) plain or special paper and (2) glossy paper or transparent plastic sheet—with no vividness selection. Accordingly two look-up tables are included in the package.

These various manifestations considered together offer prospective users a range of capabilities and tradeoffs, at correspondingly various costs—advantageously allowing users to select the capability most closely matching both need and resources. Dispersed dither, vellum paper and glossy paper, however, are used relatively rarely and therefore ancillary.

Putting these latter three options aside, then, the remaining fourteen available crosscombinations or combinations taken in the aggregate are considered to represent the preferred embodiment that is the best mode of practicing the invention and so is most highly preferred.

This document is intended to enable practice of the invention in its best mode by a person (or group of people) of ordinary skill in the art of color-reproduction mechanical systems, electronic systems and programming systems. The mechanical systems will be described to some extent In the following section, and a full exhibition of the mechanics and electronics are shortly available for study in the PaintJet® Model XL300 color printer of the aforementioned Hewlett-Packard Company.

The programming systems are likewise soon available, but are very generally conventional except for conversions 367, 371 from RGB to HPG, and from HPG to CMYK (machine) parameters. The RGB→HPG transformation 367 is already set forth in an earlier section, and HPG→CMYK 371 is in part trivial since half of the full HPG element set is identically CMYK and another element W is not printed per se.

The remaining conversions for RGB→CMYK 371 are well known in the art but will be presented here for completeness. In the first of the following expressions, the notation "min" represents the minimum-choice function rather than the colorant "Min" or its quantity Min introduced earlier.

$$K = \min(1-R, 1-G, 1-B)$$

$$C = 1 - R - K$$

$$M = 1 - G - K$$

$$Y = 1 - B - K$$

With guidance by all of the foregoing, development of the color-compensation tables $N_1$, $N_2$ of FIG. 29 can now be carried out very straightforwardly by color-engineering personnel. Such personnel are able to supply colorimetric, analytical and mathematical techniques and the like, needed to determine what color adjustments and compensations should in fact be implemented; but it is believed that they will encounter no necessity for further inventive effort.

As noted above, however, it is not intended to restrict the benefits of the invention to even such intermediate-level (or higher) engineers—but rather to enable full enjoyment of those benefits by people of quite ordinary skill in this field. Accordingly the entire assemblage of fourteen tables that enables practice of the present invention in its best mode is tendered in a microfiche Appendix to this document.

A "Table of Contents" to the tables in the Appendix appears as page 254 of the Appendix, and an orientational descriptive page as page 253. To use any table, an input RGB quantity is found in each of three sections (as explained in the descriptive page) of that table, and the corresponding output numbers are read from all three sections. The latter three figures will be output red, green and blue quantities respectively.

In general input RGB quantities will not coincide with discrete input entries in the table, but rather in general each input RGB quantity will be found to lie between two entries, in each of the three sections.

7. Color-Delivery Hardware

In the embodiments of the invention that are now most highly preferred, the color-generating machine, or the device for causing the medium to appear colored, is an ink-dispensing document printer. It is most preferably of the thermal-inkjet type.

In these embodiments the visible medium is sheet medium that passes through the printer, receiving color inks and black ink that the printer deposits onto the sheet medium to form substantially stable images. The visible-light projection comprises reflection from the color inks and from the medium; but in the case of transparent plastic sheet medium the projection further comprises transmission through the medium, and in a case where fluorescent inks are employed the projection also comprises optical emissions from the inks.

The separate physical coloring means comprise a first-primary-color ink of a first composition and a second-primary-color ink of a second composition—both inside the printer. The first device-primary means comprise:

the first-primary-color ink, a first electronically operated pen for discharging the ink, means for controlling the position of the first pen relative to the medium, and first circuits for actuating the first pen in coordination with the position-controlling means to discharge the first ink to selectively reflect light, from the region, in a first spectral distribution.

Correspondingly the second device-primary means comprise the second-primary-color ink of a second composition, a second electronically operated pen for discharging the ink, and means for controlling the position of the second pen relative to the medium. The second device-primary means also comprise second circuits for actuating the second pen in coordination witch the position-controlling means to discharge the second ink to selectively reflect light, from the region, in a second spectral distribution.

As pointed out earlier, when the complements or subordinate primaries are needed an alternative definition is invoked allowing one or the other of the device-primary means to be constituted to provide the desired visual effect by inks, pens etc. operating in pairs.

The gray-scale means comprise black ink of a third composition inside the printer, a third electronically operated pen for discharging the ink, and means for controlling the position of the third pen relative to the medium. The gray-scale means also include third circuits for actuating the third pen in coordination with the position-controlling means to discharge the black ink to absorb light substantially equally at substantially all visible-light wavelengths.

It will be understood that the elements of the invention as enumerated above related to only the active primaries for expressing a particular desired color. The actual device has at least one other device-primary means to complete its capability for general color production.

a. Pen Carriage

Figure 30:
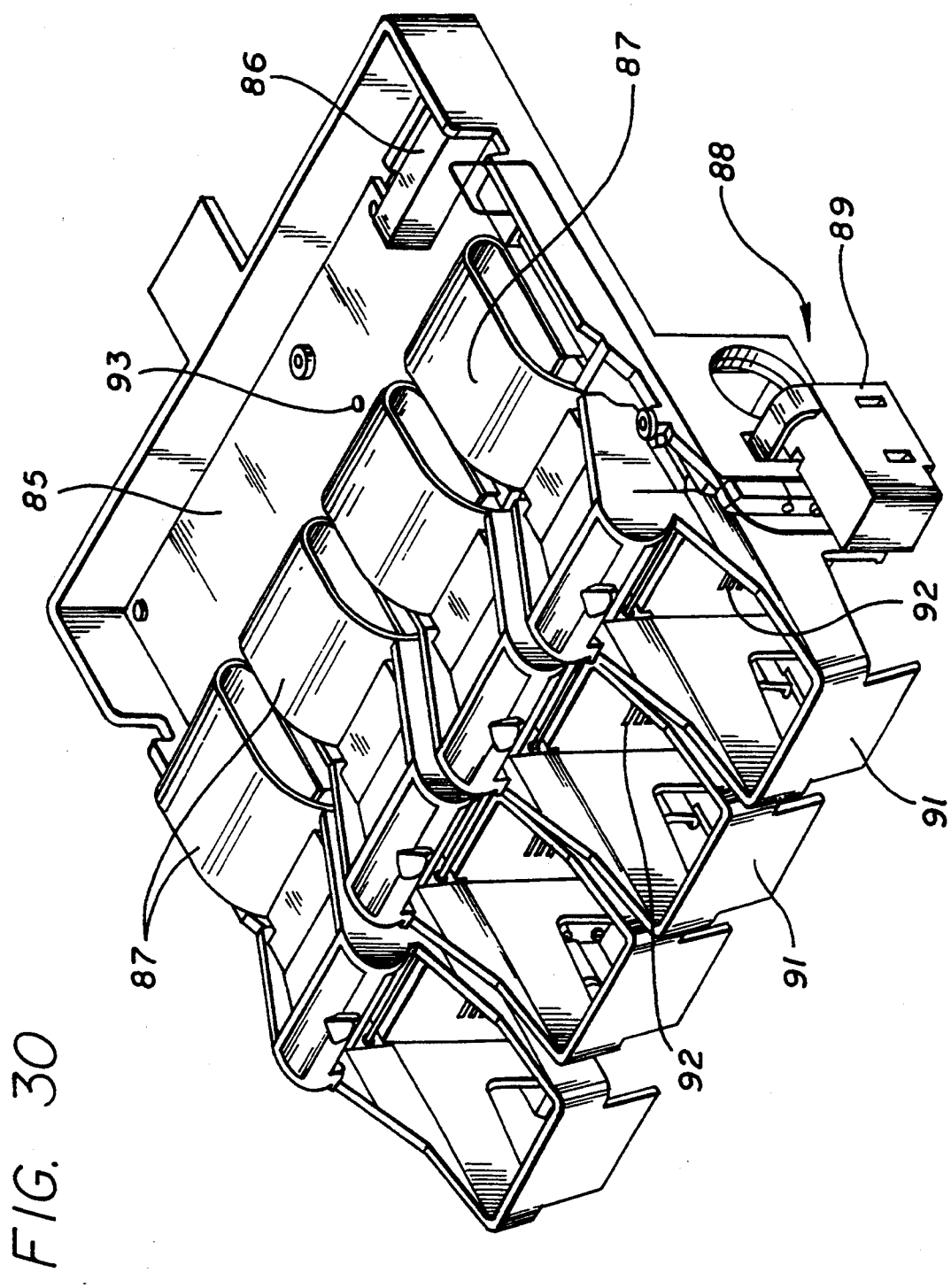
FIGS. 30 and 31 show the printing-machine carriage and pens in perspective and plan respectively.
Figure 31:
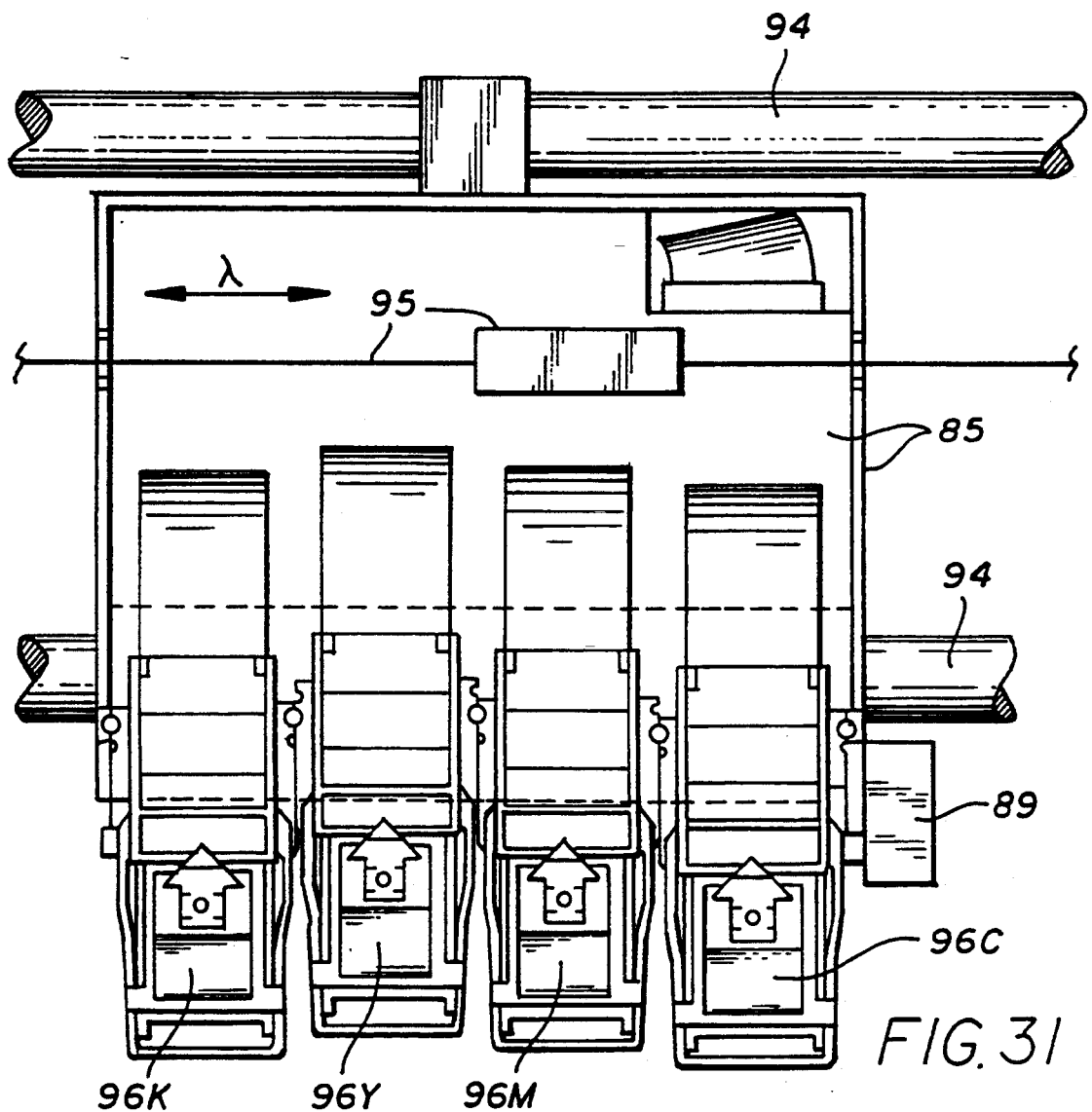

FIGS. 30 and 31 show how the pen carriage 85 with its individual pen holders or bays 91 and pens 96K, 96Y, 96M, 96C is mounted to a pair of support-and-guide rods 94 for extremely precise lateral positioning in scanning across the medium. To propel the carriage 85 very swiftly along those rods 94, a metallic carriage-drive cable or strip 95 is secured near the center 93 of the carriage floor.

The carriage-drive cable 95 is an endless metal loop, mounted about capstans (not shown) at the edges of the printer bed (not shown). Forcibly spun about a motor-driven one of the capstans, the carriage-drive cable 95 shuttles the carriage 85 back and forth across the bed.

A trailing electrical-cable assembly (not shown) attaches at the right rear corner 86 of the carriage 85. Its electrical wires bring control signals to and from all the pens and onboard portions 87 of their color-discharge drive circuitry.

Flex circuits 87 interconnect a pen interface 92 at each pen bay 91 with the trailing cable, and thereby with other control circuitry mounted stationarily elsewhere in the printer case. That control circuitry in turn is actuated by the rendition and compensation systems discussed earlier, Just out of sight near the right-front corner of the carriage is a printed-circuit assembly 88 for a sensor that detects the edge of the sheet medium. That printed-circuit assembly is hidden by a small outboard projection 89 which (for reasons clear to those acquainted with San Francisco) is sometimes familiarly called the "cliffhouse".

Through the cliffhouse 89 extends a so-called "codestrip" (not shown), which bears a pattern of extremely fine optical orifices. The codestrip, stationary relative to the printer bed, serves as a positional reference for the moving carriage: sensors in the cliffhouse detect and count off each orifice that the carriage passes, to continuously monitor carriage-position very precisely.

b. Pen Disposition on the Carriage

Figure 32:
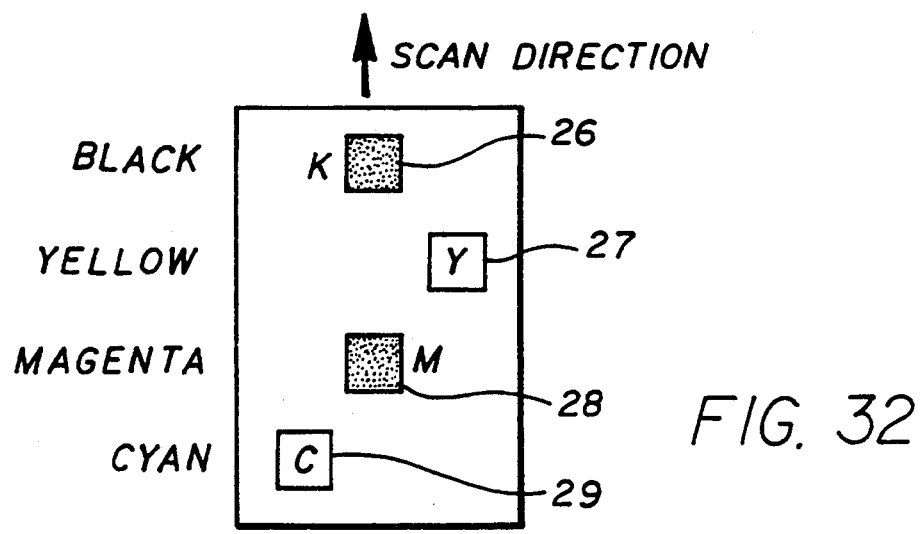
FIG. 32 is a schematic showing, in plan, of pen stagger.

These drawings also suggest that the pens are staggered in the direction perpendicular to the scan. FIG. 32 bears out the suggestion, showing in exaggerated form the relative positions of the CMYK pens.

This staggering helps to avoid laying down too much ink on the medium in a short time. The excessive undried liquid would otherwise produce aggravated cockle of absorbent media, and bleed of the colorants.

It will be understood that the foregoing disclosure is intended to be merely exemplary, and not to limit the scope of the invention—which is to be determined by reference to the appended claims.

I claim:

1. Apparatus, for use with a visible medium, and for use with desired-color information from a color-image source; said apparatus comprising:
    a device for causing such medium to appear colored;
    a programmed information processor for receiving such desired-color information, generating device-control signals for the device, and producing the effect of:
        (A) resolving such information into substantially hue, Fraction-Colorant and black information, if such desired-color information is not already so resolved,
        (B) performing color-compensation operations upon the so-resolved information to generate said control signals for the device, and
        (C) expressing the control signals in a form applicable to control the device; and
    device control means for receiving the signals, in said form, and applying them to control the device.

2. Apparatus, for use with a visible medium, and for use with desired-color information from a color-image source; said apparatus comprising:
    a device for causing such medium to appear colored;
    a programmed information processor for receiving such desired-color information, generating device-control signals for the device, and producing the effect of:
        (A) resolving such information into substantially hue, Fraction-Colorant and black information, if such desired-color information is not already so resolved,
        (B) performing color-compensation operations upon the so-resolved information to generate said control signals for the device, and
        (C) expressing the control signals in a form applicable to control the device; and
    device control means for receiving the signals, in said form, and applying them to control the device; and
wherein:
    the programmed information processor comprises neither means for directly so resolving such information nor means for directly performing said color-compensation operations; and
    the programmed information processor comprises means for selecting values from a reference table, prepared in advance for a large number of desired colors, to produce said resolving-performing-and-expressing effect.

3. Apparatus, for use with a visible medium, and for use with desired-color information from a color-image source; said apparatus comprising:
    a device for causing such medium to appear colored;
    a programmed information processor for receiving such desired-color information, generating device-control signals for the device, and producing the effect of:
        (A) resolving such information into substantially hue, Fraction-Colorant and black information, if such desired-color information is not already so resolved,
        (B) performing color-compensation operations upon the so-resolved information to generate said control signals for the device, and
        (C) expressing the control signals in a form applicable to control the device; and
    device-control means for receiving the signals, in said form, and applying them to control the device;
    means defining a plurality of reference tables, prepared in advance for a large number of desired colors and each table incorporating the influence of:
        said resolution into substantially hue, Fraction-Colorant and black information,
        said color-compensation operations, and
        said expression of control signals in a form applicable to control the device;
    wherein the programmed information processor comprises means for selecting values from the reference table to produce said resolving-performing-and-expressing effect.

4. The apparatus of claim 3, for use with any one of a plurality of different types of visible medium, and wherein:
    the table-defining means comprise means for further incorporating into each table the influence of:
        use of the apparatus with a respective one of such plurality of different types of visible medium;
    the programmed information processor comprises means for choosing, for use by said value-selecting means, one reference table from the plurality of tables; and
    the device further comprises user-actuated means for controlling the table-choosing means, to choose color-compensation operations specifically suited for any one of such plurality of types of medium.

5. The apparatus of claim 3, wherein:

the device-control means comprise means for modifying the control signals to effect halftoning at the device, using any one of a plurality of different halftoning styles, the table-defining means comprise means for further incorporating into each table and the influence of:
use by the device-control means of a respective one of the plurality of different halftoning styles;

programmed information processor comprises means for choosing, for use by said value-selecting means, one reference table from the plurality of tables; and the programmed information processor comprises means for controlling the table-choosing means, to choose color-compensation operations specifically suited for any one of the plurality of halftoning styles.

6. The apparatus of claim 3, for use with any one of a plurality of different types of visible medium, wherein:
the device-control means comprise means for modifying the control signals to effect halftoning at the device, using any one of a plurality of different halftoning styles;

the table-defining means comprise means for further incorporating into each table the influence of:
use of the apparatus with a respective one of such plurality of different types of visible medium, and
use by the device-control means of a respective one of the plurality of different halftoning styles;

the programmed information processor comprises means for choosing, for use by said value-selecting means, one reference table from the plurality of tables; and the device further comprises user-actuated means for controlling the table-choosing means, to choose color-compensation operations specifically suited for use of the apparatus with any combination of:
any one of such plurality of types of visible medium with
any one of the plurality of different halftoning styles.

7. The apparatus of claim 6, wherein:
the reference table represents output values for input desired-color information in three-dimensional color space; and
the value-selecting means comprise means for trilinear interpolation between values explicitly represented in the table.

8. The apparatus of claim 3, for use by a user who has any one of a plurality of different esthetic preferences of color-adjustment operation, and wherein:
the table-defining means comprise means for further incorporating into each table the influence of:
choice by such user of a respective one of such plurality of different esthetic preferences of color-adjustment operation;
the programmed information processor further comprises means for producing the effect of performing color-adjustment operations upon the so-resolved information by choosing, for use by said value-selecting means, one reference table from the plurality of tables, to generate said control signals that effectuate such user's choice of esthetic preference;
the device further comprises manually operable means for such user's entry of a choice among such plurality of different esthetic preferences of color-adjustment operation; and the device further comprises means for responding to the manually operable means and controlling the table-choosing means accordingly, to choose color-adjustment operations specifically effectuating any user-chosen one of such plurality of different esthetic preferences.

9. The apparatus of claim 8, wherein:
said plurality of different esthetic preferences comprises a choice among a plurality of different color vividnesses, substantially with neither change of hue nor change of blackness.

10. The apparatus of claim 9, wherein:
the table-defining means comprise means for incorporating into said plurality of tables the influence of a plurality of different Fraction-Colorant values, corresponding to said plurality of different color vividnesses.

11. The apparatus of claim 8, wherein:
said plurality of different esthetic preferences comprises a choice among at least printing color:
(1) substantially as it appears on a display screen or
(2) with a clear, straightforwardly comprehended color modification.

12. The apparatus of claim 11, wherein:
said clear, straightforwardly comprehended color modification comprises a difference of color vividness, substantially with neither change of hue nor change of blackness, relative to the color substantially as it appears on a display screen.

13. The apparatus of claim 12, wherein:
the table-defining means comprise means for incorporating into said plurality of tables the influence of a plurality of different Fraction-Colorants, corresponding to a plurality of different color vividnesses.

14. The apparatus of claim 3, for use by a user who has any one of a plurality of different esthetic preferences of color-adjustment operation, and for use with any one of a plurality of different types of visible medium, and wherein:
the programmed information processor further comprises means for producing the effect of performing color-adjustment operations upon the so-resolved information to generate said control signals that effectuate such user's esthetic preferences;
the device-control means comprise means for modifying the control signals to effect halftoning at the device, using any one of a plurality of different halftoning styles;
the table-defining means comprise means for further incorporating into each table the influence of:
choice by such user of a respective one of such plurality of different esthetic preferences of color-adjustment operation,
use of the apparatus with a respective one of such plurality of different types of visible medium, respectively, and
use by the device-control means of a respective one of the plurality of different halftoning styles;
the programmed information processor further comprises means for choosing, for use by said value-selecting means, one reference table from the plurality of tables;
the device further comprises manually operable means for such user's entry of a choice among such plurality of different esthetic preferences of color-adjustment operation; and the device further comprises means for responding to the manually operable means and controlling the table-choosing means accordingly, to choose color-compensation and color-adjustment operations specifically effectuating any crosscombination of:

any user-chosen one of such plurality of different esthetic preferences of color-adjustment operation, any one of such plurality of types of visible medium with any one of the plurality of different halftoning styles.

15. Apparatus for generating a hardcopy output corresponding to a representation on a display-screen device, and comprising:

a black-pigment printhead;

a plurality of different color-pigment printheads;

driver means connected to said printheads to selectively activate the black- and color-pigment printheads, said driver means including color-compensation means for modifying component inputs received from the display-screen device based on a color model having these three parameters:

hue,

Fraction-Colorant, and black.

16. Apparatus, for use with a visible medium capable of visible-light projection, and for use with information from a color-image source that defines a desired color for at least one particular region of the medium; said apparatus comprising:

a device for causing such particular region to appear colored, including:

(1) a first device-primary means exclusively for causing such particular region to selectively project visible light of an associated first device-primary color, and (2) at least a second device-primary means exclusively for causing such particular region to selectively project visible light of an associated second device-primary color;

a programmed information processor for receiving such desired-color information, generating device-control signals for the device, and producing the effect of:

(A) resolution of that information into substantially at least:

(1) Fraction-Colorant information, namely the size of exclusively the chromatic fraction of the desired color, said Fraction-Colorant information being determined substantially directly from such desired-color information, and (2) hue information;

(B) color-compensation operations upon the so-resolved information, taking into account known Fraction-Colorant-distortion-introducing and hue-distortion-introducing characteristics of at least the device and the hereunder-recited device-control means, to generate at least:

(1) new Fraction-Colorant information that tends to nullify introduction of such Fraction-Colorant distortion, and (2) new hue information that tends to nullify introduction of such hue distortion, namely at least these three new hue-information elements;

(a) identification of a particular one of the device-primary colors to serve as dominant primary for the particular region, (b) identification of a particular other of the device-primary colors to serve as subordinate primary for the particular region, and (c) the subfractions of said Fraction-Colorant to be allocated to said dominant and subordinate primary respectively;

(C) generation of said device-control signals for the device, by:

(a) applying exclusively the element (2)(a) of said new hue-information elements to select a particularly one device-primary means to supply said identified dominant primary, (b) applying exclusively the element (2)(b) of said new hue-information elements to supply said identified subordinate primary, and (c) applying exclusively the new Fraction-Colorant information and the element (2)(c) of said new hue-information elements, namely the subfractions to be allocated to dominate and subordinate primary, to modulate the operation of exclusively the device-primary means selected to supply said identified dominant primary and exclusively the device-primary means selected to supply said identified subordinate primary, respectively; and (D) expression of the device-control signals in a form applicable to control the device; and device control means for receiving the device-control signals from the programmed information processor in said form and applying them to actuate the device to effectuate said dominant- and subordinate-primary selections and said exclusive modulation.

17. The apparatus of claim 16, wherein:

the color-appearance-causing device further comprises gray-scale means exclusively for causing a substantially achromatic suppression of a specified fraction of the visible-light projection of such particular region;

the programmed information processor further comprises means for producing the effect of:

(A) also isolation from the desired-color information of Fraction-Black information, namely the desired fraction of said substantially achromatic suppression, (B) color-compensation operations upon said Fraction-Black information too, taking into account known Fraction-Black-distortion-introducing characteristics of at least the device and the device-control means, to generate new Fraction-Black information that tends to nullify introduction of such Fraction-Black distortion, (C) generation of further device-control signals by applying exclusively the new Fraction-Black information to modulate the operation of exclusively the gray-scale means, and (D) expressing the further device-control signals in a form applicable to control the device; and the device-control means also receive from the programmed information processor the further device-control signals in said form and apply them in said form to actuate and control exclusively the gray-scale means.

18. The apparatus of claim 17, wherein:

the device is an ink-dispensing document printer;

the visible medium is sheet medium that passes through the printing press, receiving color inks and black ink that the printer deposits onto the sheet medium to form substantially stable images;

said visible-light projection comprises reflection from the color inks and from the medium;

the first device-primary means comprise a first-primary-color ink of a first composition inside the printer, a first electronically operated pen for discharging the ink, means for controlling the position of the first pen relative to the medium, and first circuits for actuating the first pen in coordination with the position-controlling means to discharge the first ink to selectively reflect light, from said region, in a first spectral distribution;

the second device-primary means comprise a second-primary-color ink of a second composition inside the printer, a second electronically operated pen for discharging the ink, means for controlling the position of the second pen relative to the medium, and second circuits for actuating the second pen in coordination with the position-controlling means to discharge the second ink to selectively reflect light, from said region, in a second spectral distribution;

the gray-scale means comprise black ink of a third composition inside the printer, a third electronically operated pen for discharging the ink, means for controlling the position of the third pen relative to the medium, and third circuits for actuating the third pen in coordination with the position-controlling means to discharge the black ink to absorb light substantially equally at substantially all visible-light wavelengths.

19. The apparatus of claim 18 wherein, depending on the desired color rendition:

the first device-primary means alternatively comprise a first device-primary color ink pair, a first pair of pens, and a corresponding first pair of actuating circuits; and the second device-primary means alternatively comprise a second device-primary color ink pair, a second pair of pens, and a corresponding second pair of actuating circuits;

wherein said first and second pairs may share a particular one ink, pen and circuit.

20. Apparatus, for use with a visible medium, and for use with desired-color information from a color-image source; said apparatus comprising:

a device for causing such medium to appear colored;

a programmed information processor for receiving such desired-color information, generating device-control signals for the device, and producing the effect of:

(A) resolving such information into substantially hue, Fraction-Colorant and black information, if such desired-color information is not already so resolved, (B) performing color-compensation operations upon the so-resolved information to generate said control signals for the device, and (C) expressing the control signals in a form applicable to control the device;

device-control means for receiving the signals, in said form, and applying them to control the device; and means defining a reference table, prepared in advance for a large number of desired colors and incorporating the influence of:

said resolution into substantially hue, Fraction-Colorant and black information, said color-compensation operations, and said expression of control signals in a form applicable to control the device;

wherein the programmed information processor comprises means for selecting values from the reference table to produce said resolving-performing-and-expressing effect.

* * * * *